(12) United States Patent
Chow et al.

(10) Patent No.: US 8,516,080 B2
(45) Date of Patent: Aug. 20, 2013

(54) SYSTEM AND METHOD FOR PROVIDING VIRTUAL WEB ACCESS

(75) Inventors: William Weiyeh Chow, Los Angeles, CA (US); Mark Lea Tsuie, Canoga Park, CA (US); Craig Leonard Ogg, Long Beach, CA (US)

(73) Assignee: Mobophiles, Inc., Santa Monica, CA (US)

( * ) Notice: Subject to any disclaimer, the term of this patent is extended or adjusted under 35 U.S.C. 154(b) by 232 days.

(21) Appl. No.: 12/630,806

(22) Filed: Dec. 3, 2009

(65) Prior Publication Data
US 2010/0138485 A1 Jun. 3, 2010

Related U.S. Application Data

(60) Provisional application No. 61/119,377, filed on Dec. 3, 2008.

(51) Int. Cl.
*G06F 15/16* (2006.01)
(52) U.S. Cl.
USPC .......................................... 709/219; 709/203
(58) Field of Classification Search
USPC .......... 709/203, 218, 219; 719/316; 711/126
See application file for complete search history.

(56) References Cited

U.S. PATENT DOCUMENTS

| | | | |
|---|---|---|---|
| 5,761,507 A * | 6/1998 | Govett | 718/101 |
| 6,442,601 B1 * | 8/2002 | Gampper et al. | 709/218 |
| 7,581,014 B2 * | 8/2009 | Mittig et al. | 709/230 |
| 2003/0041147 A1 * | 2/2003 | van den Oord et al. | 709/227 |
| 2003/0078964 A1 * | 4/2003 | Parrella et al. | 709/203 |
| 2004/0064570 A1 * | 4/2004 | Tock | 709/228 |
| 2004/0065470 A1 * | 4/2004 | Goodison et al. | 174/112 |
| 2006/0112398 A1 * | 5/2006 | Mukkamala et al. | 719/316 |
| 2007/0168466 A1 * | 7/2007 | Tooley et al. | 709/218 |
| 2008/0229024 A1 * | 9/2008 | Plamondon | 711/126 |
| 2008/0235326 A1 * | 9/2008 | Parsi et al. | 709/203 |
| 2010/0169465 A1 * | 7/2010 | Amidon et al. | 709/219 |

OTHER PUBLICATIONS

International Search Report and Written Opinion dated Jan. 29, 2010 for International Application No. PCT/US2009/066663, 10 sheets.

* cited by examiner

*Primary Examiner* — Firmin Backer
*Assistant Examiner* — Michael A Chambers
(74) *Attorney, Agent, or Firm* — Christie, Parker & Hale, LLP

(57) ABSTRACT

A client-based computer system adapted to communicate with a remote server through a network and to provide access to content or services provided by the server. The system includes a storage device and a cache. The cache is adapted to communicate with the server over the network, to intercept a request from the client to the server, and to store responses from the server on the storage device. The cache is further adapted to automatically determine when to send the request to the server over the network. The cache is still further adapted to provide a response, including from the responses stored on the storage device based upon the request, to appear as through the server provided the response. The system may also include a crawler. The crawler is adapted to operate in conjunction with the cache to cause requests to be sent to the server over the network.

41 Claims, 44 Drawing Sheets

SYSTEM AND METHOD FOR PROVIDING VIRTUAL WEB ACCESS

CROSS-REFERENCE TO RELATED APPLICATION(S)

This application claims priority to and the benefit of U.S. Provisional Patent Application No. 61/119,377, entitled "SYSTEM AND METHOD FOR PROVIDING VIRTUAL WEB ACCESS," filed on Dec. 3, 2008, the entire content of which is incorporated herein by reference.

BACKGROUND

In client-server computer systems, remote server computers provide access to content (such as web pages) and services to local client computers over a network. While this allows for centralized management of such content and services, issues related to connectivity (such as being disconnected from the network or when the network is slow) can affect the capability of the client.

Although such content and services could be maintained (and synchronized) locally on the client (that is, a "fat client"), this greatly complicates the client design and defeats one of the chief benefits of the client-server architecture. Consequently, there is a need to be able to provide the timely availability of the server content and services to the client when network connectivity is broken or insufficiently responsive, and without having to maintain the server content or services locally.

SUMMARY OF THE INVENTION

Accordingly, embodiments of the invention address these needs by allowing the client to work offline from the server or asynchronously with the server in such a manner that the user is unaware of the issues related to network connectivity or performance. This is accomplished by caching responses from recent server requests on a local storage device. Each new server request may then be intercepted by the cache before going to the server, and an appropriate response from the cache returned before or even in place of making the actual request to the server. An optional crawler can refresh these responses (or seed new responses) in the cache by periodically submitting the same or related (e.g., nearby) requests to the server.

Write requests to the server can also be handled by storing the write requests as pending in the cache before sending them to the server. The crawler can also be used to send the write requests to the server in the proper order, optionally consolidating write requests to the same portions of server content before sending such requests to the server. In addition, pending write requests can also be modified or deleted prior to sending to the server.

Through this seamless caching of server content and services, the client is able to function as if such content and services were locally available, but without any of the server-side logic or resources needed to maintain the content or services locally.

In an exemplary embodiment according to the present invention, a client-based computer system is provided. The client-based computer system is adapted to communicate with a remote server through a network and to provide access to content or services provided by the server. The system includes a storage device and a cache. The cache is adapted to communicate with the server over the network, to intercept a request from the client to the server, and to store responses from the server on the storage device. The cache is further adapted to automatically determine when to send the request to the server over the network. The cache is still further adapted to provide a response, including from the responses stored on the storage device based upon the request, to appear as though the server provided the response.

The request and the responses may conform to a hypertext transfer protocol (HTTP) specification.

The cache may be further adapted to provide the response based on the request's HTTP request type, headers, or body.

The request may be a write request to the server content. The cache may be further adapted to provide a response to the write request to appear as though the server provided the response while using the storage device to store the write request as pending until the cache can send the write request to the server.

The cache may be further adapted to consolidate on the storage device multiple pending write requests that are related or directed to a same portion of the server content, including maintaining their order or relationship.

The cache may be further adapted to store a response from the server on the storage device, to the write request sent to the server.

The cache may be further adapted to modify or delete the pending write request before sending the write request to the server.

The cache may be further adapted to intercept the request at an Application Programming Interface (API) level.

The cache may be further adapted to intercept the request via a proxy.

The cache may be further adapted to intercept the request by modifying an application on the client.

The network may be the Internet.

The system may be adapted to communicate with a specific set of servers through the network and to provide access to content or services provided by the set of servers. The cache may be further adapted to communicate with the set of servers over the network, to intercept the request from the client to the set of servers, and to store responses from the set of servers on the storage device. The cache may also be further adapted to automatically determine when to send the request to the set of servers over the network. The cache may be still further amended to provide the response, including from the responses stored on the storage device based upon the request, to appear as though the set of servers provided the response. The specific set of servers may be configured manually or automatically, including through user specification, favorites, bookmarks, history, or activity.

The cache may be further adapted to intercept a new request that is related to the request, for content or services provided by a corresponding server accessible through the network and that is not in the set of servers. The cache may also be further adapted to communicate with the corresponding server over the network; store responses from the corresponding server on the storage device to requests that are related to the request; automatically determine that the new request is related to the request; automatically determine when to send the new request to the corresponding server over the network; and provide a response to the new request, including from the responses stored on the storage device based on the new request, to appear as though the corresponding server provided the response.

The request may be issued from a web browser for a web page to the set of servers, and the new request may be for embedded content of the web page on the corresponding server.

The automatic determination by the cache of when to send the request to the server may be based on connectivity between the client and server, including a quality of the connectivity or accessibility of the server over the network.

The automatic determination by the cache of when to send the request to the server may be based on a type of the request or parameters of the request.

The automatic determination by the cache of when to send the request may be dynamically reconfigurable.

The cache may be further adapted to provide the response based upon a type or parameters of the request.

The cache may be further adapted to authenticate a user for the request without having to access the server.

The cache may be further adapted to provide the response based upon the user for the request.

The cache may be further adapted to reformat the content of the response.

The cache may be further adapted to provide the response by manufacturing the response from the server.

In another exemplary embodiment according to the present invention, a method of seamless caching on a storage device of a client computer is provided. The seamless caching is of responses from a server computer accessible to the client computer through a network, corresponding to content and services provided by the server computer. The method includes: intercepting a request to the server computer from the client computer; and automatically determining when to send the request to the server computer over the network or to provide a response, including from the responses on the storage device based upon the request, to appear as though the server provided the response.

The request may be a write request to the server computer content. The automatically determining may further include automatically determining when to store the write request on the storage device as pending. The storing the write request on the storage device as pending may include: providing a response to appear as though the server provided the response; and continuing to store the write request on the storage device until the write request can be sent to the server.

The storing the write request on the storage device as pending may further include consolidating on the storage device multiple write requests that are related or directed to a same portion of the server computer content, including maintaining their order or relationship.

The intercepting may take place at an Application Programming Interface (API) level.

The method may further include the seamless caching on the storage device of the responses from a specific set of server computers accessible to the client computer through the network, the responses corresponding to the content and services provided by the set of server computers. The method may also further include: intercepting the request to the set of server computers; and automatically determining when to send the request to the set of server computers over the network or to provide the response, including from the responses stored on the storage device based upon the request, to appear as though the set of server computers provided the response. The specific set of servers may be configured manually or automatically, including through user specification, favorites, bookmarks, history, or activity.

The method may further include the seamless caching on the storage device of responses from a corresponding server computer accessible to the client computer through the network and that is not in the set of server computers, the responses corresponding to requests that are related to the request. The method may also further include: intercepting a new request that is related to the request, to the corresponding server computer; automatically determining that the new request is related to the request; and automatically determining when to send the new request to the corresponding server over the network or to provide a response to the new request, including from the responses stored on the storage device based on the new request, to appear as though the corresponding server provided the response.

The request may be issued from a web browser for a web page to the set of server computers. The new request may be for embedded content of the web page on the corresponding server computer.

The method may further include authenticating a user for the request without having to access the server computer.

In yet another exemplary embodiment according to the present invention, a client-based computer system is provided. The system is adapted to communicate with a remote server through a network and to provide access to content or services provided by the server. The system includes a storage device, a cache, and a crawler. The cache is adapted to communicate with the server over the network, to intercept a request from the client to the server, and to store responses from the server on the storage device. The crawler is adapted to operate in conjunction with the cache to cause requests to be sent to the server over the network. The cache is further adapted to automatically determine when to send the request to the server over the network. The cache is still further adapted to provide a response from the responses stored on the storage device based upon the request, to appear as though the server provided the response.

The crawler may be further adapted to cause the requests to be sent to the server based upon previous server responses.

The crawler may be further adapted to cause requests for web pages or content to be sent to the server by analyzing or performing actions based upon the previous server responses to requests for web pages or content.

The request may be a write request to the server content. The cache may be further adapted to provide a response to the write request to appear as though the server provided the response while using the storage device to store the write request as pending until the crawler can cause the write request to be sent to the server.

The crawler may be further adapted to consolidate on the storage device multiple pending write requests that are related or directed to a same portion of the server content, including maintaining their order or relationship.

The system may be further adapted to communicate with a specific set of servers through the network and to provide access to content or services provided by the set of servers. The cache may be further adapted to communicate with the set of servers over the network, to intercept the request from the client to the set of servers, and to store responses from the set of servers on the storage device. The cache may also be further adapted to automatically determine when to send the request to the set of servers over the network. In addition, the cache may be further adapted to provide the response from the responses stored on the storage device based upon the request, to appear as though the set of servers provided the response. The crawler may be further adapted to operate in conjunction with the cache to cause requests to be sent to the set of servers over the network. The specific set of servers may be configured manually or automatically, including through user specification, favorites, bookmarks, history, or activity.

The crawler may be further adapted to operate in conjunction with the cache to cause requests related to the request to be sent to corresponding servers over the network. The cache may be further adapted to store corresponding responses for the related requests on the storage device.

The cache may be further adapted to: intercept a new request that is related to the request, for content or services provided by a corresponding server accessible through the network and that is not in the set of servers; communicate with the corresponding server over the network; store responses from the corresponding server on the storage device to requests that are related to the request; automatically determine that the new request is related to the request; automatically determine when to send the new request to the corresponding server over the network; and provide a response to the new request, including from the responses stored on the storage device based on the new request, to appear as though the corresponding server provided the response.

The request may be issued from a web browser for a web page to the set of servers. The new request may be for embedded content of the web page on the corresponding server.

The crawler may be further adapted to cause requests to be sent on behalf of a user.

The crawler may be further adapted to cause the pending write request to be sent to the server, to appear to the server as if a user sent the pending write request.

BRIEF DESCRIPTION OF THE DRAWINGS

The accompanying drawings illustrate embodiments of the present invention, and together with the description, serve to explain the principles of the embodiments of the present invention.

DETAILED DESCRIPTION

Figure 1:
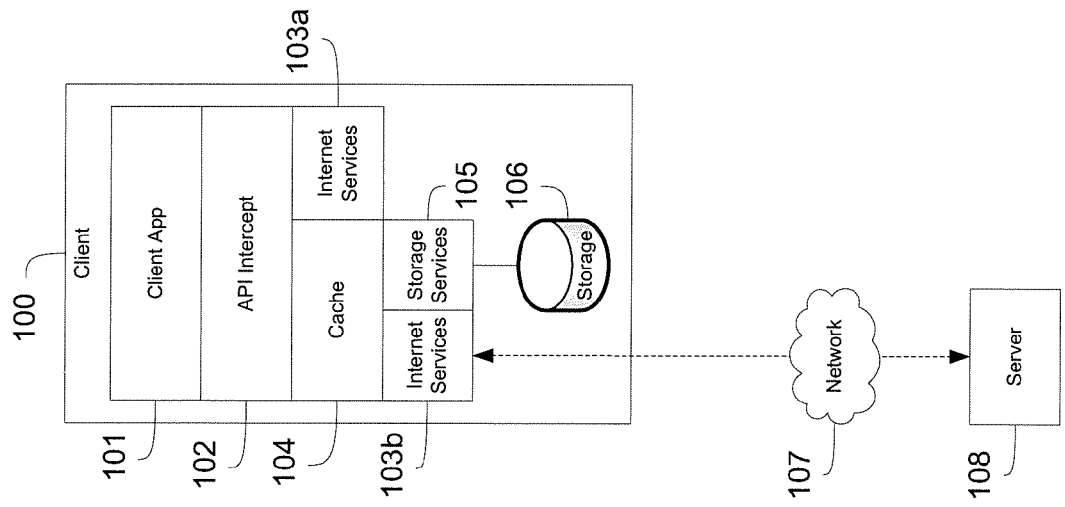
FIG. 1 is a diagram showing an embodiment of the Application Programming Interface (API) interception method for locally handling client requests.

The illustrative embodiments that follow are only exemplary applications of the present invention and not intended to limit the scope of the invention.

1 Introduction

Embodiments of the invention provide applications running on a computer system (called the client) virtual access to services on a remote computer (called the server) by trapping these requests at the client and serving responses to them locally as if they came from the server. By responding locally at the client, such as using responses stored on locally attached storage, the embodiments enable both faster and more continuous access to these services, such as when the server is inaccessible (no path to server or server is down) or when the network connection is slow (low bandwidth, high latency, or both). For example, the client may be running a browser that uses the hypertext transfer protocol (HTTP) to access resources served by a web server.

Embodiments of the invention allow the client both read and write access to content stored on a server, even while offline. Generally, a request is a read operation when it accesses data on the server, while a write operation modifies data at the server. When an application on the client computer sends a request to the server, the request is intercepted locally at the client and a local response is returned to allow the client application to behave as if the request was successfully completed at the server. The intercepted request can be sent to the server later, without the client application's knowledge.

2 Intercepting Requests

The general operation of an Internet client application involves issuing requests and receiving responses from a remote system. This application-level networking protocol, which generally corresponds to layer 7 of the OSI model, typically maps to a request-response scheme, where the client message specifies a request for a particular operation to be performed by the server, and the server response provides information (e.g., the results) about that operation. HTTP and FTP are examples of application-level networking protocols.

Embodiments of the invention can intercept these requests and provide the necessary responses locally, instead of synchronously requesting them from the server. The interception of these client requests can be enabled through a number of methods that are known to a person having ordinary skill in the art, and the embodiments may leverage one or more of these interception methods. For example, different types of requests may be preferably intercepted using one method over another.

2.1 API Interception

One method to intercept requests is to do so at the application programming interface (API). Internet-based application software is generally structured to map to the request-response orientation of the networking protocol, where there is an Internet services layer designed to facilitate the issuance of these requests and the receipt of their corresponding responses. This Internet services layer is designed to specifically handle one or more networking protocols and is generally distinct from the other functional layers of the application, such as an upper layer supporting the user interface (e.g., browser) or a lower layer supporting the transport-level networking protocol (e.g., TCP/IP). For example, the Microsoft Windows platform provides a software module in the form of a dynamically linked library (DLL), called WinInet, which provides an easy way for different Internet-based applications to communicate with servers using the application-level protocols that it implements. By injecting an API interception layer between the application and the Internet services layer, embodiments of the invention can respond to Internet requests locally.

Injecting an interception layer can take several different forms, such as dynamically modifying function call entry points in memory to redirect them to other code; third-party software toolkits may provide this "dynamic intercept injection" capability, such as Microsoft Detours, EasyHook or madCodeHook. Another method is to provide a replacement software library that provides an implementation of intercepted APIs that can be loaded by a process instead of the original software library. An advantage of these API interception approaches is that requests can be seamlessly handled, without any explicit knowledge of the user or the application. As another option, some platforms explicitly provide support for providing an alternative implementation of the Internet services layer, such as Microsoft Window's "URLMON" support for asynchronous pluggable protocols. Using Microsoft Windows URLMON interface, a software component may provide a handler for a protocol specified within an URL, including overriding the default handlers for HTTP and FTP provided by a Windows platform.

FIG. 1 is a diagram showing an embodiment of the API interception method for locally handling client requests. Client 100 is a computer that supports communications with Server 108, through Network 107. Client 100 supports the operation of a Client App 101, which, for example, may be an Internet-based application that performs communications using Internet Services 103*a*, such as a web browser.

API Intercept 102 has been injected between Client App 101 and Internet Services 103*a*, allowing it to direct requests to Server 108 (via Internet Services 103*b*), Cache 104, or any combination of the two.

Internet Services 103*a* may be the same software module as Internet Services 103*b*, since Cache 104 may choose to use any appropriate Internet services layer to access the Internet, including the one used by Client App 101. Requests directed to Cache 104 may be handled using responses stored locally on Storage 106. Access to Storage 106 may be, for example, through Storage Services 105, which is a common storage access layer, such as a filesystem, database, or a combination thereof.

2.2 Proxy Interception

Another method to intercept requests is to configure the web client application to direct requests for a remote system through an intermediate entity called a proxy. The Internet services layer of most Internet-based applications support the configuration of a proxy, causing some or all requests to be sent to the proxy instead of the server. A proxy can operate locally to the client computer, such as through a loopback/localhost interface, which allows the embodiments to respond to application requests locally; a proxy may also operate separately from the client computer, perhaps with beneficial characteristics over that of the web server, such as an intermediate computer system with closer proximity and/or higher bandwidth to the client computer. An advantage of this approach is that proxy-based communication is standardized and commonly implemented across different applications and platforms.

Figure 2:
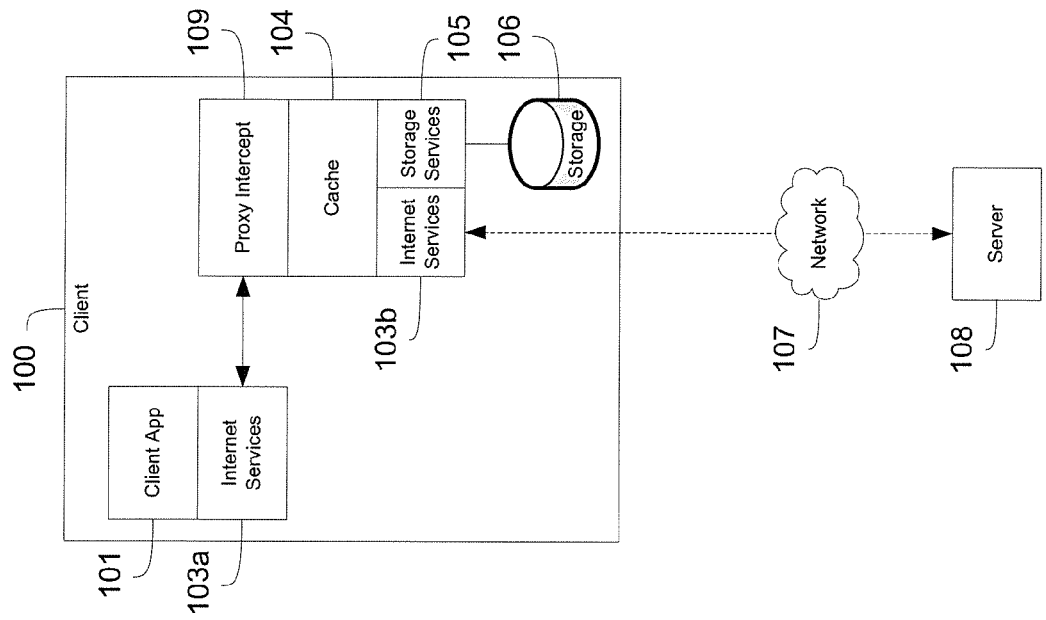
FIG. 2 is a diagram showing an embodiment of the proxy interception method for locally handling client requests.

FIG. 2 is a diagram showing an embodiment of the proxy interception method for locally handling client requests. Client 100 is a computer that supports communications with Server 108, through Network 107. Client 100 supports the execution of a Client App 101, which, for example, may be an Internet-based application that performs communications using Internet Services 103, such as a web browser.

Internet Services 103*a* has been configured to direct one or more requests for Server 108 to a proxy. The proxy may, for example, be another process local to Client 100, but it may be any execution context, such as another thread in the same process as Client App 101 or a remote process on a computer that is perhaps more reliably accessible from the Client 100 than Server 108, such as another computer on the same local area network as Client 100. The proxy may, for example, receive protocol requests via Proxy Intercept 109 and direct them to Server 108 (via Internet Services 103*b*), Cache 104, or any combination of the two.

Internet Services 103*a* may be the same software module as Internet Services 103*b*, since Cache 104 may choose to use any appropriate Internet services layer to access the Internet, including the one used by Client App 101. Requests directed to Cache 104 may be handled using responses stored locally on Storage 106. Access to Storage 106 may be, for example, through Storage Services 105, which is a common storage access layer, such as a filesystem, database, or a combination thereof.

2.3 Other Interception Methods

Another method to intercept requests from the client to the server is to trap events within the application client. This may be done, for example, through an API provided by the application client to support 3rd-party extensions, also commonly called "plug-ins." For example, many web browsers support a plug-in API, such as Internet Explorer's Browser Helper Object interface; similarly, Microsoft applications, such as Microsoft Word, support plug-ins using the Component Object Model (COM) interface. These application-level APIs generally support the ability for the plug-in to register a function that is called when a particular application-level event occurs, such as when a request to a server (also referred to as "navigation") is being made.

Another method to intercept requests is to trap events on the document loaded within the application client. For example, web browsers generally implement an interface called the W3C Document Object Model (DOM), which allows HTML/XML documents to define functionality, such as the logic to execute when a user clicks on a document element, such as a link or button. The DOM supports "listeners" for events on these document elements, and a listener implements a handler function that is called when that event occurs. For example, requests issued when a link is clicked can be intercepted by registering a JavaScript function for a click event on that link. An event handler may be registered by dynamically modifying the representation of the document in memory (that is, "injecting"), which may take place at a number of different points. For example, they may be injected by a proxy, such as in FIG. 2, by inserting a script block into an HTML document being requested. They may also be injected by a browser plug-in by setting the "onclick" property on the DOM element.

3 Processes

An aspect of the invention according to some embodiments is that Internet requests from multiple client applications can be transparently intercepted and serviced locally.

Figure 3:
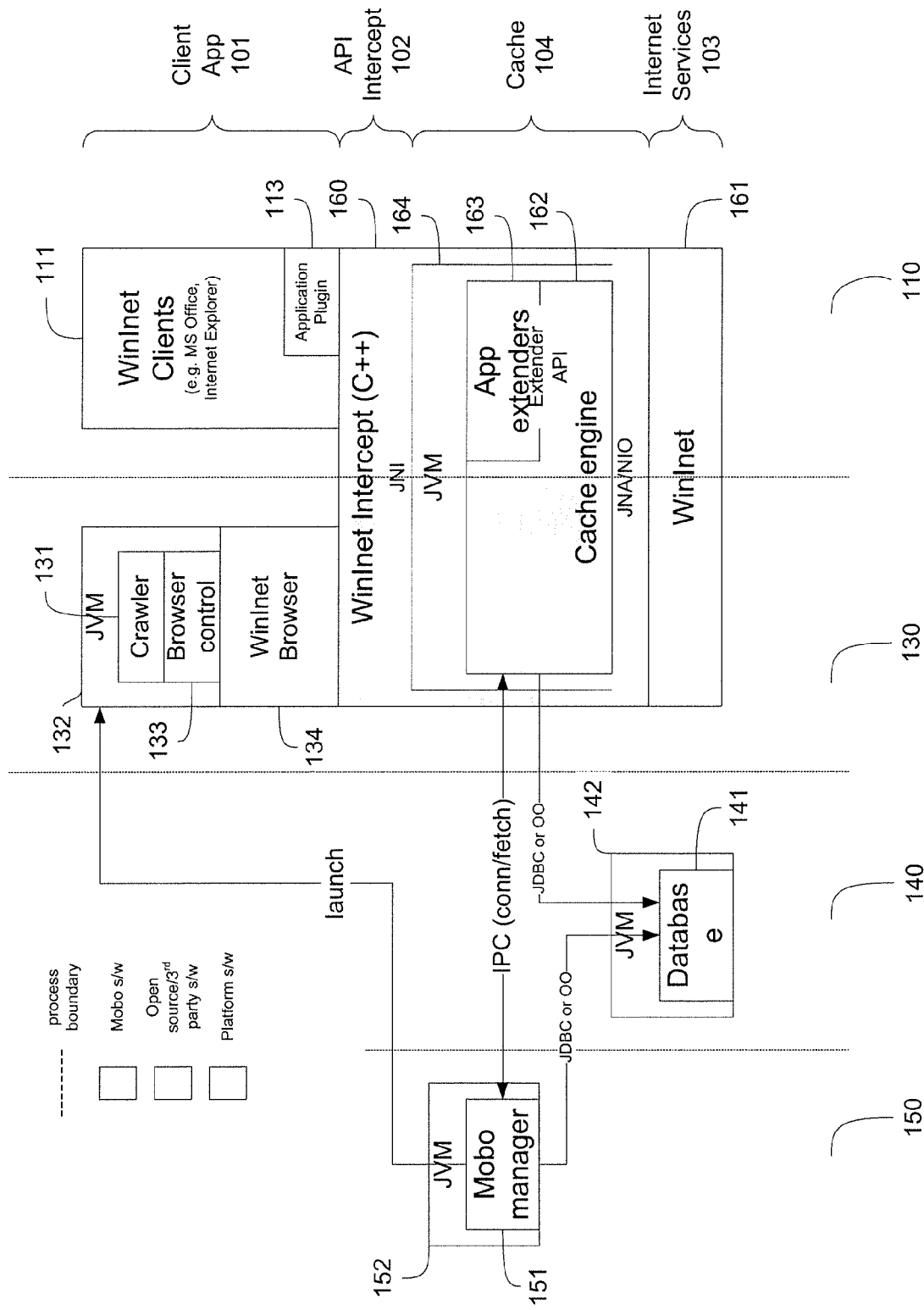
FIG. 3 is a software architecture diagram showing an embodiment of the key processes in an example system.

FIG. 3 is a software architecture diagram showing an embodiment of the key processes in an example system. This figure shows the software components that are most relevant to this embodiment, and it is understood by someone of ordinary skill that there are other software components that are not shown. There are four logically distinct processes shown, numbered as 110, 130, 140, and 150. For processes 110 and 130, software layers from FIG. 1 (e.g., 101, 102, 103, and 104) are shown, indicating how they map to the specific instances within this diagram.

Process 110 is running WinInet Client 111, such as Microsoft Word or Microsoft Internet Explorer, which is a type of Client App 101 that normally links to Microsoft's WinInet DLL, which is a type of Internet Services 103. WinInet Intercept 160 intercepts requests by WinInet Client 111, which allows it to redirect requests intended for WinInet 161 to Cache 104. WinInet Client 111 loads Application Plugin 113, which can be implemented as a COM Office addin for Microsoft Word or a browser helper object (BHO) for Microsoft Internet Explorer. The application plugin can provide access to Cache 104 from the client user interface, such as getting or setting cache contents or status. The application plugin can also serve to inject WinInet Intercept 160 to enable interception of function calls between WinInet Client 111 and WinInet 161. This allows Cache 104 to receive and handle Internet requests issued from WinInet Client 111.

The embodiment applies to any Client App 101 that accesses an Internet Services 103, such as Mozilla Firefox, which uses Mozilla Netlib for its Internet services. Basically, any application that accesses the Internet via the API of an Internet Services 103 can be intercepted by an API Intercept 102, which can then redirect its Internet requests to Cache 104. A Client App 101 that access a different Internet Services 103 may use a different API Intercept 102 to enable interception.

Cache 104 may, for example, be common across applications, such as in Processes 110 and 130. Cache 104 may include Cache Engine 162, which in turn may include one or more software components providing application-generic functionality. Cache 104 may also include zero or more App Extenders 163, which logically extends Cache Engine 162 with application-specific functionality. In some embodiments, Cache Engine 162 may be Java software running inside Java Virtual Machine 164 (JVM), which enhances portability across different computing platforms. When it receives an Internet request, Cache Engine 162 may query the response data from storage, such as via Database 141, which may be accessed via a separate Process 140. Cache Engine 162 may also call App Extender 163 to assist with the request. If a valid response is found, Cache Engine 162 returns the response to the upper layer Client App 101, such as WinInet Client 111 in Process 110. Otherwise, Cache Engine 162 may cause the request to be issued to the server, which may take place through another context, such as via Crawler Process 130.

While Cache 104 runs on the client computer in the embodiment of FIG. 3, Cache 104 may also run on one or more separate computing systems, such as one with better availability or more bandwidth to the client computer than that of the server. For example, Cache 104 may run on another platform (e.g., server, phone, etc.) on the same or nearby local area network (e.g., Ethernet, WiFi, Bluetooth), thus allowing Cache 104 to provide improved availability and/or performance characteristics to the web application.

An aspect of the invention according to some embodiments is to support application-specific customization, through the support of 3rd-party software. There are a number of direct and indirect ways that external software can assist with request handling. For example, direct calls to application-specific software can be supported through external functions that were linked with Cache Engine 162. As another example, indirect calls with application-specific software can be supported through inter-process communications, such as message queues or pipes, that are opened by Cache Engine 162. The calls to external software may be conditional, such as qualified based on the request parameters. For example, calls to external software can be set by configuration parameters on Cache Engine 162, such as configuration parameters that specify patterns to match against the request headers before a particular call is performed.

Process 130 is running a crawler 131, which supports communications with the servers, often in the background (i.e., not visible to the user). The crawler may be a Java software component miming inside JVM 132, which may be the same JVM instance as 164. The crawler requests server resources by programmatically controlling an Internet-based Client App 101, such as a WinInet Browser 134, which may be the same or similar to WinInet Browser 111. WinInet Browser 134 can be controlled programmatically through a Browser Control layer 133, such as Web Application Testing in Java (Watij) or TeamDev JExplorer. Also similar to Process 110, Process 130 injects WinINet Intercept 160 (e.g., Crawler 131 calls LoadLibrary via JNI) to enable the interception of Internet requests from WinInet Browser 134.

Process 130 may differ from Process 110 in that Internet requests to Cache 104 are transmitted to the server, such as when a cached version is missing or needs to be refreshed; these requests are passed by WinInet Intercept 160 through to WinInet 161 so that they may be handled by the server. Cache 104 may support this behavior by providing a different operational mode (than that of Process 11), which may be explicitly requested by Crawler 131, such as through a call made during initialization time. Any new response data received from the server may be stored to Database 141, so that it may be persisted and made accessible, such as by Process 110.

Some embodiments may access storage through Database 141, which may consist of a filesystem, database, or combination thereof. Database 141 may be accessed within the same process as that of Cache 104, or it may be provided by a separate context or process, such as Process 140. In some embodiments, Process 140 is running Database 141, which manages access to the locally cached server content. Database 141 may be a Java software component running inside JVM 142. Other processes may retrieve or store data from the database by communicating with Process 140 using common inter-process communications (IPC) mechanisms, such as Java remote method invocation (RMI) or Java database connectivity (JDBC). Database 141 may also run in-process with Client Process 101, such as within Processes 110 or 130; for example, this may be the case if Database 141 supports inter-process serialization of shared data.

Process 150 is running a Manager 151, which handles miscellaneous control and management tasks, such as launching crawlers and watching for changes in server connectivity. Manager 151 may be a Java software component running inside JVM 152. Other processes may access the services provided by manager 151 by using common IPC mechanisms, such Java RMI.

4 Setup and Initialization

In some embodiments, client applications 101 make use of WinINet Intercept 160 to perform API interception.

Figure 4:
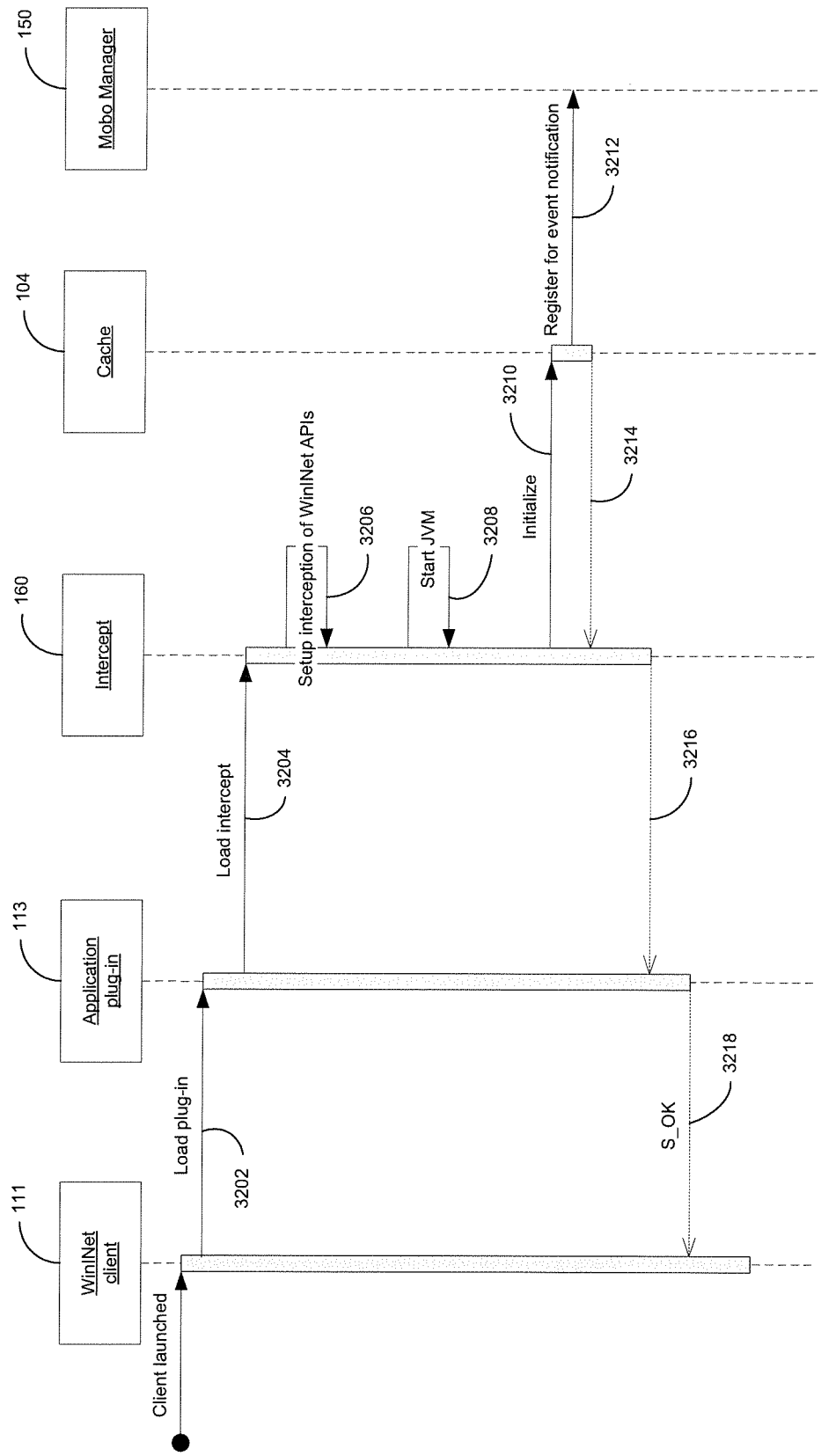
FIG. 4 shows a Unified Modeling Language (UML) sequence diagram of an embodiment for initializing the system with a WinINet Client using an application plugin to inject WinINet Intercept.

FIG. 4 shows a UML sequence diagram of an embodiment for initializing the system with a WinINet Client 111 using an application plugin 113 to inject WinINet Intercept 160. In this embodiment, when WinINet client 111 is Microsoft Internet Explorer, plugin 113 can be implemented as a browser helper object (BHO), which implements specific interfaces defined by Microsoft, such as IObjectWithSite and DWebBrowserEvents2. Also, in this embodiment, when WinINet client 111 is a Microsoft Office Application, such as Microsoft Word, plugin 113 can be implemented as a COM Office addin, which implements specific interfaces defined by Microsoft, such as IDTExtensibility2. Other embodiments can include using different applications and their appropriate plug-in technology, such as the Mozilla Firefox browser using Firefox Extensions.

When the client is launched, it will load 3202 application plugin 113. Application plugin 113 will then inject 3204 WinINet Intercept 160. WinINet Intercept 160 can be implemented in any manner that the application allows for extensibility, such as a DLL that can be loaded into the process, such as by using the LoadLibrary API.

In this embodiment, intercept 160 uses dynamic intercept injection at step 3206 to set up the interception of the WinINet APIs. Other embodiments could use other techniques such as using a different API to perform the WinINet API interception, such as madCodeHook, or using a replacement DLL that implements wrapper functions for WinINet APIs.

At step 3208, Intercept 160 starts the Java Virtual Machine (JVM). This embodiment uses Java for the implementation of the cache and interoperates with Java code using the Java Native Interface (JNI) API. Other embodiments could use any other language to implement the cache, such as C, C++ or a Microsoft .NET language such as C# or Visual Basic. An advantage of implementing the cache using Java is that it allows the cache to run on any environment that can run a Java Virtual Machine.

At step 3210, the intercept calls an initialization method on cache 104. In this embodiment, at step 212, the initialization will register the cache with a manager 150 to receive notifications of events from the manager. This allows the cache to be aware of things such as changes to server connectivity that the manager detects. In this embodiment, the cache and manager can communicate using some IPC mechanism, such as pipes or the Java Remote Method Invocation (RMI) API.

Figure 5:
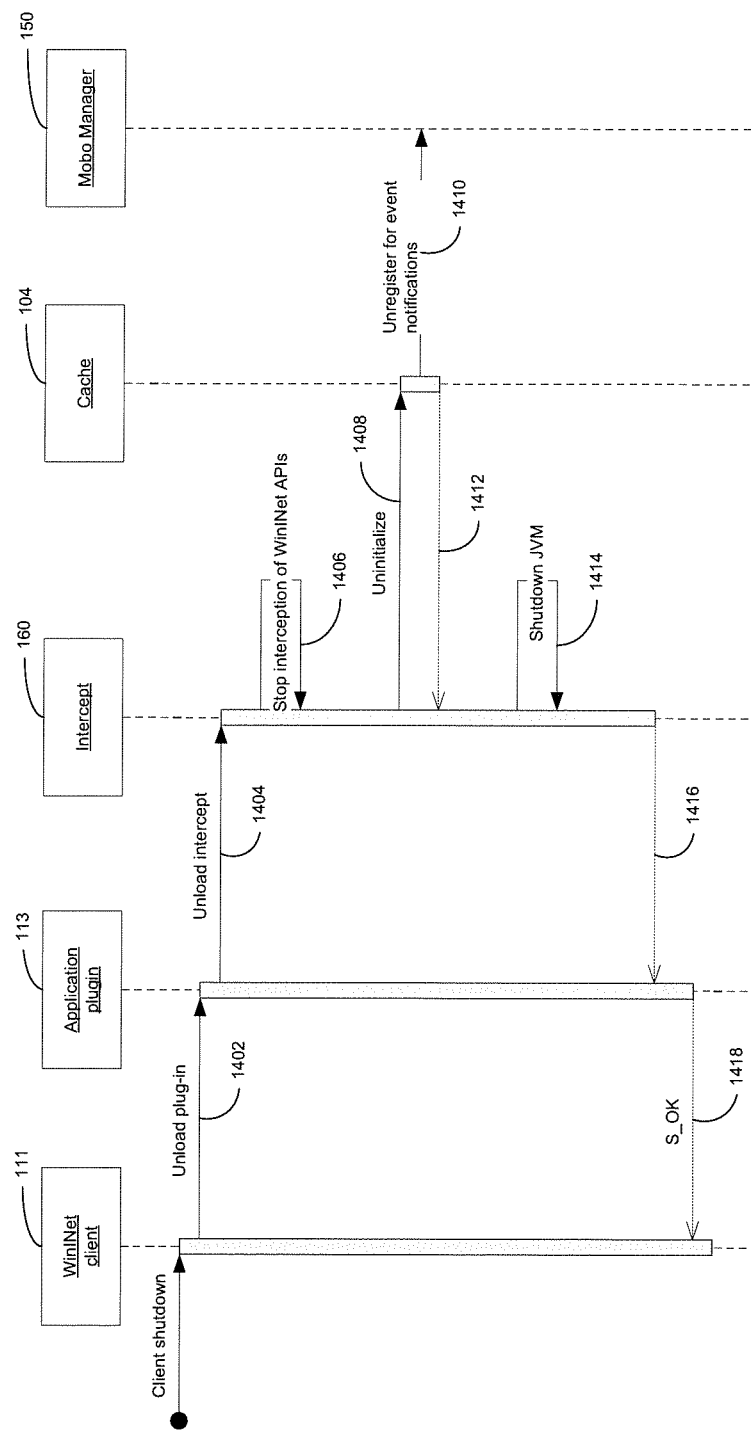
FIG. 5 shows a UML sequence diagram of an embodiment for uninitializing the system with a WinINet client.

FIG. 5 shows a UML sequence diagram of an embodiment for uninitializing the system with a WinINet client 111. When client 111 is going to shut down, plugin 113 is unloaded 1402. Here any cleanup and uninitialization can be done.

At step 1404, plugin 113 will unload WinINet Intercept 160, such as by using the FreeLibrary API. The intercept stops intercepting WinINet API calls at 1406. In this embodiment, Intercept 160 uses dynamic intercept injection to intercept WinINet APIs. Other embodiments could use other techniques such as using a different API to perform the WinInet API interception, such as madCodeHook, or using a replacement DLL that implements wrapper functions for WinINet APIs.

At step 1408, intercept 160 calls an uninitialization method on cache 104. In this embodiment, at step 1410, the uninitialization will unregister the cache with a manager 150 to stop receiving notifications of events from the manager. This informs the manager that it no longer needs to inform that client application of events, such as changes to server availability. In this embodiment, the cache and manager can communicate using some IPC mechanism, such as pipes or the Java Remote Method Invocation (RMI) API.

Finally, at step 1414, the JVM is stopped. In this embodiment, the cache is implemented using Java. After the cache is uninitialized, no more Java code is invoked and so the JVM is no longer needed. Other embodiments could use any other language to implement the cache, such as C, C++ or a Microsoft .NET language such as C# or Visual Basic. An advantage of implementing the cache using Java is that it allows the cache to run on any environment that can run a Java Virtual Machine.

An aspect of the invention according to some embodiments is controlling which servers (or more precisely, the server applications) are cached by the system. By controlling what is cached by the system, a number of advantages are gained. For example, this provides additional manageability of the cache, such as allowing the user to specify different storage usage limits for each server application or different levels of asynchronous operation for each server application. As another example, this provides additional manageability of other aspects of the system, such as allowing it to enable connectivity testing or crawling of the cache-enabled servers. One embodiment allows client requests to servers that are not configured to pass through directly to the server. Another aspect of configuring a server for caching is specifying the user credentials to associate with the server. Storing the user credentials serves several purposes: allowing authenticated virtual sessions from a client application to the cache and allowing a crawler to create authenticated real sessions with a server.

There are a number of different ways that the system can enable or disable servers for caching For example, the system can operate inclusively, such that only explicitly enabled or "white listed" servers are enabled for caching. In addition, the system can operate exclusively, such that all servers are enabled except those explicitly disabled or "black listed." Further, these servers may be configured manually, such as via user input, listed in a configuration file, or hardcoded (e.g., into Cache 104 or Client App 101). The servers can also be configured automatically, such as based on user activity (e.g., top 10 most visited web sites) or self-enabled by the server (e.g., when a user browses a web site, it reports itself as being cacheable via the presence of a resource at a well-known URL).

Figure 6:
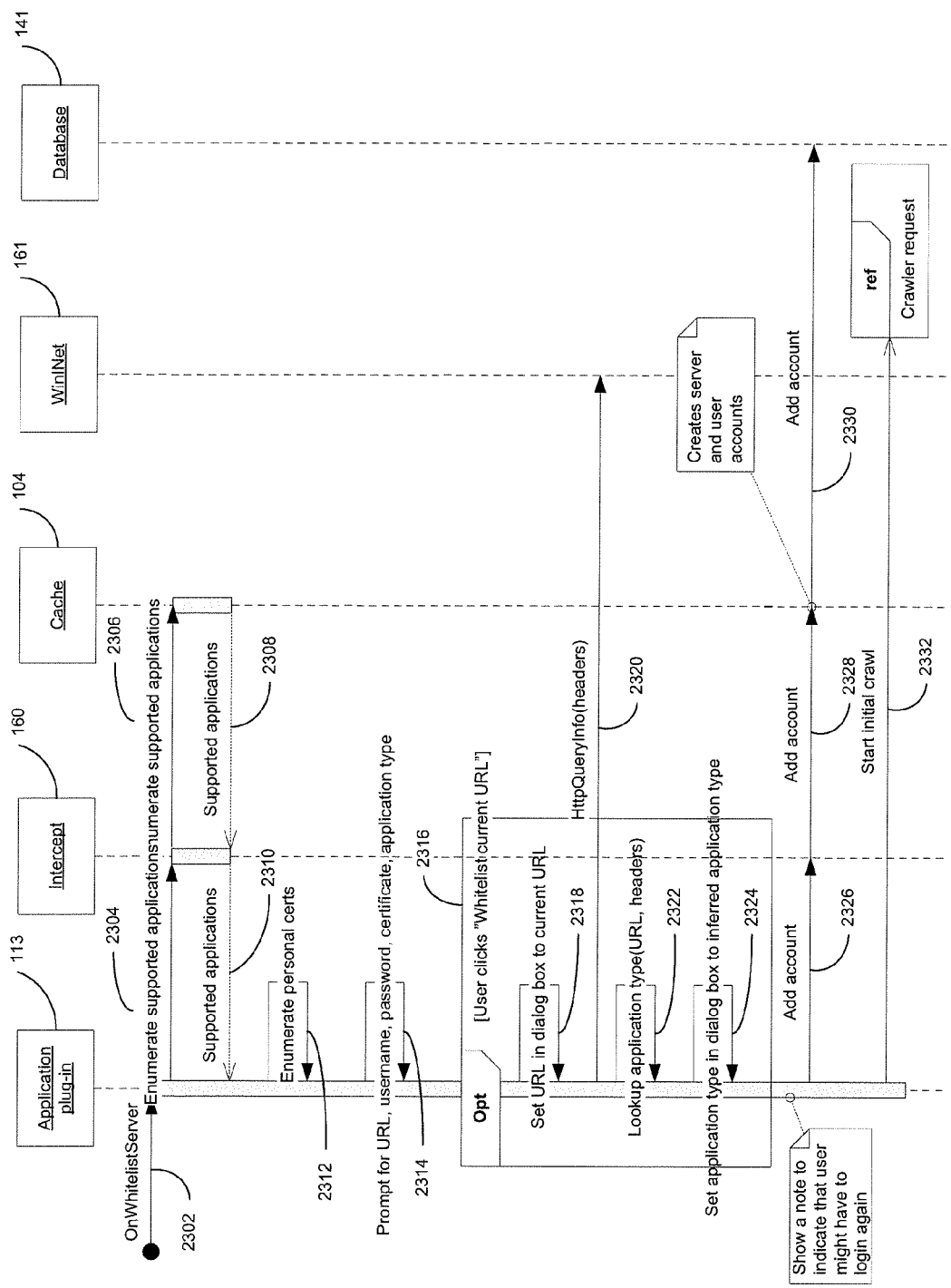
FIG. 6 shows a UML sequence diagram of an embodiment for configuring, or "white listing," a server for interception.

FIG. 6 shows a UML sequence diagram of an embodiment for configuring, or "white listing," a server for caching. A request to white list a server is sent 2302 to a browser plug-in 113. In this embodiment, the browser plug-in may implement a toolbar that provides the user interface that allows the user make the white list server request. In other embodiments, the configuration may be entered in other ways, such as reading a configuration file containing the server information or using the Windows registry to store configuration information. Still other embodiments might carry this automated white listing further. For instance, a user's browser "Favorites" or "History" file could be used to decide which servers to white list. Thus, in some embodiments, the user's white listing configuration may be completely automated.

At step 2304, the plug-in requests the list of server application types that cache 104 supports. In this embodiment, the cache can use the application type to control certain aspects of the logic, such as the authentication method to use with the server.

To support HTTPS authentication that makes use of client-site certificates, the browser plug-in will enumerate 2312 the certificates configured in the browser. In this embodiment, this can be done using the Windows Crypto APIs in the Internet Explorer browser, but in another embodiment, such as using the FireFox browser, the certificate database can be accessed using the Network Security Services (NSS) APIs.

At step 2314, the browser plug-in will display a dialog box that will allow the user to specify information about the server to white list. The dialog box could have input fields to allow the user to specify things like the name of the resource to white list, such as the URL of the server, any credentials needed to access the resource, such as the username and password and client-side certificate, if applicable, to use to authenticate to the server, and the application type of the server.

If the user had selected 2316 an option in the toolbar to white list the current URL, then the dialog box will be pre-populated with default information based on the current browser context, such as pre-populating 2318 the URL input field with the URL of the current document. Next, the browser plug-in queries 2320 the HTTP headers for information that could identify the application that the URL came from. For example, the Microsoft Sharepoint server sends an HTTP response header that contains the string "MicrosoftSharePointTeamServices:" followed by a version number (e.g., "12.0.0.4518") which can be used to identify the document as being served from a Sharepoint server.

If the browser plug-in is able to find 2322 a header that it can use to identify the application, then it will set 2324 the application type input field to the identified application type. In another embodiment, other information could be used to try to identify the application, such as pattern matching against the URL path string. These steps set default values in the input fields in the dialog box and can still be overridden by the user.

After the user submits the request to white list the server, the browser plug-in makes a request 2326 to add a server account to the cache, which will configure the URL as the basis for requests that should be intercepted and a user account that will contain the user credentials associated with the server account.

Next, the system starts 2332 a process that will populate the cache with content from the server that was just white listed. This provides the advantage of allowing the system to verify the given user credentials with the server and build a pre-emptive cache of server content while the client is presumed to have online access to the server.

5 Protocol Requests

Some embodiments of the invention may process protocol-level requests through a caching layer, allowing them to determine when and how to serve those requests, such as either using a local cache of responses or retrieving the response from the server.

Figure 7:
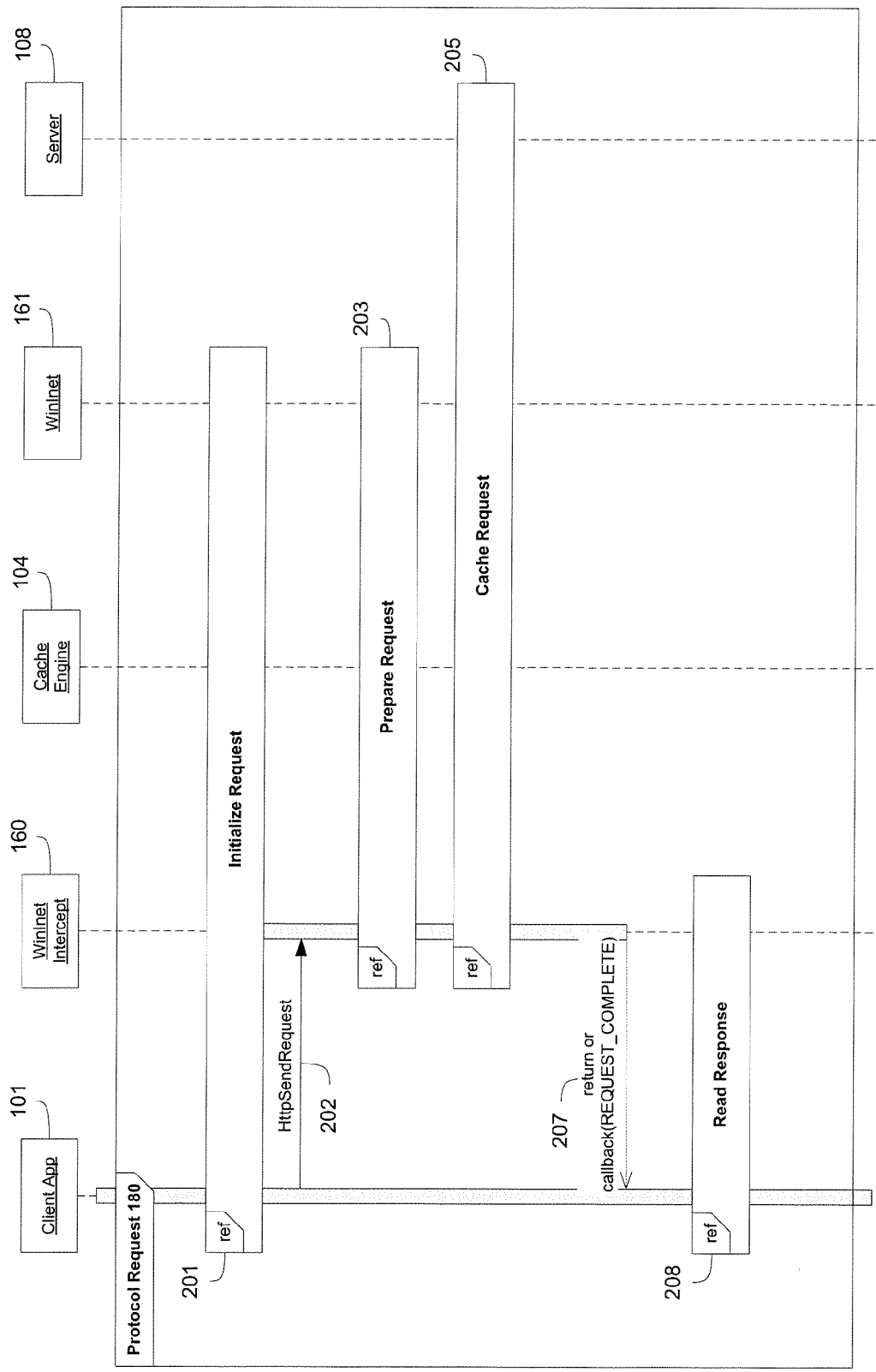
FIG. 7 is a UML sequence diagram showing an embodiment for the handling of an HTTP request issued from a client application through the WinInet API.

FIG. 7 is a UML sequence diagram showing an embodiment for the handling of an HTTP request issued from a client application through the WinInet API. The approach described here may be similarly applied to Internet access though other Internet services layers, such as Firefox Netlib, or other application-level protocols, such as FTP.

Referring now to FIG. 7, Client App 101 is an application, such as Microsoft Internet Explorer, that issues HTTP requests, such as when a user or crawler accesses a hypertext link. Prior to the invention, these requests were typically handled through calls into WinInet 161; but, according to some embodiments of the invention, these requests are now intercepted by WinInet Intercept 160 and redirected to Cache 104.

For each request, Client App 101 calls WinInet API functions to initialize the request, so that the correct request can be identified across WinInet calls. Request initialization takes place in the UML frame Initialize Request 201.

When the request has been initialized, Client App 101 proceeds to sending the request. For HTTP requests, this is supported by the WinInet API function, HttpSendRequest. Instead of being sent out to the server, the request is intercepted by WinInet Intercept 160 at step 202, and will be redirected to Cache 104, where it can be handled locally.

Figure 9:
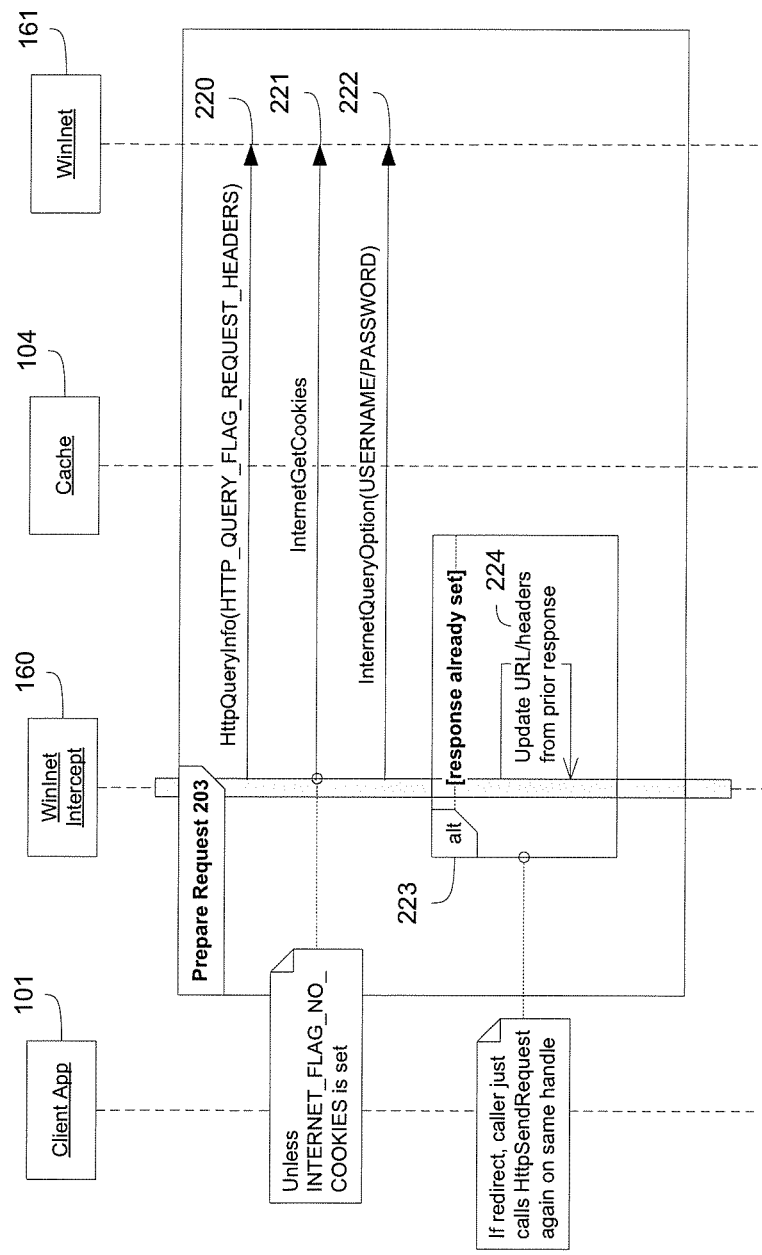
FIG. 9 is a UML sequence diagram for the UML frame Prepare Request, which is an embodiment for how an intercepted WinInet request is prepared prior to submitting to the Cache.

Upon receiving a request, WinInet Intercept 160 first prepares the request before calling Cache 104, which is handled in UML frame Prepare Request 203 (see FIG. 9). Next, WinInet Intercept 160 issues the request to Cache 104, which will process it and provide a response, as described in detail in FIG. 11 (UML frame Cache Request 205).

Upon completion of the request, WinInet Intercept 160 indicates completion to Client App 101, at step 207, via a return from a synchronous call to HttpSendRequest or a callback function (such as for an asynchronous call). Client App 101 obtains status and response data for the request in UML frame Read Response 208 (see FIG. 10).

5.1 API Context

An Internet services layer, such as WinInet, often provides a number of capabilities that are related to handling Internet requests. For example, WinInet automatically manages HTTP cookies which are strings sent by the web server in response messages to the web client, who then sends them back in subsequent requests to that server. This functionality, along with other client-side protocol state management, is typically provided by the Internet services layer, since it is needed across multiple client applications using the same application-level network protocol. It is often desirable to leverage this functionality provided by the Internet services layer, even when its calls are being intercepted.

Figure 8:
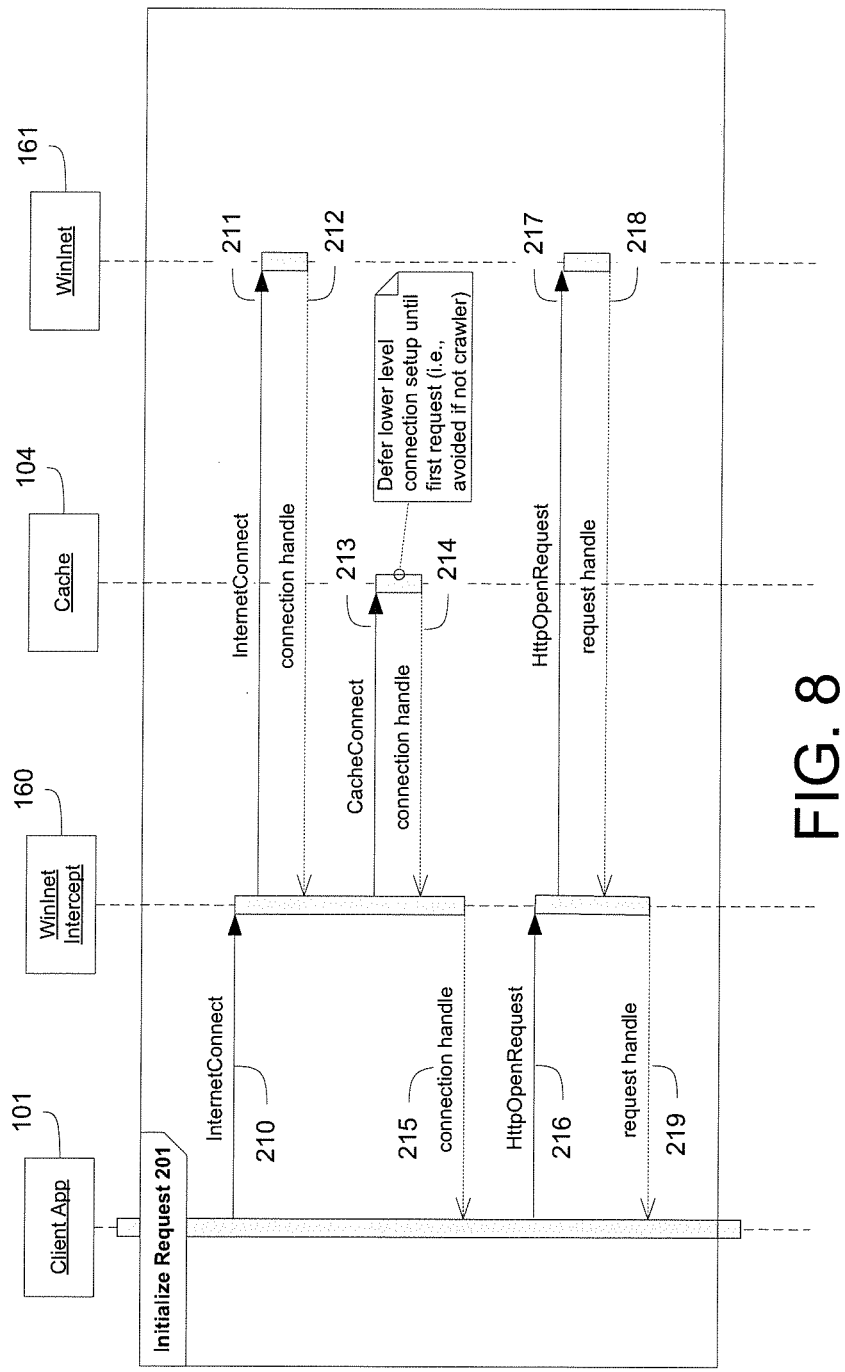
FIG. 8 is a UML sequence diagram showing an embodiment for the handling of the calls used to initialize WinInet requests.

FIG. 8 is a UML sequence diagram showing an embodiment for the handling of the calls used to initialize WinInet requests. These and other calls intercepted by WinInet Intercept 160 may be passed through to WinInet 161, so that WinInet 161 can maintain the client's protocol state, instead of duplicating the functionality, such as within WinInet Intercept 160.

The first step of initializing a request is to establish a connection handle that identifies a particular server, which is supported using the WinInet API function, InternetConnect. The call to InternetConnect is intercepted by WinInet Intercept 160 at step 210, and passed through to WinInet 161 via InternetConnect 211. If successful, WinInet 161 returns a connection handle to WinInet Intercept 160 at step 212. WinInet Intercept 160 sets the server in step 213, since this cannot be subsequently queried from the current WinInet API, and it then returns a connection handle to Client App 101. Once a connection handle is established, Client App 101 may reuse it across multiple requests to the same server.

The next step of initializing a request is to establish a request handle that identifies a particular operation on a particular Internet resource. For HTTP, this is supported using the WinInet API function, HttpOpenRequest, to specify the HTTP method and URL. The call to HttpOpenRequest is intercepted by WinInet Intercept 160 at step 215, and passed through to WinInet 161 via HttpOpenRequest 216. If successful WinInet 161 returns a request handle to WinInet Intercept 160 at step 218, which then returns a request handle to Client App 101 at step 219. Note that WinInet 161 maintains the association of the request handle with its method and URL at step 217, as this can be subsequently queried from WinInet 160.

FIG. 9 is a UML sequence diagram for the UML frame Prepare Request 203, which is an embodiment for how an intercepted WinInet request is prepared prior to submitting to Cache 104. This preparation includes obtaining any additional information the client needs to send for the request, including the request headers, obtaining any state information set by the server that it expects in subsequent requests, including HTTP cookies, and any authentication information needed to access the server, including the user's credentials. The call to HttpQueryInfo 220 obtains the request's headers (e.g., set by the call to HttpOpenRequest), the call to InternetGetCookies 221 obtains its cookies (e.g., set by previously completed requests), and the call to InternetQueryOption 222 obtains the user's authentication information (e.g., set by a login prompt).

Figure 10:
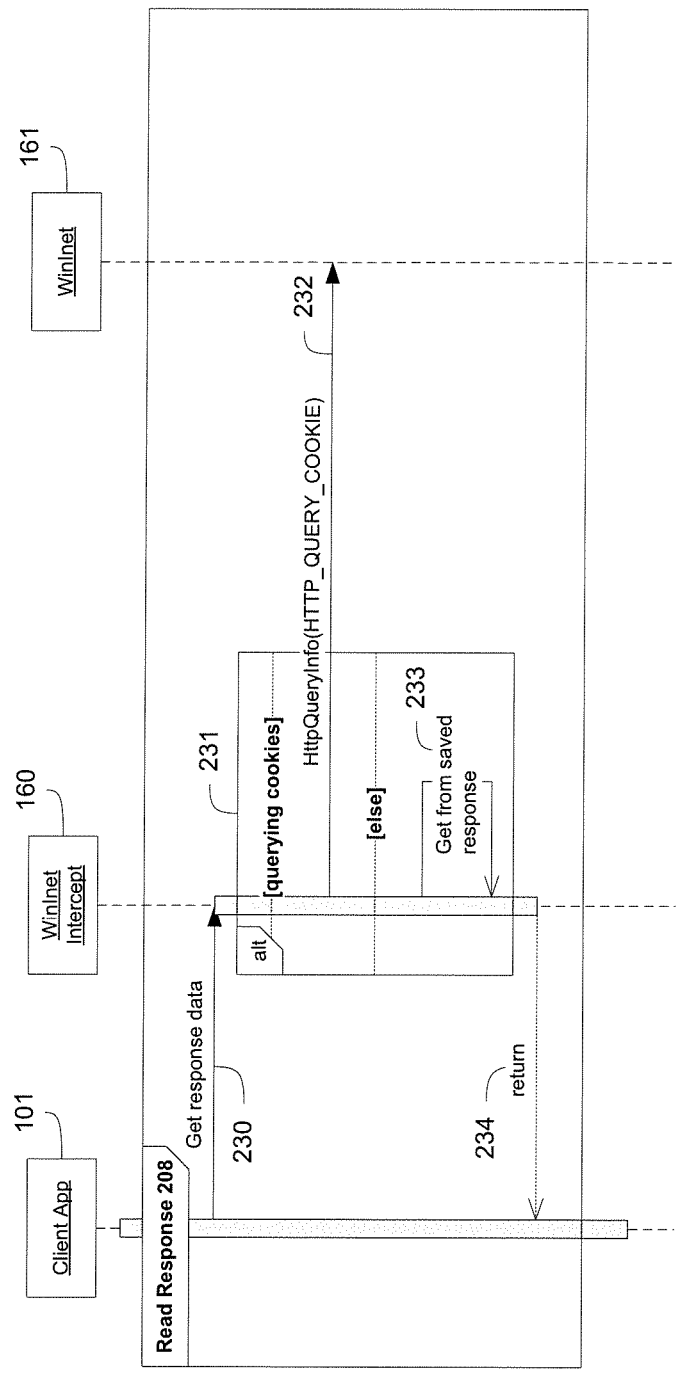
FIG. 10 is a UML sequence diagram for the UML frame Read Response, which is an embodiment for how a Client App may obtain the response for an intercepted WinInet request.

FIG. 10 is a UML sequence diagram for the UML frame Read Response 208, which is an embodiment for how a Client App 101 may obtain the response for an intercepted WinInet request. This diagram only shows how a few WinInet calls may be handled, and there may be other calls, including functions not shown here, that an application may perform to access response information for a request.

Referring now to FIG. 10, when Client App 101 calls WinInet Intercept 160 at step 230 to retrieve the response data, it is intercepted by WinInet Intercept 160. A client application may make multiple WinInet calls to obtain the various parts of the response header information, such as calling HttpQueryInfo for response headers and InternetReadFile for the response body. WinInet Intercept 160 decides at step 231 whether to handle the call or pass it through to WinInet 161. WinInet Intercept 160 may, for example, handle the call by using the response returned from Cache 104 that has been associated with the request handle. An exception is when Client App 101 is querying for cookies, since they are typically maintained by WinInet, which is used to keep cookies updated across multiple requests; if so, then the cookies are queried from WinInet 161 at step 232. Otherwise, WinInet Intercept 160 selects the requested data from the response at step 233. The response data requested by the caller is then returned at step 234.

5.2 Request Types

An aspect of the invention according to some embodiments is to improve the continuity of access to server content, even when access to the server is disrupted or lost. The embodiments support this by decoupling some or all requests between the user and the server, which means that requests initiated by the user are handled virtually, possibly without any communication with the server. These virtual requests may be, for example, handled locally using responses stored on local storage. Communication with the server may be performed in a separate request context/handle, possibly even in a different thread or process. This approach insulates the user's requests from connectivity changes since they are not the same as requests that go to the server.

Figure 11:
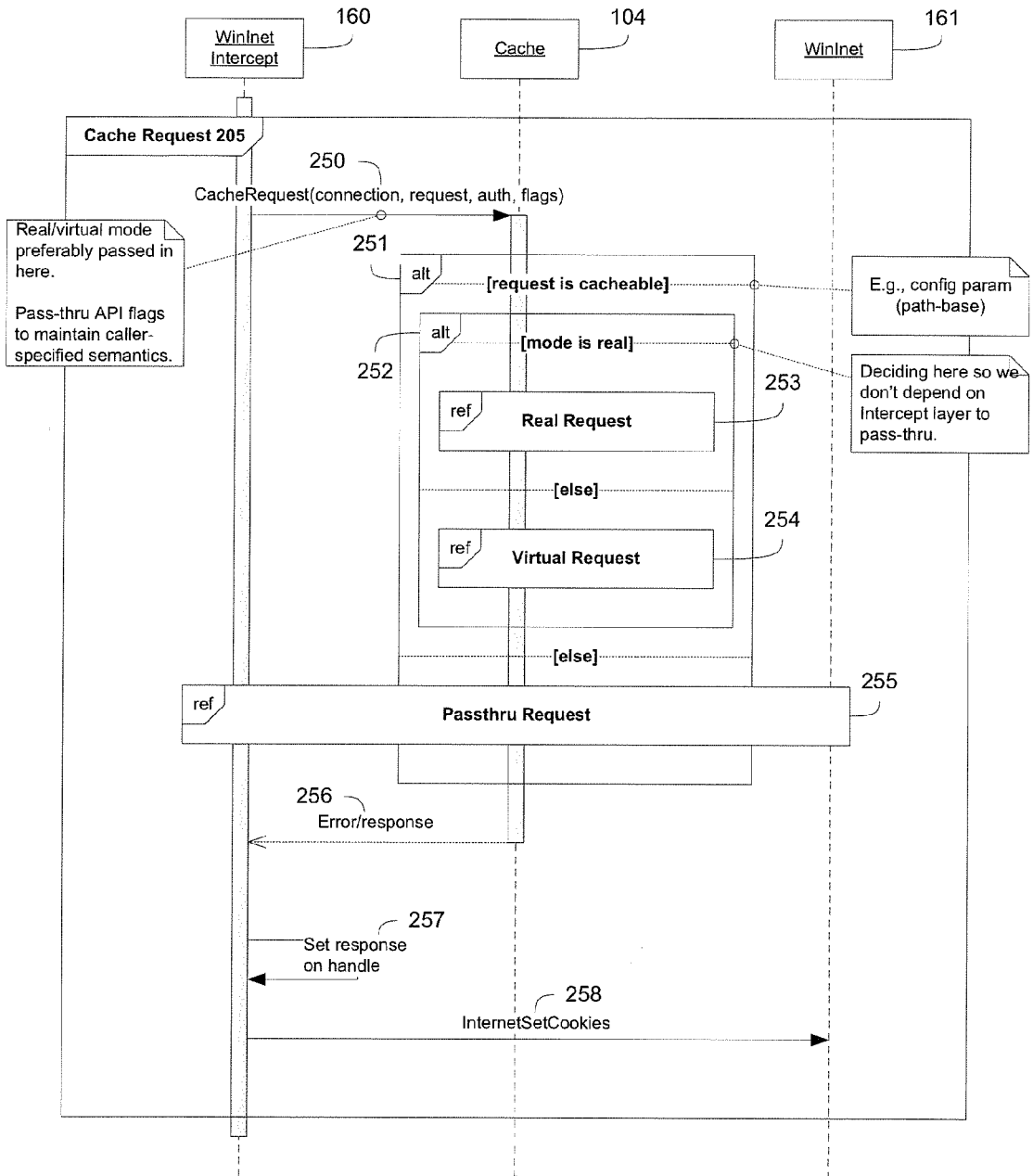
FIG. 11 is a UML sequence diagram for the UML frame Cache Request, which is an embodiment for the handling of a request by the Cache, such as an HTTP request issued from a web browser.

FIG. 11 is a UML sequence diagram for the UML frame Cache Request 205, which is an embodiment for the handling of a request by Cache 104, such as an HTTP request issued from a web browser.

Referring now to FIG. 11, the request is issued to Cache 104 by calling CacheRequest 250. Upon receiving a request, Cache 104 must decide whether to handle it at step 251, based on factors such as whether it can be stored in the cache (e.g., cached response for a read operation or pending request for write operation). For example, this decision can be based on whether or not the URL for the resource falls within the set that may be cached, such as by comparing against one or more base paths that are configured for caching. If Cache 104 decides to handle it, it proceeds to step 252. Otherwise, it passes the request through to the server, which may be handled directly by Cache Engine as described in FIG. 26 (UML frame Passthru Request 255).

An aspect of the invention according to some embodiments is that the resources contained within a page can also be automatically cached, including those originating from an "outside" domain that is different from that of the page itself, or from a "subdomain" of the domain being cached (e.g., "server1.mydomain.com" may be automatically included when "www.mydomain.com" is white-listed). For example, this is common for web pages that aggregate or "mash up" content from different web services onto a single page, possibly in a customizable manner where the various web content can be added or removed from that page. To accommodate this case, Cache 104 tracks page boundaries and automatically allows caching of content accessed within the boundary of a cacheable page, including content from' outside domains. Cache 104 may use a request parameter, such as the "Referer" header in an HTTP request, as an indication of a resource's association with a particular page.

In other embodiments, Client App 101 may insert a custom request parameter, such as using either the "Pragma" or a proprietary header in an HTTP request, to more accurately indicate the page that "contains" a requested resource, since the Referer header does not differentiate between references (e.g., hyperlinks) and containment. A custom request parameter may be inserted seamlessly before the request is received by Cache 104, such as by Application Plugin 113 or WinInet Intercept 160. WinInet Client 111 may also, either alternatively or in combination with, notify Cache 104 of page transitions, such as through a function call triggered by a navigation event. For example, WinInet Client 111 may call Cache 104 whenever it receives a callback for BeforeNavigate( ) to indicate transition to a new containing page; as long as the containing page is cacheable, any resources subsequently requested while WinInet Client 111 is still on that containing page will also be cacheable.

At step 252, Cache 104 decides whether to process the request as a virtual or real one. Virtual requests may be, for example, issued by a user application context, such as a web browser process interacting with the user, which are handled locally, such as using cached responses. Real requests may be, for example, issued by a separate application context, such as a crawler running in the background, which handles issuing any requests that need to go to the server, possibly including those needed to service virtual requests issued by the user. The operational mode may be specified for a request either implicitly (e.g., Crawler 131 set Cache 104 in "real mode" via initialization-time downcall, dependent on connectivity state/quality) or explicitly (e.g., via a HTTP header inserted by Crawler 131 or WinInet Intercept 160, configured by domain/URL/etc.).

Figure 22:
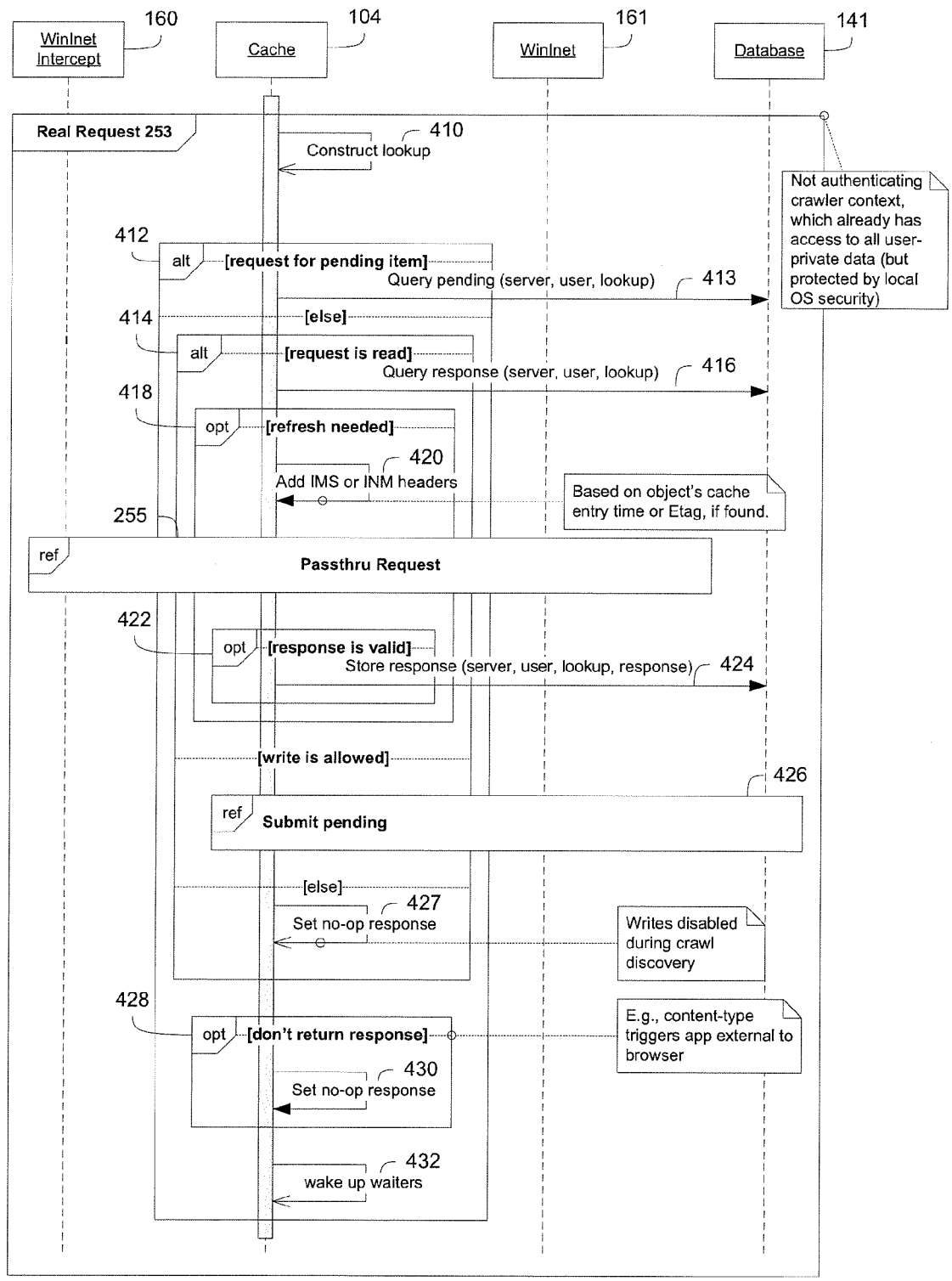
FIG. 22 is a UML sequence diagram for the UML frame Real Request, which is an embodiment for the handling of a real request by the Cache, such as a request received from a crawler.

If the request came from the crawler, the request is handled as a real request in FIG. 22 (UML frame Real Request 253). Otherwise, the request is handled as a virtual request in the UML frame Virtual Request 254 (see FIG. 12).

Upon completion of the request, the response is returned to WinInet 160 at step 256. The resulting response is then associated with the request at step 257, so that it may be accessed by Client App 101 through subsequent WinInet API functions. WinInet Intercept 160 will also update the API context being maintained by WinInet 161, such as calling InternetSetCookies at step 258 to update the cookie state.

6 Virtual Requests

A virtual request is generally considered to be a request that may be preferably handled without direct interaction with the server and preferably in a manner that is transparent to the client application. In general, requests received from an application that is interactive with a user is processed as a virtual request, such that it is handled within Cache 104, which provides a response to Client App 101 that is virtually equivalent to a direct response from Server 108. These responses may also be dynamically constructed, either in whole or in part.

Figure 12:
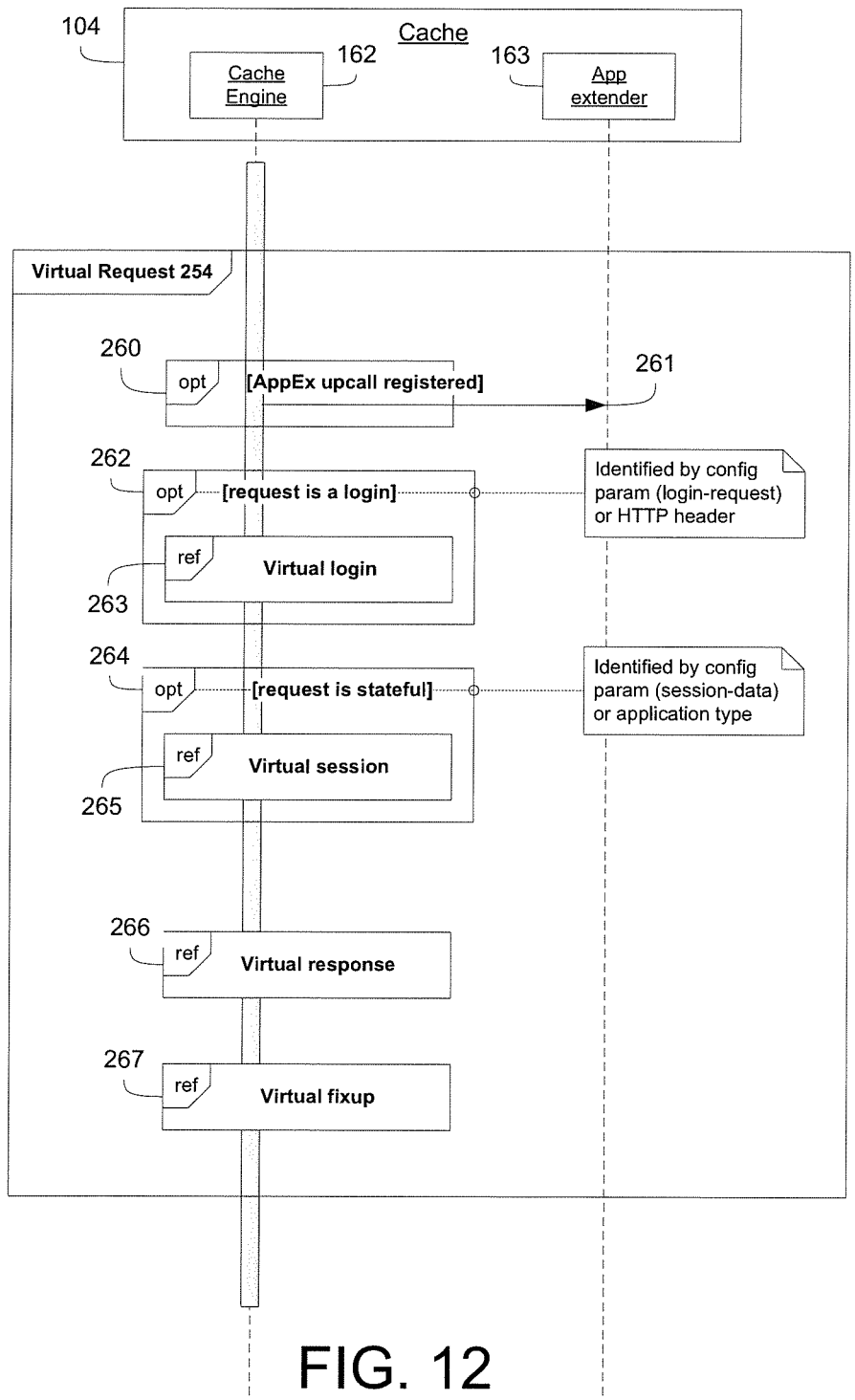
FIG. 12 is a UML sequence diagram for the UML frame Virtual Request, which is an embodiment for the handling of a virtual request by the Cache.

FIG. 12 is a UML sequence diagram for the UML frame Virtual Request 254, which is an embodiment for the handling of a virtual request by Cache 104.

Referring now to FIG. 12, at step 260, Cache Engine 162 determines whether the request should be passed to an App Extender 163, such as based on an URL pattern matching the request. If so, the request is passed to App Extender 163, which may perform any type of processing, such as modifying the request or updating its own state.

At step 262, Cache Engine 162 determines whether the request is for a login, such as based on the presence of login information in the request header or a match with a configuration parameter that identifies the login request of a particular web application. If so, Cache Engine 162 proceeds with login handling in UML frame Virtual Login 263 (see FIG. 13).

At step 264, Cache Engine 162 determines whether the request is stateful, such as when indicated by an application-specific configuration parameter. If so, Cache Engine 162 proceeds with session handling in FIG. 14 (UML frame Virtual Session 265).

At step 266, Cache Engine 162 performs response handling in UML frame Cache Response 266, which will set the response for this request if the data for the response is in the cache.

Figure 19:
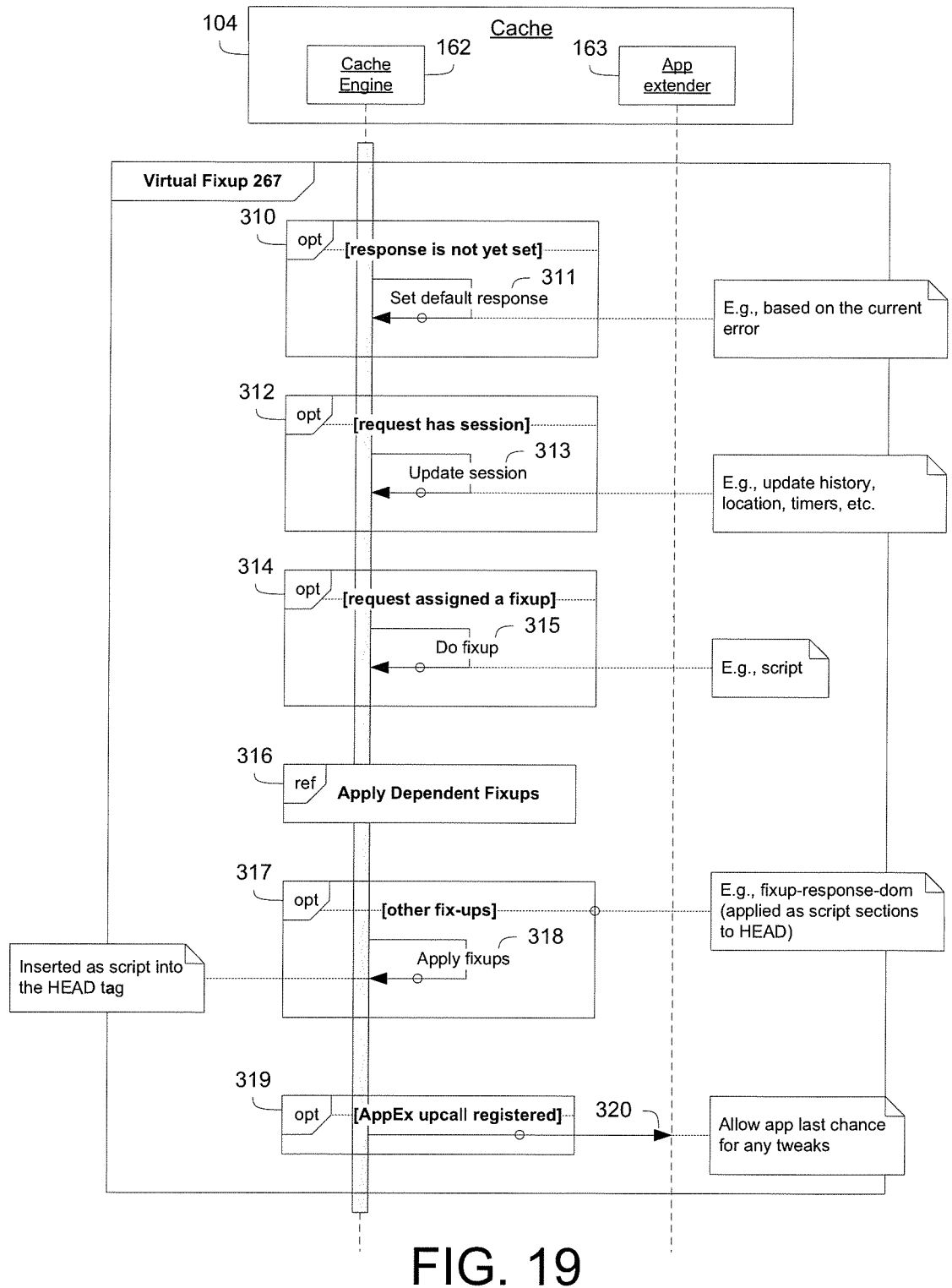
FIG. 19 is a UML sequence diagram for the UML frame Virtual Fixup, which is an embodiment of fixing up responses for a virtual request.

At step 267, Cache Engine 162 performs post-processing on the response in FIG. 19 (UML frame Virtual Fixup 267). Upon successful completion of Virtual Request 254, a response for the request is returned to WinInet Intercept 160. If Virtual Request 254 encounters a problem, an error is returned to WinInet Intercept 160 so it can be communicated to the user.

6.1 Virtual Authentication

An aspect of the invention according to some embodiments is to support the authentication of a user by the server, even if the server is not currently accessible or becomes subsequently inaccessible. Users may be, for example, authenticated by a server using authentication data carried within a request. Authentication may be supported directly by the application-level protocol, such as HTTP header authentication, or it may be private/proprietary to the application, such as sending authentication data within the body of an HTTP POST request. The embodiments provide the ability to virtually authenticate a user regardless of the authentication method, by obtaining the user's authentication data from the request and comparing it against the locally cached authentication data.

Figure 13:
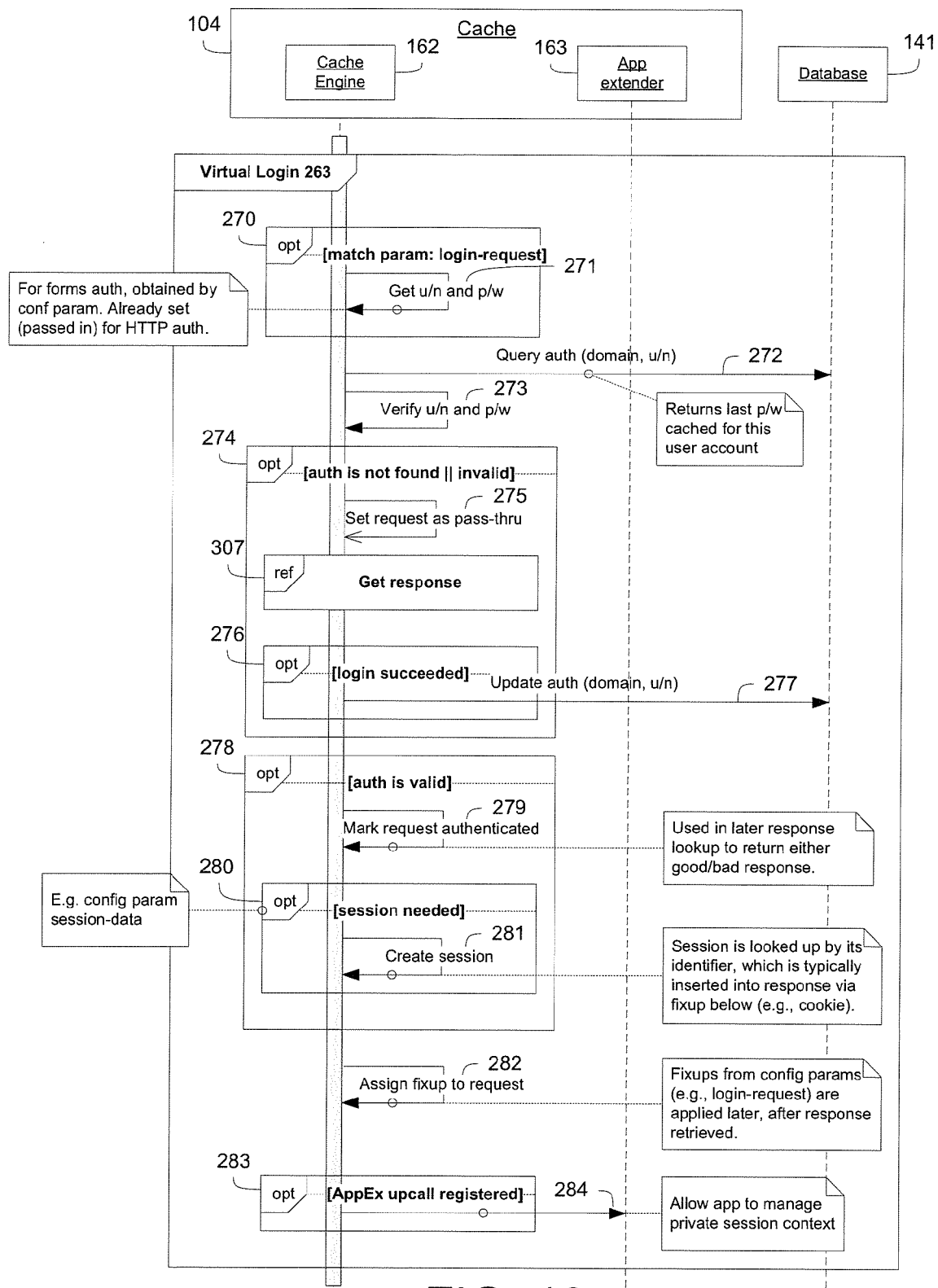
FIG. 13 is a UML sequence diagram for the UML frame Virtual Login, which is an embodiment for the handling of a virtual login request by the Cache.

FIG. 13 is a UML sequence diagram for the UML frame Virtual Login 263, which is an embodiment for the handling of a virtual login request by Cache 104. In general, a virtual request for a login is processed locally, so that actual communications with the server is no longer required.

Referring now to FIG. 13, at step 270, Cache Engine 162 extracts the user's authentication data from the login request, if necessary. Authentication data may be provided externally and passed into Cache Engine 162, such as when it is obtained by WinInet Intercept 160 during processing for UML frame Prepare Request 203 (see FIG. 9) or parsed by an App Extender at step 261 of FIG. 12. The authentication data may also be specified within the request parameters, such as within the body of an HTTP POST request. In this case, Cache Engine 162 may support application-specific parsing of the login request here at step 271, such as through a configuration parameter that identifies the appropriate input fields in an HTML form submission.

Cache Engine 162 validates the authentication data associated with the login request against the cached authentication data. Authentication data is cached similarly to other web content; in general, the most recent authentication data that was valid for real requests (to the server) are cached and used to authenticate virtual requests. At step 272, Cache Engine 162 queries for the current authentication data for this user from Database 141, such as his password, and then at step 273, compares the stored authentication data with what was obtained for this login request.

At step 274, Cache Engine 162 performs steps associated with an unsuccessful login, such as when no authentication data was provided (e.g., initial attempt to request authenticated content), the user types an incorrect username or password, or the locally cached authentication data is stale. In this case, embodiments of the invention may pass the login request through to allow the server to perform the authentication. At step 275, the request is set for pass-thru operation and the request then issued to the server, as described in FIG. 17 (UML frame Get Response 307). At step 276, if the server successfully authenticated the login request, then the user-supplied authentication data is treated as valid and is used to update the locally cached credentials at step 277.

At step 278, Cache Engine 162 performs steps associated with a successful login. At step 279, it marks the request as being authenticated, which may be required when the response is looked up later. At step 280, it may be necessary to create a session, such as when indicated by a configuration parameter. A session may be necessary to maintain user state, such as for applications that use proprietary authentication methods (e.g., session cookies) and/or support stateful requests (e.g., session timers). If so, a session is created at step 281 and the session state is initialized. The session has a unique identifier that may be returned in the response, such as by a fix-up assigned at step 282.

Responses for login requests may be modified before they are returned, such as when an application-specific configuration parameter specifies a regular expression or script to apply to the response body. For example, there may be a configuration parameter that inserts the session identifier as a cookie, or a configuration parameter that sets redirection URL based on an input field in the request body. If there are any fix-ups necessary, they are assigned to the request at step 282, so that it may be applied later after the response is looked up.

The virtual session may be persistent or volatile. If the login session is volatile, it is deleted when Cache 104 terminates, either implicitly (e.g., stored in memory) or explicitly (e.g., stored on disk); if persistent, the login session is deleted if and when it is designated to expire. The session expiration may vary according to the application. Correspondingly, the session identifier may need to include session expiration information, such as via the expiration date of the HTTP session cookie.

At step 283, Cache Engine 162 determines whether the request should be passed to an App Extender 163, such as based on an URL pattern matching the request. If so, the request is passed to App Extender 163 at step 284, which may perform additional processing, such as modifying the request or updating its own state.

6.1.1 Credentials Caching

An aspect of the invention according to some embodiments is that user credentials (e.g., username and password) are effectively cached locally at the client computer, so that user authentication may be performed seamlessly, even if the server is not accessible. The locally cached credentials may be used to verify user access to locally cached content (for virtual requests), as well as to authenticate to the real server (for real requests).

In general, the embodiments maintain the locally cached user credentials so that they reflect those actually used by the real server. This enables the embodiments to authenticate access to locally cached content using the same credentials that are used to access content at the server. Credentials may be provided by the user for local caching either explicitly or implicitly. For example, user credentials may be provided explicitly through a configuration step, such as an input dialogue or form provided by the embodiments, as described in FIG. 6 (step 2314).

In other embodiments, user credentials may be provided implicitly, such as when they are associated or contained within a request. For example, username and password may be obtained from the user's current logon session, such as provided by Microsoft Integrated Windows Authentication, or from the internet services layer, such as WinInet 160, which may query the credentials from the user for use in HTTP header-based authentication. As another example, user credentials may be extracted from a login form (e.g., via the DOM) or login request (e.g., POST body) that was submitted by the user when he logged into the server.

The invention according to some embodiments may also automatically update a user's locally cached credentials if it has been successfully authenticated by the real server. This approach, as described in FIG. 13 (step 274), can seamlessly maintain changes to user credentials, such as when a user changes his password from another client computer. For example, if the user credentials associated with (e.g. HTTP header-based authentication) or contained within a request (e.g., form-based login) differ from that which is currently cached (and if the server targeted by the request is accessible), then the request (including the user credentials) may be passed through to the real server for verification. If the request is successfully authenticated, then the locally cached credentials may be automatically updated as they have been directly verified by the server.

The locally cached user credentials may get out of sync from the real ones at the server. For example, a user may have changed his password at the server but then attempt to access cached content from a client computer that is currently offline. If the client computer has not been updated, either implicitly or explicitly, with the new password, then the embodiments may not be able to authenticate user requests using the new password. In this case, the current locally cached credentials, which are now out of sync with the server, may be manually updated using any conventional means. For example, it is common practice to allow the user to update to the new password by first correctly specifying the previous password. In another embodiment, the user may be allowed to forcibly update the password, such as when they no longer remember the previous password, by correctly specifying another "secret," such as successfully answering a question about some personal detail, which is commonly known as a password reset question.

6.2 Virtual Sessions

An aspect of the invention in some embodiments is to support requests that take place in the context of a session, such as for request authentication and/or other user-related state. Another aspect of some embodiments of the invention is to seamlessly support user sessions regardless of actual connectivity, such as when the server is inaccessible when starting a session or when server connectivity is lost after a session is started. For example, responses from accessing the frequently accessed pages of a user's favorite web site can be cached (and refreshed by a crawler in the background during periods of server connectivity), in addition to nearby content accessible by client-side logic (e.g., JavaScript). Then, when connectivity is interrupted, those pages appear to the user to be completely accessible along with their current content. For instance, an online periodical (such as a newspaper) could have recent responses from crawling the top level pages cached (along with nearby clickable content) so that a user might be able to read (experience) the periodical while in a location with no network connectivity (for example, vacation, travel), obtaining current content as if there was network connectivity. Thus, to the user, this capability is seamlessly integrated into the existing web browser.

As background, requests are considered stateless when they fully specify the parameters necessary for a server to unambiguously determine its response. As such, stateless requests can then be used to uniquely identify the appropriate response in a cache of server responses. In the simplest case, the request (e.g., some or all of the HTTP headers and/or body) can be used to lookup its corresponding response (e.g., used directly via string comparison or hashed into a lookup tag). Systems based on the representational state transfer (REST) architectural model, such as many modern web sites/application, may use stateless requests. Since responses are looked up based only on the parameters directly specified within a request, each response must be uniquely associated with a particular request, so that a request will not ambiguously match more than one response. For example, HTTP requests contain three major components (i.e., request line, headers, and body) and any combination of the three may play a factor in the lookup of a response. For example, a stateless request using the HTTP method "GET" may uniquely identify its response based on a combination of the uniform resource identifier (URL) and headers (e.g., cookies), while a one using the HTTP method "POST" may need to include consideration of the body component.

However, requests that leverage additional or implicit information to correctly determine their response, such as additional state maintained at the server, are considered stateful. As such, this "implicit" request information may be maintained by embodiments of the invention to accurately identify the appropriate response among a cache of server responses. This additional request context may need to be considered when looking up the response for each stateful request, and this context may be modified by these requests, essentially affecting how subsequent requests are handled. For handling stateful requests, the embodiments maintain and update a session context that logically corresponds to the state at the server, which is then used to look up a response for a stateful request.

For example, a session may provide the following context for requests:
Authentication
Login state (i.e., login previously successful)
Security data (e.g., sequence counter, salt, etc.)
Timers
Inactivity timeout
Lifetime of client tokens/cookies
Activity
URLs visited
Emails or news items read
Shopping cart
Location
Current zip code
Current directory/location (e.g., FTP)

Figure 14:
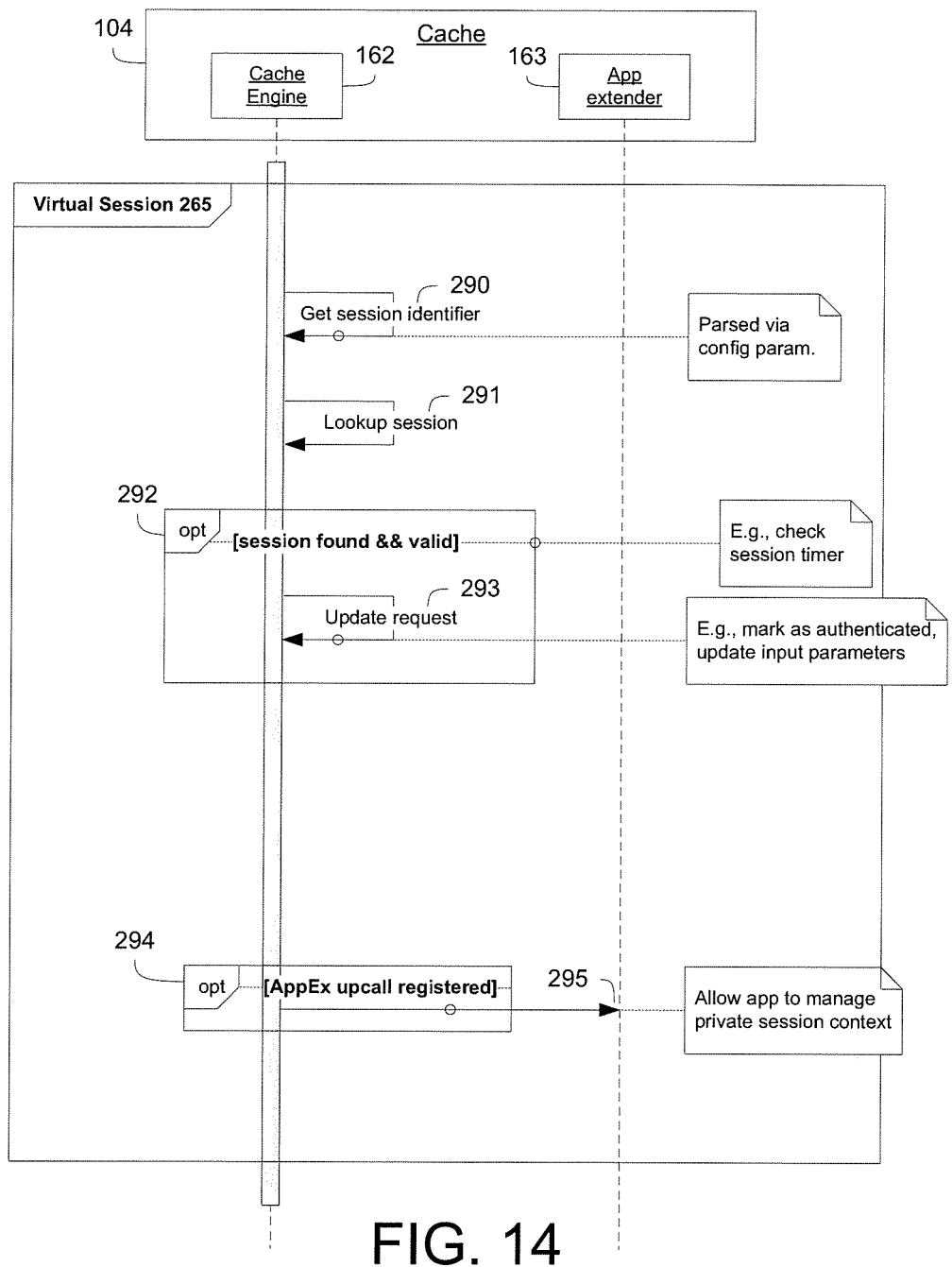
FIG. 14 is a UML sequence diagram for the UML frame Virtual Session, which is an embodiment of session handling for a virtual request.

FIG. 14 is a UML sequence diagram for the UML frame Virtual Session, which is an embodiment of session handling for a virtual request. A virtual request may be associated with a session context, such as for authenticating a request or managing implicit request information.

Referring now to FIG. 14, at step 290, an identifier is obtained for the session. Different applications may identify their session differently, which may be indicated by an application-specific configuration parameter; for example, FTP implicitly identifies its session based on the connection, while a web site may embed the session identifier in an HTTP cookie.

At step 291, the session is looked up. Then, at step 292, Cache Engine 162 checks whether a session was found and if so, whether it is valid, such as verifying an inactivity timer. If so, the request may be updated at step 293 using the session context, depending on the request and/or the session context. For example, if the session is used to authenticate requests, then the request is marked as authenticated; or the session may simply be associated with the request so that the context is available for the subsequent response lookup.

At step 294, Cache Engine 162 determines whether to call an App Extender 163, such as when specified by a configuration parameter. If so, the request is passed to App Extender 163 at step 295, which may perform additional processing, such as modifying the request or updating its own state.

6.3 Virtual Responses

After a request has been preprocessed, such as performing any login or session handling, response handling can be performed for a request. In general, a response may be obtained from a cache of previously stored responses, dynamically generated, or a combination thereof.

Figure 15:
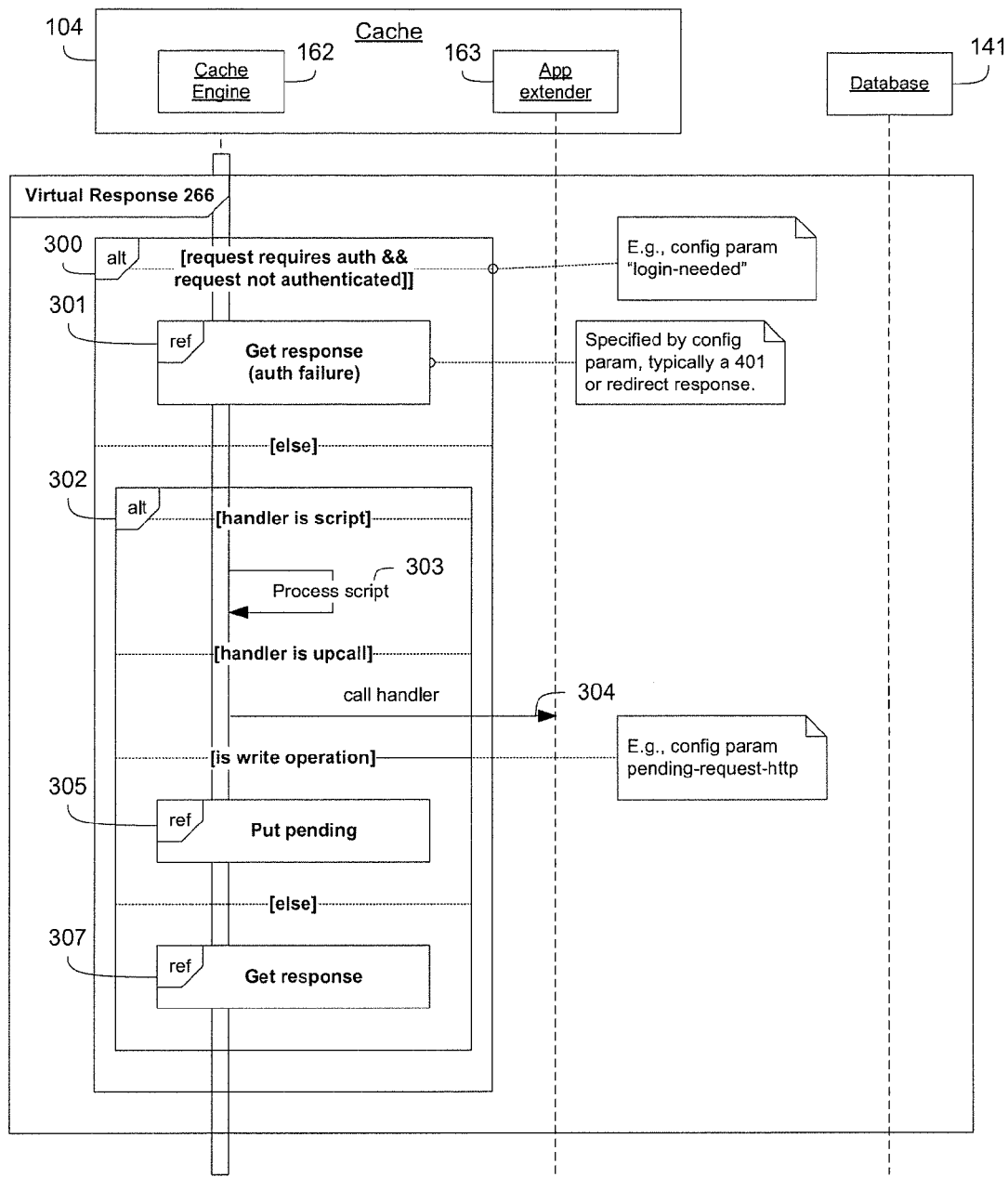
FIG. 15 is a UML sequence diagram for the UML frame Virtual Response, which is an embodiment of response handling for a virtual request.

FIG. 15 is a UML sequence diagram for the UML frame Virtual Response 266, which is an embodiment of response handling for a virtual request.

Referring now to FIG. 15, at step 300, Cache Engine 162 determines whether the request was successfully authenticated, if necessary. This decision can be based on whether the request matches a configuration parameter indicating that authentication is required. If so and the request has not been authenticated, such as by a valid login or session, then an authentication failure response is returned for the request. This response may be dynamically generated, such as an HTTP 401 response, or it may be obtained from cache, such as a redirect to the login page.

If the request did not require authentication or it was successfully authenticated, then the normal response handling is performed, starting with UML frame 302, where Cache Engine 162 selects the appropriate handling for a request, which may be based on its type, such as whether the request is for a read or write operation. Generally, a request is a read operation when it retrieves data from the server, while a write operation modifies data at the server; a request that does both is typically also considered a write operation. Since Cache 104 effectively provides an intermediate staging area for data exchanged between a Client App 101 and Server 108, a read operation generally retrieves data from the cache and a write operation generally stores data to the cache.

In the first case of 302, a request is determined to be handled dynamically by a script, such as when specified by a configuration parameter matching the request. If so, at step 303, this script may be executed within Cache Engine 162, such as by an embedded scripting engine, or it may be inserted into the response for deferred execution, such as embedded in an HTML script tag that is subsequently executed by a web browser.

In the second case of 302, a request is determined to be handled by external software, such as by a call to an App Extender 163 specified by a configuration parameter matching the request. If so, at step 304, the request is passed to App Extender 163 who may respond to the call with a response.

In the third case of 302, a request is determined to be a write operation, such as based on a URL pattern specified in a configuration parameter. If so, the write operation is processed in the UML frame Put Pending 305 (see FIG. 36).

In the last case of 302, the request is passed to Cache 104, where it may be serviced from the local cache of responses, such as a stateless HTTP GET request, or possibly issued to the server, such as an HTTP POST request that was not identified as a write operation (i.e., not put on the pending queue). Note that accesses to pending items may be preferably requested this way (i.e., via special URL that references the item in the pending queue). If so, the request is processed in FIG. 17 (UML frame Get Response 307).

6.3.1 Request Parameters

An aspect of the invention according to some embodiments is to support lookups in the cache that properly differentiate between requests that appear similar (e.g., same URL). These requests may be differentiated by the consideration of other information, such as the session context or other client input (e.g., HTTP cookies). This additional information can be incorporated in any appropriate means, such as appending them into a single lookup string or using them as separate inputs in a structured query. One embodiment of the invention folds request parameters into a relatively short but unique tag, which enables an efficient lookup. For example, the request parameters may be collectively hashed into a code that is used as a unique identifier for searching in the cache of responses.

Another aspect of the invention according to some embodiments is to support lookups in the cache that properly recognize equivalent requests that only appear to be different, such as when they specify the same parameters using a different order or are encoded using different schemes (e.g., UTF-8, RFC 1738, etc.). For example, cookies within an HTTP request may be ordered differently depending on how and when they were returned from the server from previous responses leading up to the current request.

Some requests may specify parameters that are irrelevant in uniquely identifying the corresponding response, such as those that may be optional or transient. For example, the HTTP "Date" header is optional in client messages and its value continuously changes even when every instance of that request refers to the same response. Another example is a request for a web form that can have edit controls that are pre-populated with information from the request body. The lookup may not require all of the information in the request body in order to allow the web form to be retrieved from cache regardless of the instance-specific information in the request.

Equivalent requests can be associated with the same response by any combination of commonly known methods. For example, one approach is to normalize the request parameters, ensuring that parameters are specified in the same order, are using the same encoding, and are using the same letter case. This approach is advantageous when the lookup tag for the request itself, or derived directly on its request parameters (e.g., hash function). Another approach is to use a flexible lookup mechanism, where the responses are progressively narrowed using multiple partial comparisons, excluding or filtering select portions of the request parameters, using case-insensitive comparisons, or any combination thereof. The filtered request parameters may be saved to allow them to be restored so that the cached content may have them available, for example, in the case where a filtered parameter contains information that is used to pre-populate an edit control in a retrieved web form.

6.3.2 Stateful Lookup

The client typically identifies the session when it issues a stateful request, which can be done explicitly or implicitly, so that the server may factor the context into the lookup of the response. An example of explicit context identification is the use of an HTTP cookie to specify a unique session identifier; this session cookie is returned during the user's login process and provided by the client whenever the user issues a request. An example of implicit context identification is the use of persistent TCP connections; the server securely associates a TCP connection with a specific client (e.g., cryptographically protected by the Secure Sockets Layer protocol), so that requests received on that connection could uniquely be associated with a particular session.

Since the session context is included along with the request in the lookup of the response, the response needs to be associated with this additional information from the session context. So, when responses for stateful requests are retrieved from the server, the cache engine not only associates the request parameters with the response, it also includes the session context. When a stateful request needs to be retrieved later from the cache, such as for an offline browsing session, the cache lookup includes the session context, such as, the node requested prior to the current one. As requests are processed, the context is continuously updated to indicate the node in the directed graph representing the sequence of requests leading up to the current one.

As an example, FTP sessions maintain the notion of a current working directory which defines the context of FTP commands that operate on a relative path, such as listing the current directory contents. In this case, the running context tracks the current working directory, which is then included in the lookup of, for example, a particular file or directory listing to retrieve.

Figure 16:
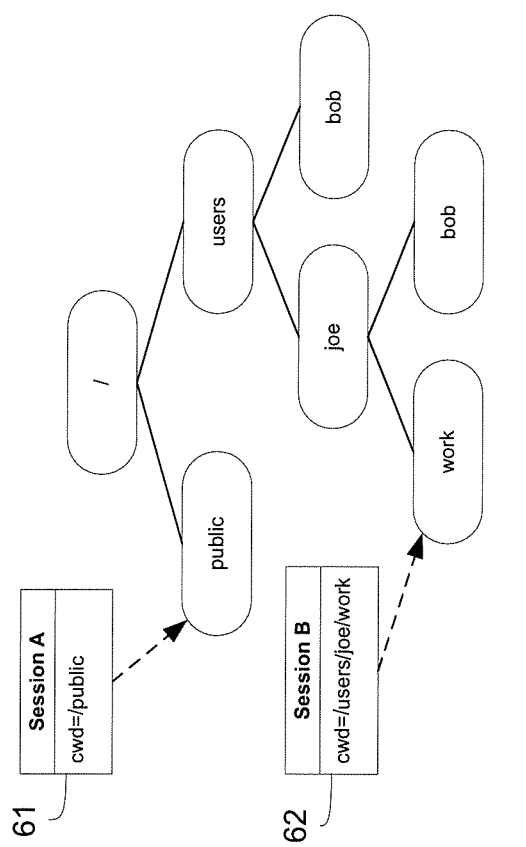
FIG. 16 illustrates how directories on an example FTP site could be organized in the cache to support stateful requests

FIG. 16 illustrates how directories on an example FTP site could be organized in the cache to support stateful requests. In this example, there are two different FTP sessions. Context 61 is the state maintained by the cache for a first FTP, while context 62 is the state for a second FTP session. Each context includes a property called "cwd" that tracks the current working directory, which may be modified by FTP commands such as CWD or CDUP. For example, the "cwd" property in Context 61 may have been previously set by a "CWD /public" command, while Context 62 may have been previously set by a "CWD users" command followed by a "CWD joe/work" command. This context property allows the cache to differentiate requests that specify operations on relative paths. For example, when a request for the FTP command "LIST" is received for Context 61, it will return the directory list for "/public" from the cache, while the same command received for Context 62 will return the directory listing for "/users/joe/work". Or, when a request for the FTP command "GET file1" is received for Context 61, it specifies the file "/public/file1", while the same command for Context 62 specifies the file "/users/joe/work/file1".

6.3.3 Cache Lookup

Figure 17:
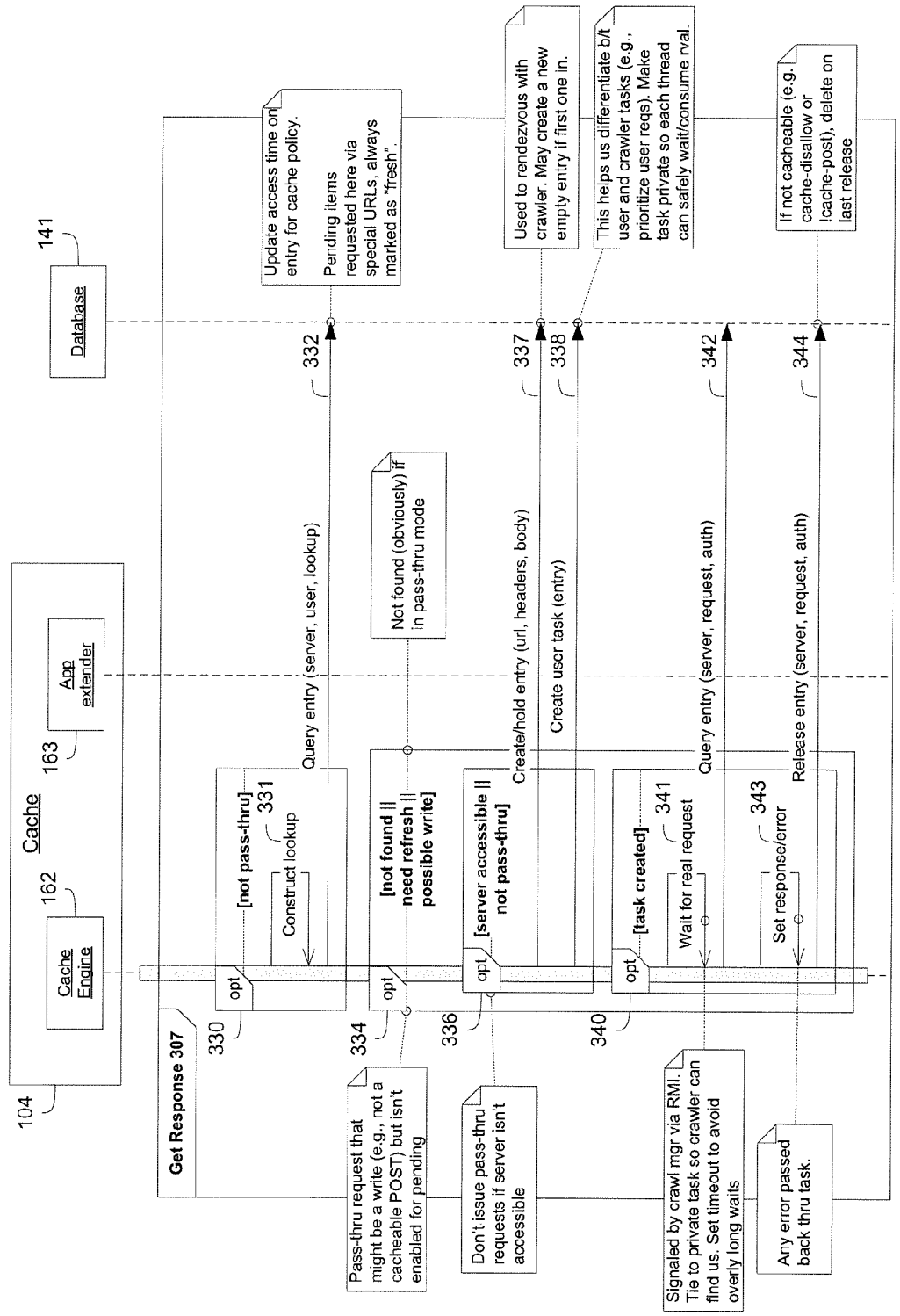
FIG. 17 is a UML sequence diagram for the UML frame Get Response, which is an embodiment of the response lookup for a virtual request.

Responses may be stored in a cache, such as organized with a database, and they may be looked up based on the request parameters. If the request is stateful, it may include information from a session context. Responses for virtual requests may be cached previously using real requests sent to the server FIG. 17 is a UML sequence diagram for the UML frame Get Response 307, which is an embodiment of the response lookup for a virtual request. A virtual request may be serviced from cache and any actual communication with the server is performed in a different context.

Referring now to FIG. 17, at step 330, Cache Engine 162 determines whether to look up the currently cached entry, which is optional if the request needs to be passed through to the server. If so, it constructs the lookup data for the request at step 331. This may involve inclusion of additional parameters into the lookup, such as a current path from a session context or a particular cookie from an HTTP header. This may also involve a normalization of the request parameters to ensure that lookups for equivalent requests will yield the same response. This may also involve filtering of the request parameters to allow lookups to exclude instance-specific information in the request. In some cases, information in request parameters that are filtered out may be restored using a fixup, for example, in the case where a request parameter specified a value that would pre-populate an edit field in a form. This may further involve a restructuring or hashing of the request parameters into a smaller and/or semantic structure, such as to improve lookup efficiency.

At step 332, Cache Engine 162 looks for the cache entry in Database 141. This lookup may involve a single operation, such as a query to a relational database or a filename lookup on a filesystem, or it may involve many steps, such as a search through multiple objects stored in a database or multiple files on a filesystem.

At step 334, Cache Engine 162 determines whether the request needs to go to the server, such as when a response was not found or Cache 104 has been configured to pass-through some or all requests to the server. This includes requests that are not known to be safely cacheable, such as an HTTP POST request, but are also not currently configured to be processed as a pending write operation. If so, then the response may be retrieved by another execution context, such as to issue requests via a common session with the server, but the request may also be issued by the current context. If the request is issued by another context, then Cache Engine 162 may retrieve the response from Database 141.

To issue the request to another context, according to one embodiment, Cache Engine 162 creates a user task, which contains the necessary information for another execution context to actually issue the request to the server. At step 336, Cache Engine 162 determines whether a user task should be created, based on whether the server is accessible or the request can be deferred if the server is not accessible (e.g., pass-though requests are expected to be processed immediately). If Cache Engine 162 decides to create the user task, it first sets up the cache entry, at step 337, either creating it or holding it (depending on whether it already exists) to rendezvous with the context that will be actually retrieving the response from the server. Next, Cache Engine 162 creates a user task, at step 338, which notifies the other context (e.g., crawler) about the request.

At step 340, Cache Engine 162 decides whether it should wait for the response. If so, then at step 341, Cache Engine 162 waits for the response, which may be signaled if the response was retrieved by another execution context or issued asynchronously within the current context. If the response is stored in Database 141, such as when retrieved by another context, Cache Engine 162 queries for the cache entry at step 342. At step 343, Cache Engine 162 sets either a response, if available, or an error, depending on the failure cause (e.g., timeout, not online, server error, etc.). Cache Engine 162 then releases the cache entry at step 344, which subsequently allows the entry to be deleted (e.g., not a cacheable entry, evicted when out of space).

6.3.4 Request Modes

It is an aspect of the invention according to some embodiments that requests for web content are automatically determined to be served from cache or issued to the server, depending on the accessibility of the server. When the server is inaccessible, the embodiments automatically use Cache 104 for read and write operations, to minimize disruption to the user (e.g., waiting for server requests to time out). When a server is accessible, the embodiments may issue requests for read or write operations to the server, or may use Cache 104 in lieu of or in combination with issuing requests to the server. The embodiments may determine how to process requests when a server is accessible based on a variety of factors, such as whether locally cached content is fresh (e.g., as indicated by HTTP headers) and/or whether the system is configured for any asynchronous operation (e.g., based on user preference).

Asynchronous operation means that requests are generally served from cache, without waiting for a response from the server; this is similar or equivalent to the operational mode used when the server is inaccessible. Although the request may have been handled locally, a request may still be issued to the server, such as to refresh the cached content in the background.

Embodiments of the invention may support different levels of asynchronous operation, allowing them to provide different degrees of acceleration that often means some tradeoff with content freshness. For example, a user may configure the system or a particular server for fully asynchronous operation to fully accelerate access to a web application; this means that any content changes, by the user or someone else, may not be seen immediately even if the server is accessible. This degree of acceleration may also be configured dynamically in some embodiments. For instance, when network connectivity is fast, the operations are done synchronously, while when the connectivity is slow, the operations are done asynchronously. The following table, which illustrates examples of different levels of asynchronous operation, indicates where a request may be served from, depending on server accessibility:

TABLE 1

Example asynchronous operation modes

| Mode | Server accessible | | Server inaccessible | |
| --- | --- | --- | --- | --- |
| | read | write | read | Write |
| Full acceleration | Cache | Cache | Cache | Cache |
| Standard acceleration | Cache | Server | Cache | Cache |
| Minimum acceleration | Server | Server | Cache | Cache |
| Disabled | Server | Server | Server (timeout) | Server (timeout) |

Figure 18:
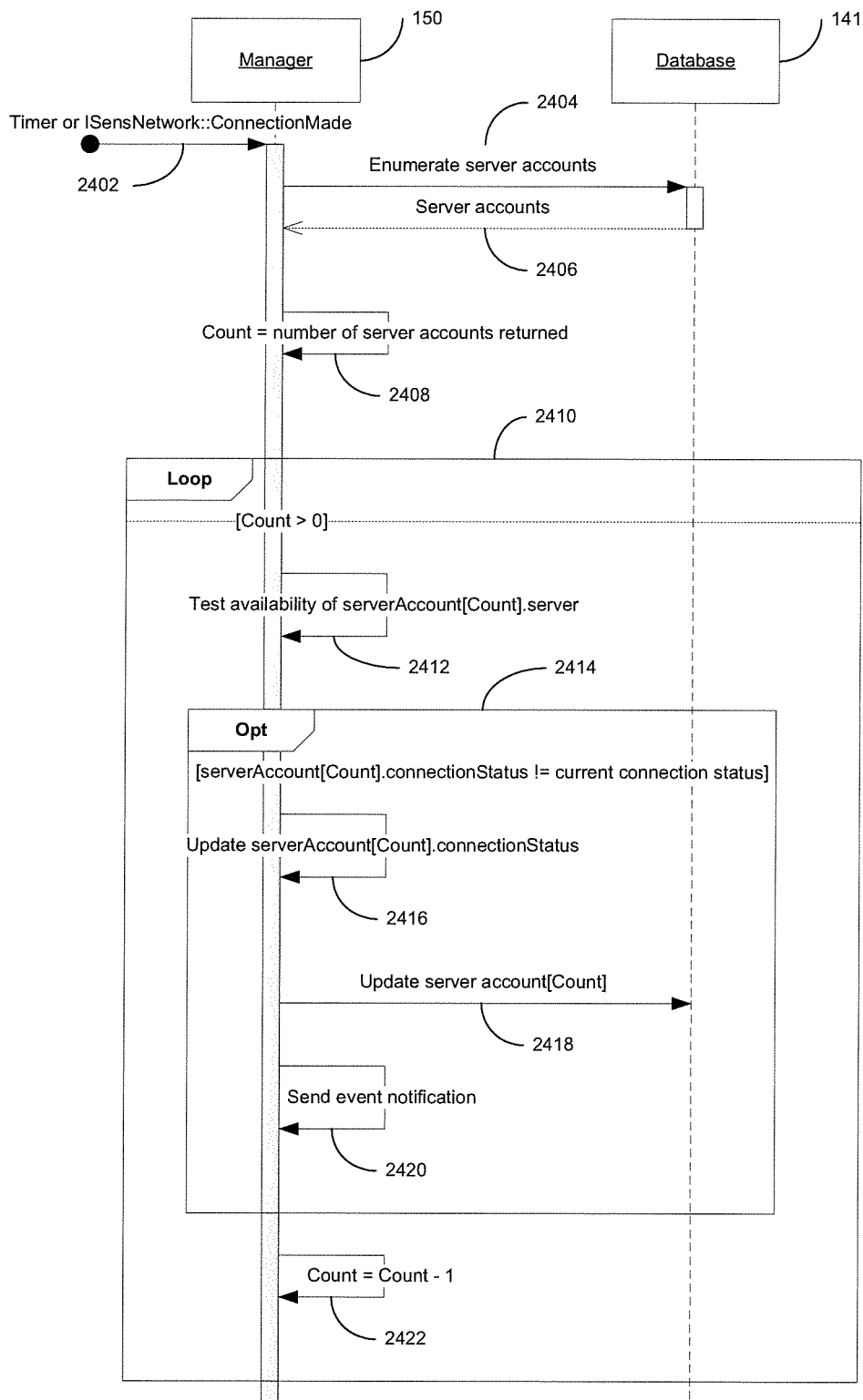
FIG. 18 shows a UML sequence diagram for an embodiment for monitoring server availability.

FIG. 18 shows a UML sequence diagram for an embodiment for monitoring server availability. In this embodiment, a manager 150 periodically checks if a client 100 can access a white listed server 108. These checks can be initiated in a number of ways, for example, on a time interval or on detection of a change in network connectivity on the client, or manually by a user.

At step 2402, manager 150 is signaled by a timer event or a network event to begin the process of checking server availability. The manager calls 2404 the database to enumerate the server accounts that were created during server white listing. The manager will then loop 2410 through every server account, performing the availability check.

At step 2412, the manager attempts to test the availability of a server. The test may take different forms, such as a UDP ping to the server, an attempt to open a TCP/IP socket connection to the server, or an attempt to make a higher-level protocol request to the server, such as an HTTP or FTP request.

At step 2414, the result of the test is compared against the saved result of the last test that the manager made for the server. If the availability of the server has changed since the last test, then first the new availability status is saved 2416 so that it can be compared against in the next test interval. The status is also updated 2418 in the database so that the status can be shared with other processes that access the database, such as instances of a cache 104 that are running in a client application 101.

At step 2420, the manager sends an event notification to inform of the change in server availability. This allows any process that registered for event notification with the manager to be aware of the change and take some action, such as updating a user interface that might provide server status information.

6.4 Virtual Fixup

After generating a response for the request, it may be necessary to post-process the response before returning it to the caller, such as modifying the response to customize it for the current caller. There may also be additional finalization steps necessary, such as updating the session based on the given response.

FIG. 19 is a UML sequence diagram for the UML frame Virtual Fixup 267, which is an embodiment of fixing up responses for a virtual request. This diagram generally shows the steps that may need to be performed, based on the response (or error) that has been associated with the request.

Referring now to FIG. 19, at step 310, Cache Engine 162 checks whether a response has been associated with the request. If not, then a default response is assigned to the request, at step 311, based on the reason for the lack of a response, such as if an error was previously returned during a cache lookup.

At step 312, Cache Engine 162 checks whether a session needs to be updated, based on the current request and/or response. If so, the session is updated at step 313, such as updating a current working directory or resetting an inactivity timer.

At step 314, Cache Engine 162 checks whether there are any fix-ups associated with the request, such as fix-ups from the previous processing phases for login or session handling or cache lookup. If so, these fix-ups are applied at step 315, such as injecting script sections into an HTML response.

At step 316, Cache Engine 162 checks whether there are any fix-ups associated with pending items. If so, these are handled in UML frame Apply Dependent Fixups 316.

At step 317, Cache Engine 162 checks whether there are any other fix-ups associated with the request and/or response, such as any specified by a configuration parameter matching this request and/or response. If so, they are applied at step 318, such as injecting script sections into an HTML response.

At step 319, Cache Engine 162 checks whether the request should be passed to an App Extender 163, such as based on an URL pattern matching the request or response. If so, the request/response is passed to App Extender 163 at step 320, which may perform any type of processing, such as modifying the response or updating its own state.

7 Real Requests

A real request is one that is issued to the server, and its response may be stored in a local cache so that it may be served locally whenever necessary, such as for a virtual request. The cache storage may be locally accessible to the client system, for example, in a persistent high capacity storage/memory such as a hard drive, and can accommodate a large number of responses. The local cache may utilize any conventional means of storage, including on a filesystem, in a database, or a combination thereof.

Real requests may be performed before they are actually requested by the user, so that their responses may be available for servicing virtual requests at any time, such as while offline. One embodiment of the invention performs these real requests using a context that is separate and transparent from the user's, such as with a crawler running hidden in the background. The crawler may be able to issue the same requests that a user may perform, including those dynamically generated, such as by JavaScript, to ensure that their responses are available when actually requested by the user.

7.1 Cache Population

Embodiments of the invention may acquire content from the Internet for their caches by a number of different means. For example, the cache may store any content specifically requested by a user, it may automatically discover the content, or even a combination of the two. A common approach to automatically discover content is through a process commonly known as crawling.

An aspect of the invention according to some embodiments is that it can populate the cache automatically, deciding what content to store based on factors such as, but not limited to: user input (directly, or inferred through user behavior such as "Favorites" or "History"), recent activity, connectivity to servers, freshness of particular URL content, depth of crawling, etc.

An aspect of the invention according to some embodiments is that it can populate its cache using different crawling approaches. For example, conventional crawlers recursively look for documents and paths to traverse by issuing protocol-level requests to the server and examining their responses, such as searching for anchor tags in HTML response bodies or files and subdirectories in FTP/SMB messages. As another example, some more recent crawlers leverage user interface interaction, such as clicking on regions in a graphical user interface (GUI); this crawling approach can support discovery and access to Internet content without explicit knowledge of the application logic, since the server responses are not directly analyzed or interpreted. For example, a crawler that programmatically controls a browser by clicking on display elements is capable of supporting dynamic content, such as display changes or asynchronous requests driven by JavaScript.

7.2 Crawl Tasks

Real requests may result from a number of different sources (e.g., user or crawler) and it may be desirable or even necessary to coordinate multiple real requests through a common session with the server, such as when a server restricts against multiple concurrent client sessions. One embodiment of the invention coordinates real requests through the crawler, as this has the advantage sharing a server session between user-related activity and discovery-related crawling.

Other embodiments may support different execution contexts for submitting requests to the server. For example, there may be multiple crawler processes, each capable of supporting concurrent requests to the same or different servers. As another example, the execution context may simply be executing within the same process as the user, such as a separately spawned background thread.

Figure 20:
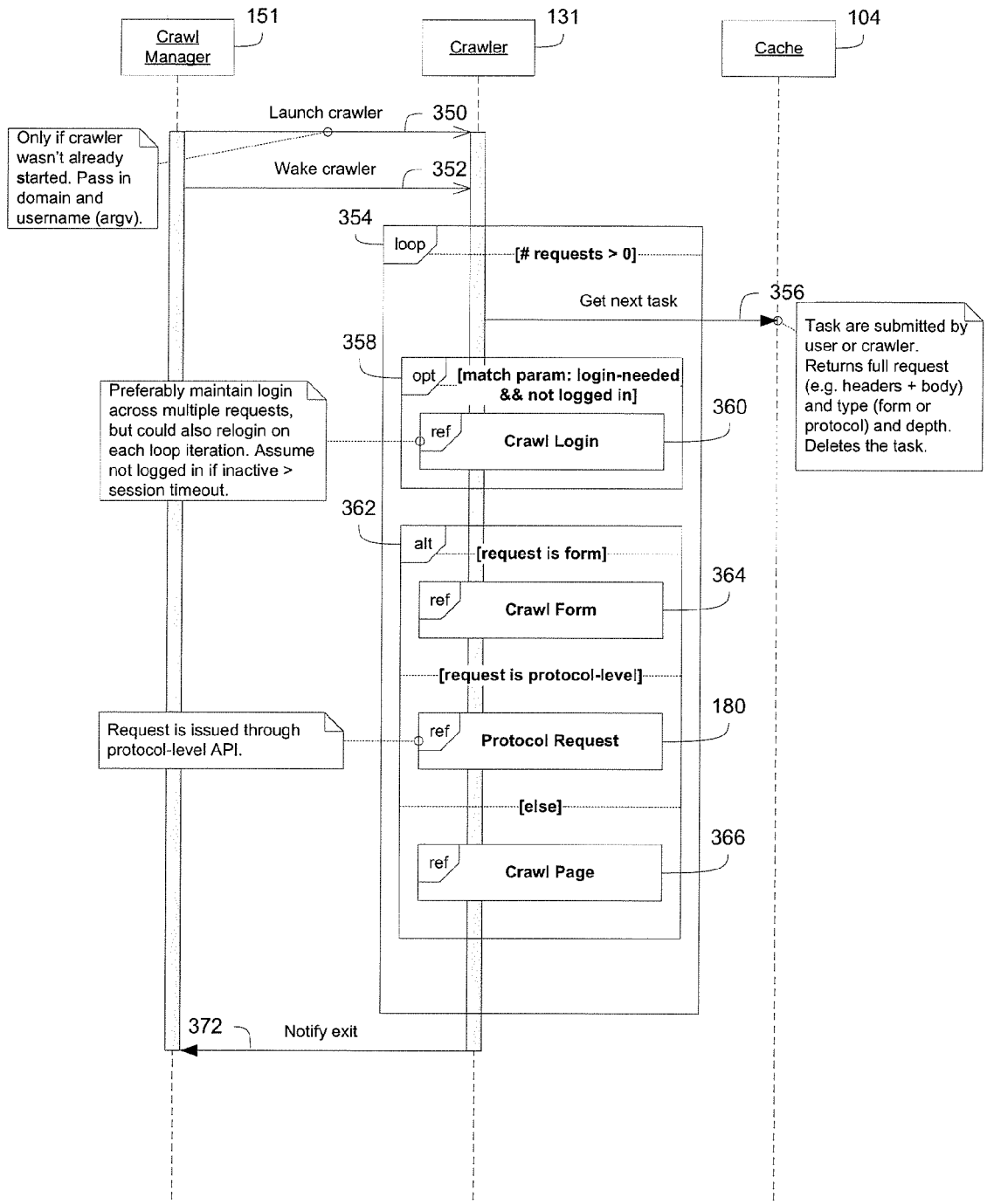
FIG. 20 is a UML sequence diagram showing an embodiment for the coordination between the cache and a crawler.

FIG. 20 is a UML sequence diagram showing an embodiment for the coordination between the cache and a crawler. Basically, the cache implicitly controls the crawler through a work queue where tasks are submitted from users and crawlers.

Referring now to FIG. 20, at step 350, Crawl Manager 151 launches one or more instances of Crawler 131, if necessary. The number of Crawler 131 processes may depend on a number of different factors, such as whether the server supports multiple concurrent sessions or based on the local computer's capacity (e.g., limits resulting from memory, CPU, or OS).

At step 352, Crawler Manager 151 signals one or more instances of Crawler 131, if necessary. Crawler 131 may be waiting to be notified of more work, such as after completing work from a previous phase.

At step 354, Crawler 131 processes one or more tasks in a loop until, for example, there is no more work. Crawler 131 requests work by calling Cache 104 at step 356. The task may describe the parameters necessary for Crawler 131 to submit the request to the server, and it may specify parameters on crawling, such as the maximum recursion depth for paths extending from the current point.

At step 358, Crawler 131 determines whether it needs to first log into the server before processing the current request. This decision can be based on whether the request matches a configuration parameter indicating that a login is required. If so, Crawler 131 performs the login process in the UML frame Crawl Login 360.

At step 362, Crawler 131 determines how to process the request, which may vary depending on its type. In general, requests may be submitted via user interface interaction, such as clicking elements on a web page, or they may be submitted via the application-level protocol, such as an HTTP GET or POST. User interface interaction may be generally preferable for handling cases that may depend on application-level processing, such as executing JavaScript functions associated with a DOM element in a browser. Such cases may include submitting a pending HTML form or crawling dynamic web pages.

Figure 37:
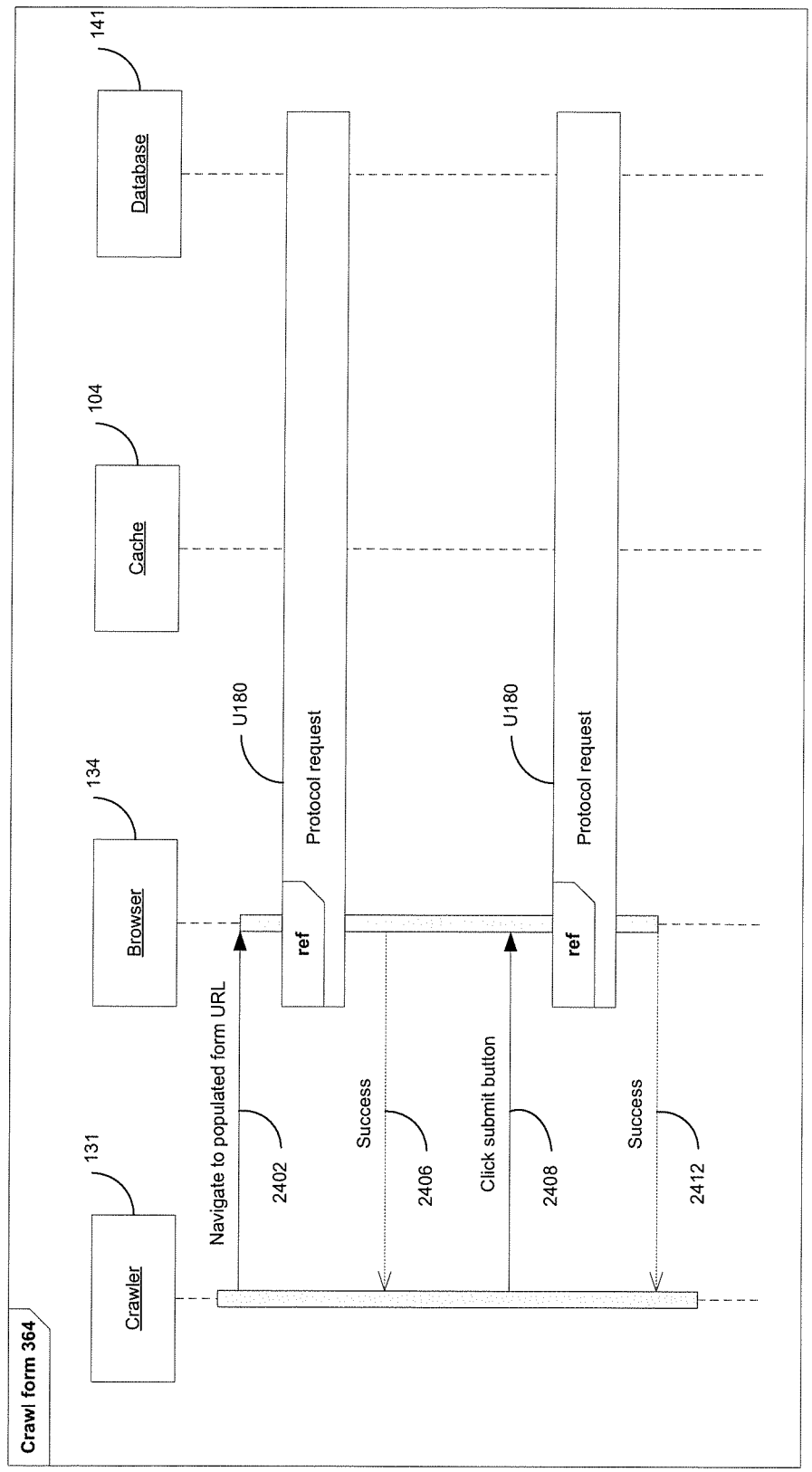
FIG. 37 shows a UML sequence diagram of an embodiment of the "crawl form" step from FIG. 20, which shows the process of a crawler submitting a pending form submission.

In the first case of 362, if the request is a pending form submission, then it may be submitted via user interface interaction with a browser, which is described in FIG. 37 (UML frame Crawl Form 364).

In the second case of 362, if the request is a protocol-level request, then it may be submitted via a protocol-level API, such as one provided by Browser Control 133. Such a request may include virtual requests for uncached resources, and requests issued from non-browser applications (e.g., Microsoft Word). Handling of a protocol-level request is described in FIG. 7 (UML frame Protocol Request 180).

Figure 23:
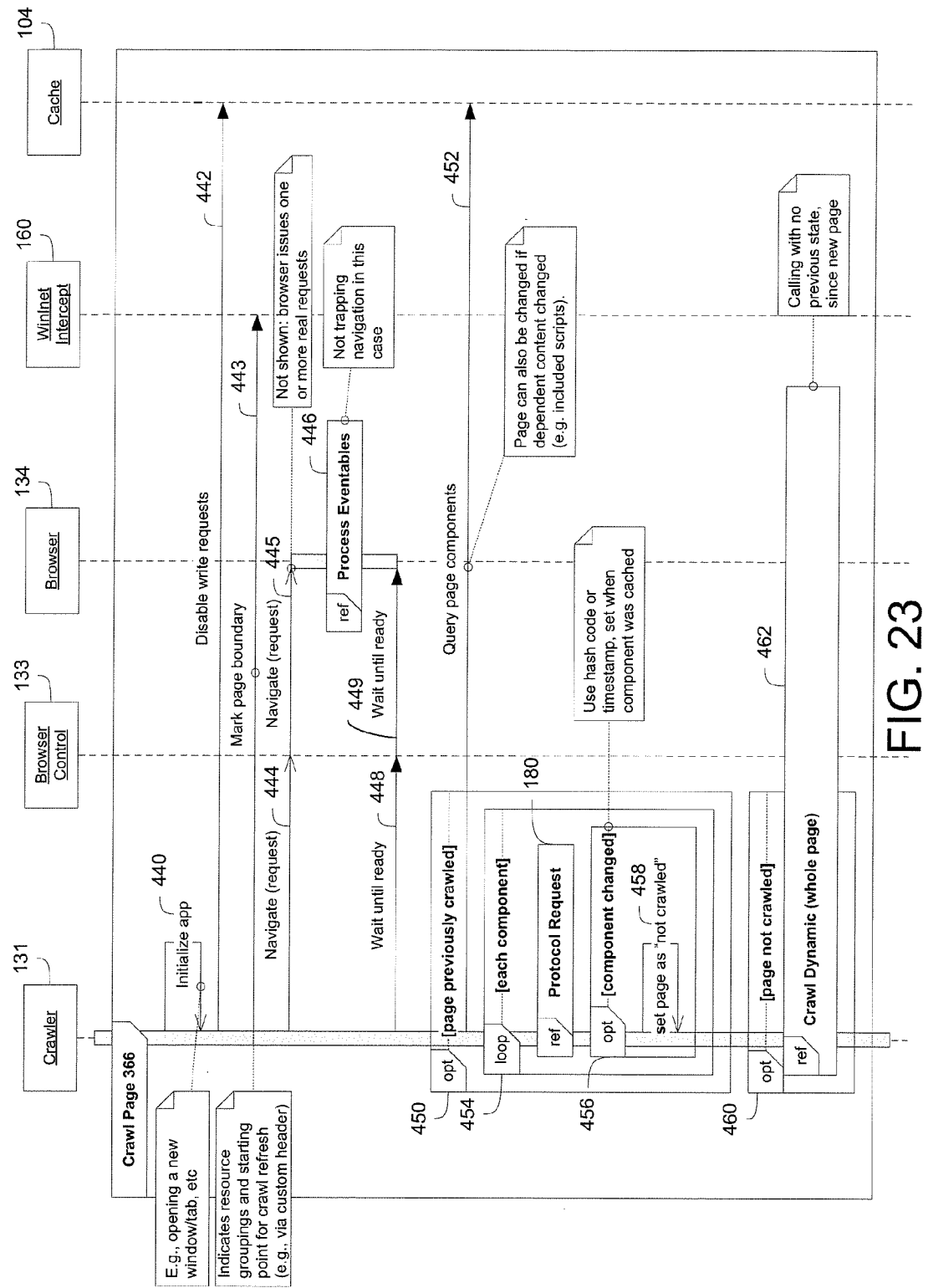
FIG. 23 is a UML sequence diagram for the UML frame Crawl Page, which is an embodiment for application-level crawling of a web page.

Otherwise, in the last case of 362, the request is processed via user interface interaction with a browser, which is described in FIG. 23 (UML frame Crawl Page 366).

When Crawler 131 completes processing its tasks, it may wait for additional work (e.g., signaled by Crawl Manager 151) or it may exit, possibly after waiting for some minimum amount of time. If so, Crawler 131 notifies Crawl Manager 151 at step 372, either directly (e.g., IPC) or indirectly (e.g., Crawl Manager 151 watching process termination).

7.3 Crawler Login

Some servers require authentication, so a crawler may need to perform a login process before processing its tasks. Since the cache needs to be populated with content associated with particular users, the crawler needs to issue requests while logged in as these users. Also, since the crawler operates in the background, transparently from the user, the login process needs to be performed automatically without direct assistance from the user.

Figure 21:
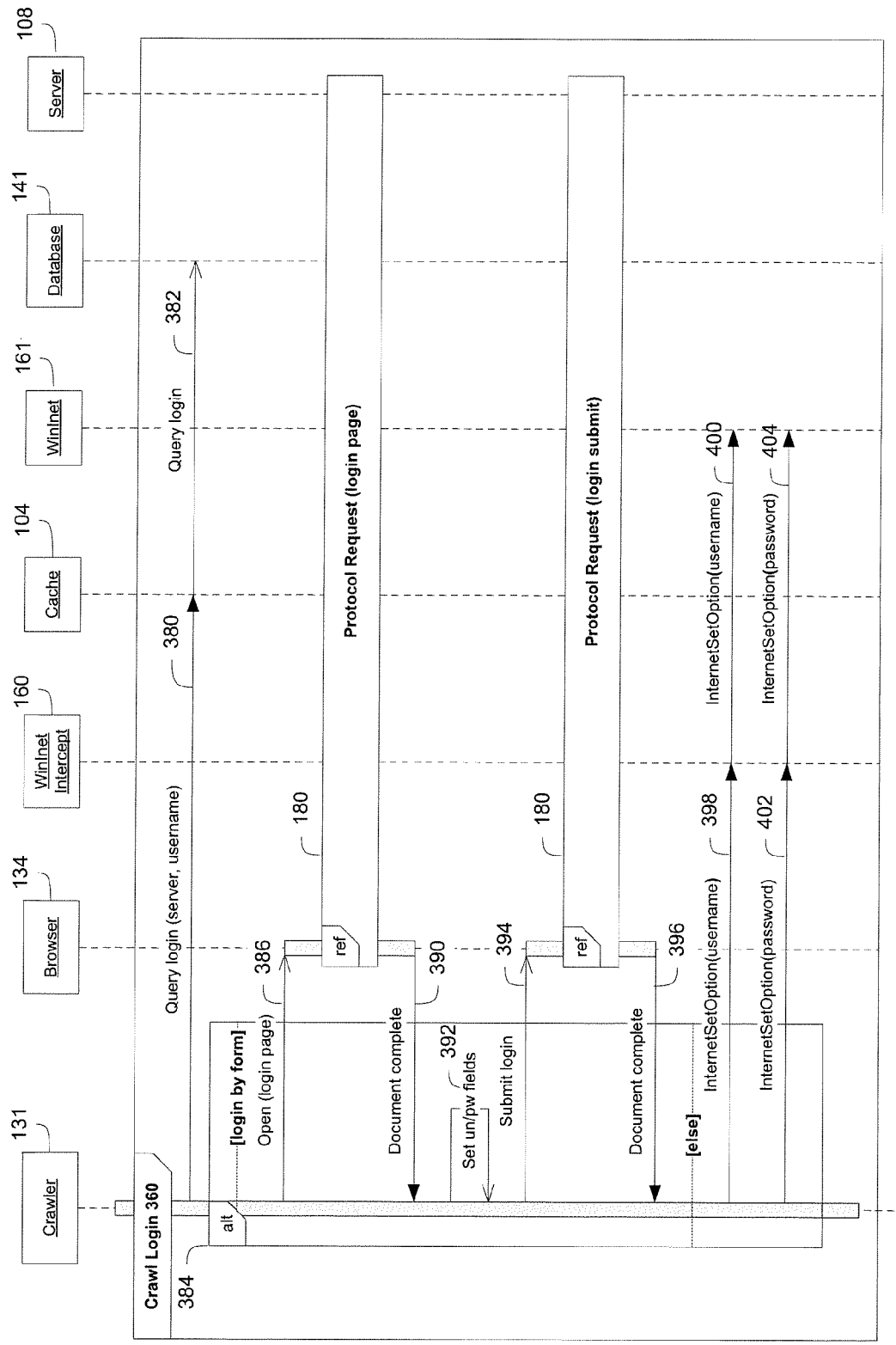
FIG. 21 is a UML sequence diagram showing an embodiment for the login process performed by a crawler.

FIG. 21 is a UML sequence diagram showing an embodiment for the login process performed by a crawler. This embodiment supports different authentication methods, including both protocol-level (e.g., HTTP, FTP) and application-private authentication (e.g., web forms), and can be equivalently applied to other/future authentication methods.

Referring now to FIG. 21, Crawler 131 first obtains the login information for the user from Cache 104, at step 380, which in turn obtains it from Database 141, at step 382. This login information may include information about the process itself (e.g., method of authentication and/or URL of login page), as well as the user's authentication data (e.g., username, password), which may be stored previously, such as when the user first configured caching for the current server/application.

At step 384, Crawler 131 determines which method it uses for the login process, depending on the login information returned from Cache 104 (at step 380).

In the first case of 384, Crawler 131 performs a form-based login. This may include, for example, requesting the login form at step 386, which is processed as any other protocol request, as described in FIG. 7 (UML frame Protocol Request 180). When the login form has been loaded, Browser 134 notifies Crawler 131 at step 390, who can then proceed to setting the user's authentication data into the form's input fields, at step 392. When the authentication data has been entered, Crawler 131 submits the login request at step 394 via the user interface (e.g., clicking a button to submit the form), which may cause Browser 134 to issue the request to the server. In other embodiments, Crawler 131 may submit the login request in any other manner, such as via the protocol (e.g., constructing an HTTP POST request from the form data). The request to the server is processed as any other protocol request, as described in FIG. 7 (UML frame Protocol Request 180). When the response to the login request is received by Browser 134, it notifies Crawler 131 at step 396.

In the second case of 384, Crawler 131 performs a protocol-level login. It is common for an Internet Services 103, such as WinInet 161, to handle protocol-level authentication. So, Crawler 131 simply initializes WinInet 161 with the necessary authentication data, such as the username at step 400 and password at step 404; note that these calls are initially intercepted by WinInet Intercept 160 at steps 398 and 402, respectively.

7.4 Real Request

As described in FIG. 11 (i.e., UML frame Cache Request 205), a request received by Cache 104 from Crawler 131 is processed as a real request, which may be issued to the server. As another example, a request from the user may also be processed as a real request, such as when it cannot be handled using locally stored responses or the request mode is configured for synchronous operation.

FIG. 22 is a UML sequence diagram for the UML frame Real Request 253, which is an embodiment for the handling of a real request by Cache 104, such as a request received from a crawler.

Referring now to FIG. 22, at step 410, Cache 104 constructs the lookup data for the request. This may involve inclusion of additional parameters into the lookup, such as a current path from a session context or a particular cookie from an HTTP header. This may also involve a normalization of the request parameters to ensure that lookups for equivalent requests will yield the same response. This may further involve a restructuring or hashing of the request parameters into a smaller and/or semantic structure, such as to improve lookup efficiency.

At step 412, Cache 104 selects the appropriate handling for the request, which may be based on whether it should be handled locally, such as a query for locally pending write operation, or by the server, such as a refresh of a cache entry or a submission of a pending item.

In the first case of 412, the request is for a local object (e.g., pending write operation), so it is handled locally since it is not known or visible to the server. In this case, Cache 104 retrieves it from Database 141 at step 413.

In the second case of 412, the request is for the server. At step 414, Cache 104 selects the appropriate handling for the request, which may be based on factors such as whether it is a read or write operation.

In the first case of 414, the request is processed as a read operation to the server. At step 416, a currently cached response, if any, is looked in the Database 141. At step 418, Cache 104 determines whether it should still issue the request to the server, such as if a cached response was not found at step 416 or the cached response was determined to be possibly out-of-date (e.g., Pragma: No-cache header present, current time is later than Expires header). If so, the request is prepared, such as setting the HTTP If-Modified-Since header based on the response's cache modification time. When ready, the request is processed by passing it to the server, as described in FIG. 26 (UML frame Passthru Request 255). Upon return from Passthru Request 255, the response is checked at step 422 to see whether it should be saved to the cache, such as when the response indicates a successful completion of the request. If so, the response is stored to Database 141 at step 424.

In the second case of 414, the request is processed as a write operation to the server, if writes are allowed. In general, the write operation was previously queued, such as when the user submits a form while offline, and is submitted to the server by a Crawler context. However, write operations are disabled in a Crawler context that is performing discovery (e.g., FIG. 23, describing UML frame Crawl Page 366) to avoid inadvertently submitting write operations to the server while crawling a page. The request for the write operation is described in FIG. 38 (UML frame Submit Pending 426).

In the last case of 414, the request cannot be processed, such as a write operation requested when crawling a page. The request is gracefully terminated by returning a "no op" response at step 427, such as an empty HTML document.

An aspect of the invention according to some embodiments is that they can control the crawling by affecting the response it returns to the crawler, which may be different from that actually returned from the server. At step 428, Cache 104 may examine the response and determine that it should not be returned to the caller (e.g., crawler). For example, the content-type of an HTTP response may not be natively supported by Browser 134 and returning this response may cause an external application to be launched to handle it, such as a PDF file that may be opened by an external PDF viewer like Acrobat Reader. To prevent this case, Cache 104 may set a "no op" response at step 430, such as an empty HTML document.

Before returning the response for the second case of 412, Cache 104 may wake up any contexts at step 432 that are waiting for the current real request to be processed, such as a user's instance of Browser 111 that issued a virtual request for a previously uncached response.

As another embodiment, the request to the server may be issued by WinInet Intercept 160, instead of by Cache 104 as described in FIG. 22. For example, Cache 104 may complete CacheRequest 250 (see FIG. 11) with an appropriate completion data/code that provides an indication to WinInet Intercept 160 that it should issue the request to the server. WinInet Intercept 160 can readily use the API of WinInet 161 that it is intercepting to send the request to the server, instead of having it sent from Cache 104, as described in FIG. 26 (Passthru Request 255). Upon receiving a response from the server, WinInet Intercept 160 would then provide the response data to Cache 104 so that it may be saved for subsequent access.

7.5 Application-Level Crawling

It may be preferable to discover content to cache via user interface interaction, so that application-level processing can be supported, such as executing JavaScript code on a web page. For example, this approach supports web pages that are considered to be dynamic, such as those using client-side logic (e.g., JavaScript, application plugins, etc.) to affect its layout/content in response to user actions (e.g., expanding a multi-level menu, zooming/moving a map, hovering to show context-specific balloons, etc.), often without requiring navigation to another page. Since these web pages are changing dynamically, the server resources accessible by a page need to be discovered by performing the user interactions that trigger their access. The page elements that may interacted with through the user interface are considered here to be "eventable" elements, since they are generally associated with user interface events (e.g., click, focus, hover); for example, a web browser may allow a page element to register a handler function to be called when a user interface event is triggered on it.

FIG. 23 is a UML sequence diagram for the UML frame Crawl Page 366, which is an embodiment for application-level crawling of a web page. In general, the web page is initially crawled by interacting with the different UI elements accessible to a user, and then it may be subsequently refreshed in an efficient manner using protocol-level requests.

At step 440, Crawler 131 initializes the application prior to accessing the page, such as actions that help prepare the application for correct and efficient operation. For example, it may be desirable to open a new window for the page, to avoid changing the window context of the previous page before the current navigation. It may also be desirable to trap the registration of event handlers so that eventable elements can be easily found (e.g., enabling the interception of calls to the IHTMLElement method, attachEvent).

An aspect of the invention according to some embodiments is that dynamic components of a page may be efficiently refreshed by protocol-level requests from the server when the page is unchanged; a page may be considered unchanged when its components, such as its supporting logic (e.g., JavaScript) are unchanged. This approach has the advantage of avoiding the delay associated with interacting with the user interface, such as waiting for dynamic UI elements to be requested from the server and/or rendered on the screen. The embodiments may track the relevant components loaded within the context of a page, such as the JavaScript loaded statically (via inclusion) or dynamically (via XMLHttpRequest) by the page. In one embodiment, Crawler 131 calls WinInet Intercept 160 at step 442 to set the current page that "contains" the resources subsequently requested within the context of that page; WinInet Intercept 160 includes this "container page" as a parameter to some or all requests sent to Cache 104 (e.g., via a custom value in the "Pragma" header). As previously mentioned in FIG. 11 (UML frame Cache Request 205), Cache 104 can use this request parameter to associate resources as components contained within the specified page.

Crawler 131 loads the page by calling Browser Control 133 at step 444, which in turn calls Browser 134 to perform the navigation, at step 445. When the navigation occurs, the embodiment performs processing related to eventable elements UML frame Process Eventables 446 (see FIG. 24). Crawler 131 waits for the page to be ready by calling Browser Control 133 at step 448, which in turn calls Browser 134 at step 449 to wait for the page, such as waiting until page elements have been initialized.

At step 450, Crawler 131 decides whether it needs to crawl the page, such as when the page has never been crawled before or if the page (particularly dynamic logic, such as included scripts) has changed since it was last crawled. At step 452, Crawler 131 queries Cache 104 for the relevant components that make up the page, such as client-side logic that is included by that page. In loop 454, each of these page components are refreshed from the server via protocol requests, which is described in FIG. 7 (UML frame Protocol Request 180). If any of the components are determined to have changed at step 456, then the page is set to be recrawled at step 458.

Figure 25:
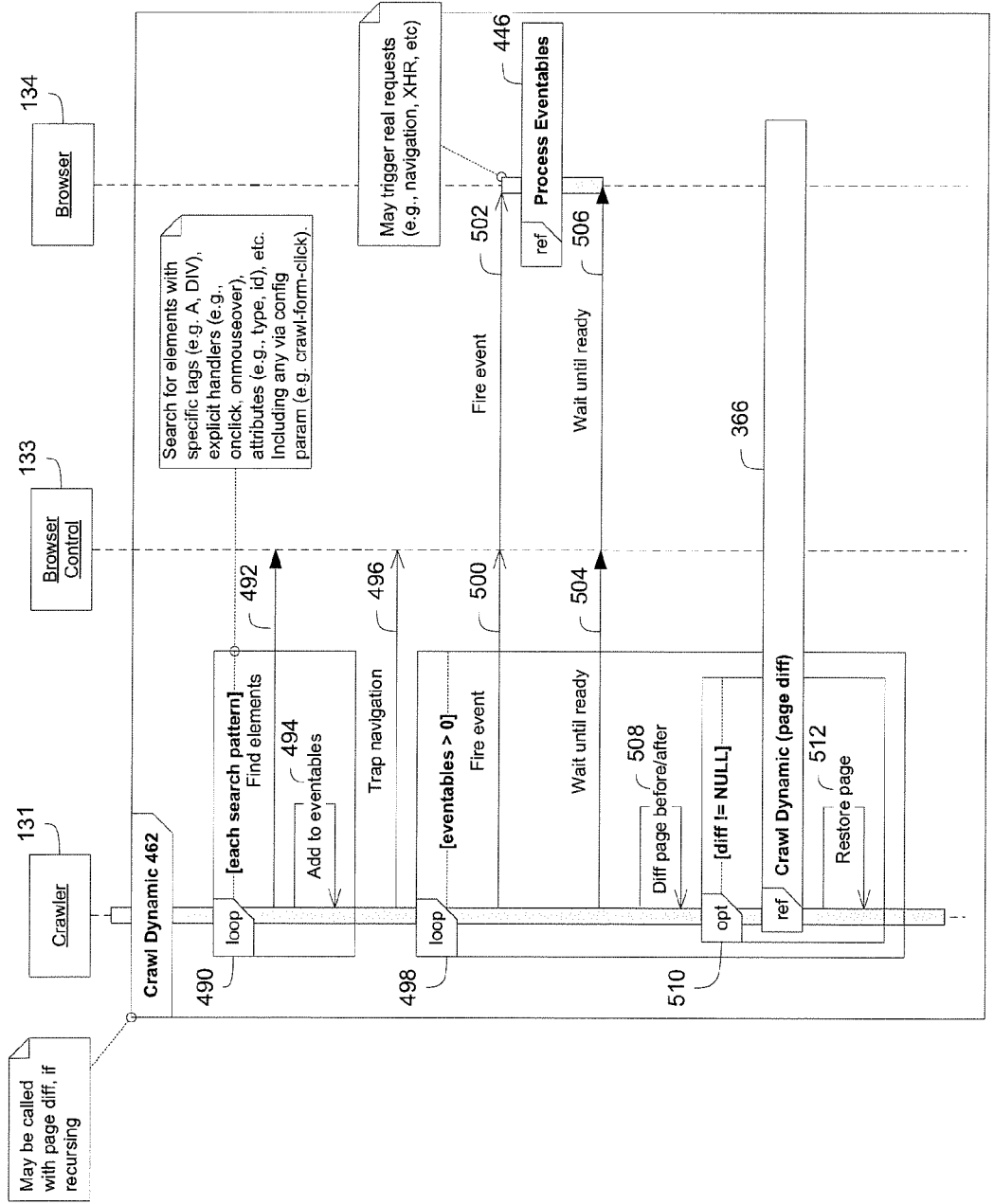
FIG. 25 is a UML sequence diagram for the UML frame Crawl Dynamic, which is an embodiment for interacting with all or part of a web page.

At step 460, if the page needs to be crawled, then it is processed in UML frame Crawl Dynamic 462 (see FIG. 25). Since this is the starting point of the crawl for the current page, the entire page will be crawled.

Figure 24:
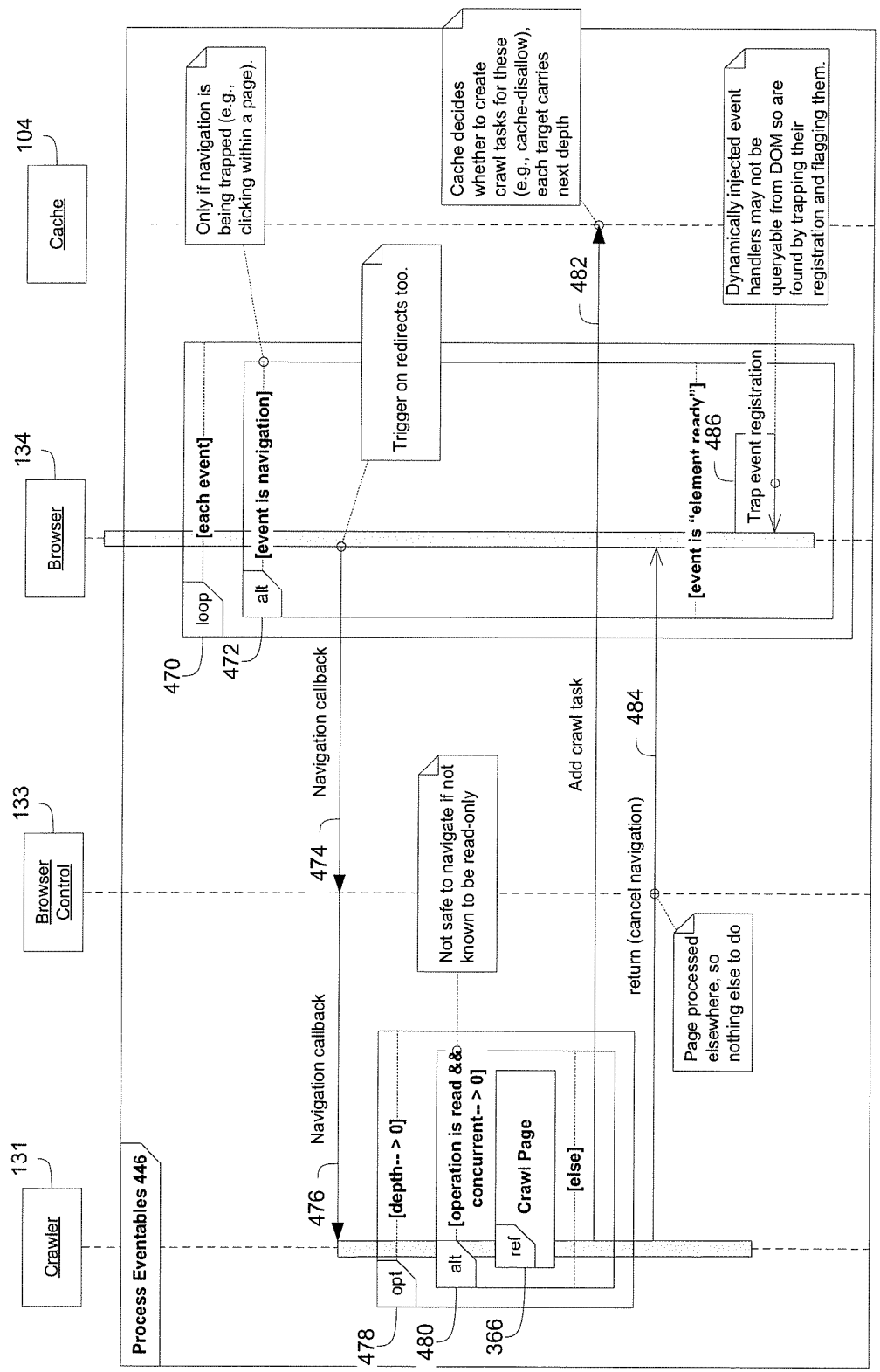
FIG. 24 is a UML sequence diagram for the UML frame Process Eventables, which is an embodiment for the processing of events that affect a web page.

FIG. 24 is a UML sequence diagram for the UML frame Process Eventables 446, which is an embodiment for the processing of events that affect a web page. When Crawler 131 interacts with the user interface of Browser 134, one or more events may be triggered and these events may signal a dynamic change to the page that needs to be detected, such as navigation to another page or insertion of new content into the current page. To enable this detection, Crawler 131 registers handlers for these events of interest prior to interacting with Browser 134.

In loop 470, Browser 134 triggers the events resulting from an action by Crawler 131, such as navigating to a new page or interacting with a currently loaded page. When a registered event is triggered, Browser 134 will call the associated handler.

In the first case of 472, a navigation event is detected and trapped, such as when Crawler 131 is working on a currently loaded page and it wants to detect a transition to another page. Detecting page transitions enables Crawler 131 to determine whether it should stop (e.g., exceeds recursion depth), proceed within the current browser context, or queue the request as a task to perform later (perhaps by separate instance of Crawler 131). When the navigation event is triggered, Browser 134 notifies Browser Control 133 at step 474, which in turns notifies Crawler 131 at step 476.

At step 478, Crawler 131 decides whether the new page should be crawled, such as when the navigation depth has not been exceeded. If Crawler 131 decides to crawl the page, it then decides at step 480 whether it should handle the new page now, concurrently in another browser tab/window via UML frame Crawl Page 366 (see FIG. 23), or it should defer its handling, such as queuing it to Cache 104 at step 482. Finally, Crawler 131 returns a response at step 484 to indicate to the current browser context of Browser 134 whether the page navigation should be canceled, such as when since its handling was performed by or deferred to a different context.

In the second case of 472, element initialization is detected and its event registration is trapped, such as when Crawler 131 is interacting with a page and it wants to detect event registration of any new elements that might be instantiated. An element on a page may dynamically register event handlers, such as in response to an interaction by Crawler 131, and these event handlers may not be readily found, since Browser 134 may not expose them (e.g., Microsoft Internet Explorer does not provide a query for handlers registered through its proprietary IHTMLElement method, attachEvent). To handle this case, embodiments of the invention trap the registration of event handlers by page elements at step 486, such as by overriding the element's event registration method, so that it may detect these dynamically registered handlers, such as by inserting a custom DOM attribute into the element. This allows the embodiments to search for any eventable element, regardless of whether it is uses a visible event handler (e.g., searching DOM for onclick handler) or one that is not readily visible (e.g., searching for custom attribute inserted when attachEvent is called).

The following is an HTML Component for Internet Explorer (e.g., installed via CSS behaviors) that traps the registration of event handlers via IHTMLElement's attachEvent( ) method:

```
<PUBLIC:COMPONENT>
<PUBLIC:ATTACH EVENT="ondocumentready" FOR="element"
    ONEVENT="initMe( )" />
<SCRIPT LANGUAGE="JScript">
function initMe( )
{
    this.attachEvent = (function(origAE) {
        return function(ev, fn) {
            this.setAttribute("mobo", "attached");
            origAE(ev, fn); }
    })(this.attachEvent);
}
</SCRIPT>
</PUBLIC:COMPONENT>
```

FIG. 25 is a UML sequence diagram for the UML frame Crawl Dynamic 462, which is an embodiment for interacting with all or part of a web page. In general, the eventable elements on a web page are found and then interacted with by the crawler to ensure that dynamic resources (e.g., images, script, etc.) are cached when a user subsequently attempts to access them.

In loop 490, Crawler 131 may call Browser Control 133 to search for elements according to one or more parameters, such as those with certain tags and/or certain attributes. For example, embodiments of the invention may search for HTML elements with certain tag names or attributes, such as those with event handlers registered via the DOM (e.g., onclick, onmouseover), any with certain custom attributes (e.g., "mobo" attribute inserted by an embodiment to mark handlers registered through browser-proprietary methods), and any with tags matching a configuration parameter (e.g., A, DIV, etc.). These eventable elements are added to a list for subsequent processing at step 494.

Prior to triggering the events on the eventable elements, Crawler 131 traps navigation to a new page, which may result when triggering an event. This allows Crawler 131 to be called so that it can, for example, limit crawling to a particular navigation depth or process the new page in a new concurrent browser window. For example, Crawler 131 can trap navigation by registering a pre-navigation handler (e.g., via Internet Explorer's DWebBrowserEvents2's BeforeNavigate2 event callback), allowing it to selectively block requests for write operations or limit the navigation depth.

In loop 498, Crawler 131 triggers each of the events on each of the eventable elements that were previous found. The events are triggered by calling Browser 133 to "fire" the event (i.e., as if the user had performed the associated action) at step 500, which in turns triggers the event within Browser 134. Triggering events may cause changes in the browser state, such as navigation to a new page or loading new dynamic elements on the current page, and the handling of these are described in FIG. 24 (UML frame Process Eventables 446).

Crawler 131 calls Browser Control 133 to wait for the page to be ready at step 504, which in turn waits on Browser 134 at step 506. At step 508, current page is compared to its state prior to triggering the event at step 500 to see whether it may have changed the page (e.g., created new actionable elements).

If there are any changes resulting from 506, then Crawler 131 processes them in UML frame Crawl Dynamic 366 (see FIG. 25), which may preferably be performed via recursion on just the differences that were found. When the crawling of these changes is completed, the page is restored to the state prior to the click performed at step 512, so that the next event may be cleanly processed upon the next iteration of loop 498.

7.5.1 Content-Based Crawling Policies

In addition to discovering content based on the clickability of an element, the invention according to some embodiments may also examine other content information to control its crawling behavior, such as to increase or decrease the scope of the crawling activity.

It may be desirable to retrieve different responses for a variable request, such as an HTML form, so that they may be cached for offline or accelerated access. For example, a web page may provide an HTML form for generating reports using various input fields. These input fields may allow free form user input, such as a text field (which may require field validation by the server), or they may have fixed inputs, such as provided by HTML select menus, radio buttons, or checkboxes.

For the fixed input fields, the embodiments can be configured to iterate through one or more of the possible options, so that these variations are cached if/when the user attempts to access them. The fixed input fields may be selected via user interface interactions (e.g., clicking) or by modifying the form/document content (e.g., setting the selected/checked attribute of an HTML element or setting the input fields within the POST request corresponding to the submitted form).

For the free from input fields, the embodiments can determine an appropriate set of possible inputs, such as looked up from an internal database of possible inputs that are chosen based on a criteria that may include information about the form (e.g., URL, form element ID, etc.) and/or the input field (e.g., type, name, input element ID, etc.). For example, the embodiments can be seeded with one or more sets of input fields for a specific report generation form, and each of these input sets are submitted to cache the desired reports.

It may be desirable to limit the content that may be retrieved from the server; such as to avoid caching content that is unlikely to be interesting to the user. For example, a web page may provide a calendar that allows navigation to any day of any year. However, it may be desirable to restrict crawling through dates beyond a certain range, such as more than a few months prior to the current date, to avoid the associated cost (e.g., processing time, storage utilization, bandwidth consumption, etc.) of retrieving that content.

Embodiments of the invention may apply a filter on the content it will crawl, such as filtering out eventable elements prior to clicking on them at step 500 of FIG. 25. This filter is logically applied to the identifying information for the element, such as based on the URL stored in "href" attribute of an HTML anchor tag or a particular form input field; for elements associated with application logic, such as JavaScript, the embodiments may trap the request resulting from user interface interaction on the element, preventing any requests that are disallowed by the filter. For example, the Microsoft Sharepoint web application provides a calendar that is accessed through JavaScript-enabled buttons associated with each day, month, or year. The embodiments can filter out undesirable date ranges by examining the date encoded within URL of the HTTP GET requests that result from clicking on the various date buttons. This filtering approach can apply to any portion of the request, including the request headers and the request body (e.g., HTTP POST).

7.6 Pass Through Requests

Figure 26:
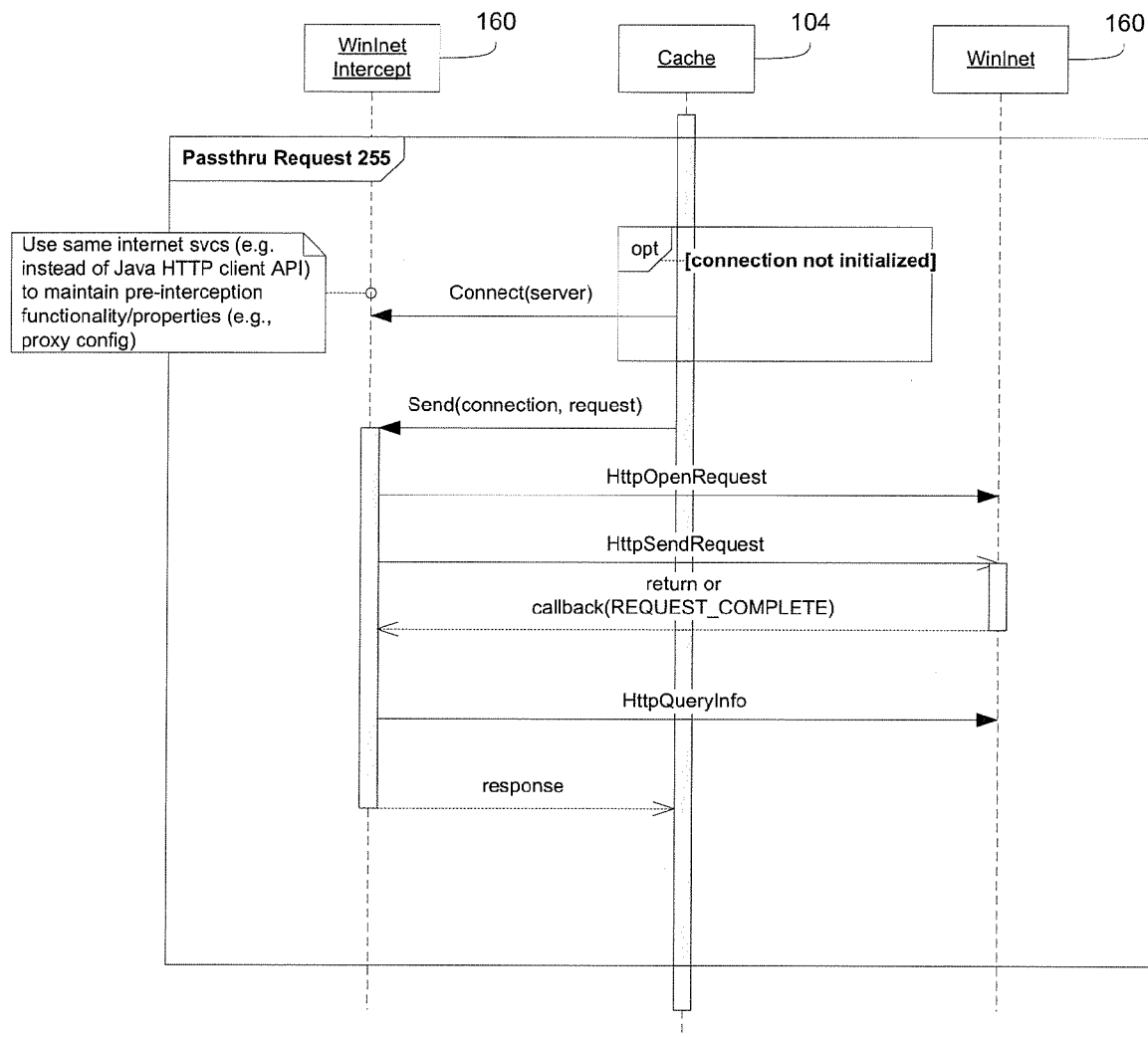
FIG. 26 is a UML sequence diagram for the UML frame Passthru Request, which is an embodiment for passing a request through to the server when the Cache decides not to handle it.

FIG. 26 is a UML sequence diagram for the UML frame Passthru Request 255, which is an embodiment for passing a request through to the server when the Cache decides not to handle it. Depending on factors such as the request type or the response status (e.g., successful completion), the response from a pass through request may still be saved to the cache.

8 Pending Writes

An aspect of the invention according to some embodiments is that write operations can be supported, even if the Client 100 is offline, by pending them, such as in a queue, and deferring their submission to the server until some other time, such as when connectivity is restored. As with requests for read operations, requests for write operations are pended by intercepting them when they are issued. A write operation can include any operation that will result in a change in content on the server, such as creating, modifying, or deleting content. After the write operation is requested and stored, but before it is sent to the server, it is considered to be "pending."

There are different ways to intercept a client request for a write operation to a server. For example, the request can be intercepted from within the client application, such as capturing the HTML form input fields within a web browser, or the request can be intercepted at the protocol layer, such as capturing the HTTP POST request intended for the web server.

8.1 Intercepting Write Operations from Client Application

It may be desirable to intercept a write operation from within the client application, such as when a write operation may logically consist of one or more protocol-level requests. A write operation may be intercepted from within the client application using different mechanisms, depending on the application and operation. For example, a web browser may perform different types of write operations, such as submitting an HTML form or copying a folder to an FTP site. A general approach for intercepting a write operation from a client application is to detect the write operation at an appropriate point prior to the issuance of its associated protocol-level requests, where the necessary parameters of the operation can then be captured. The write operation can subsequently be submitted to the server by logically replaying the application-level write operation, such as submitting an HTML form that has been populated with the recorded user input.

Figure 27:
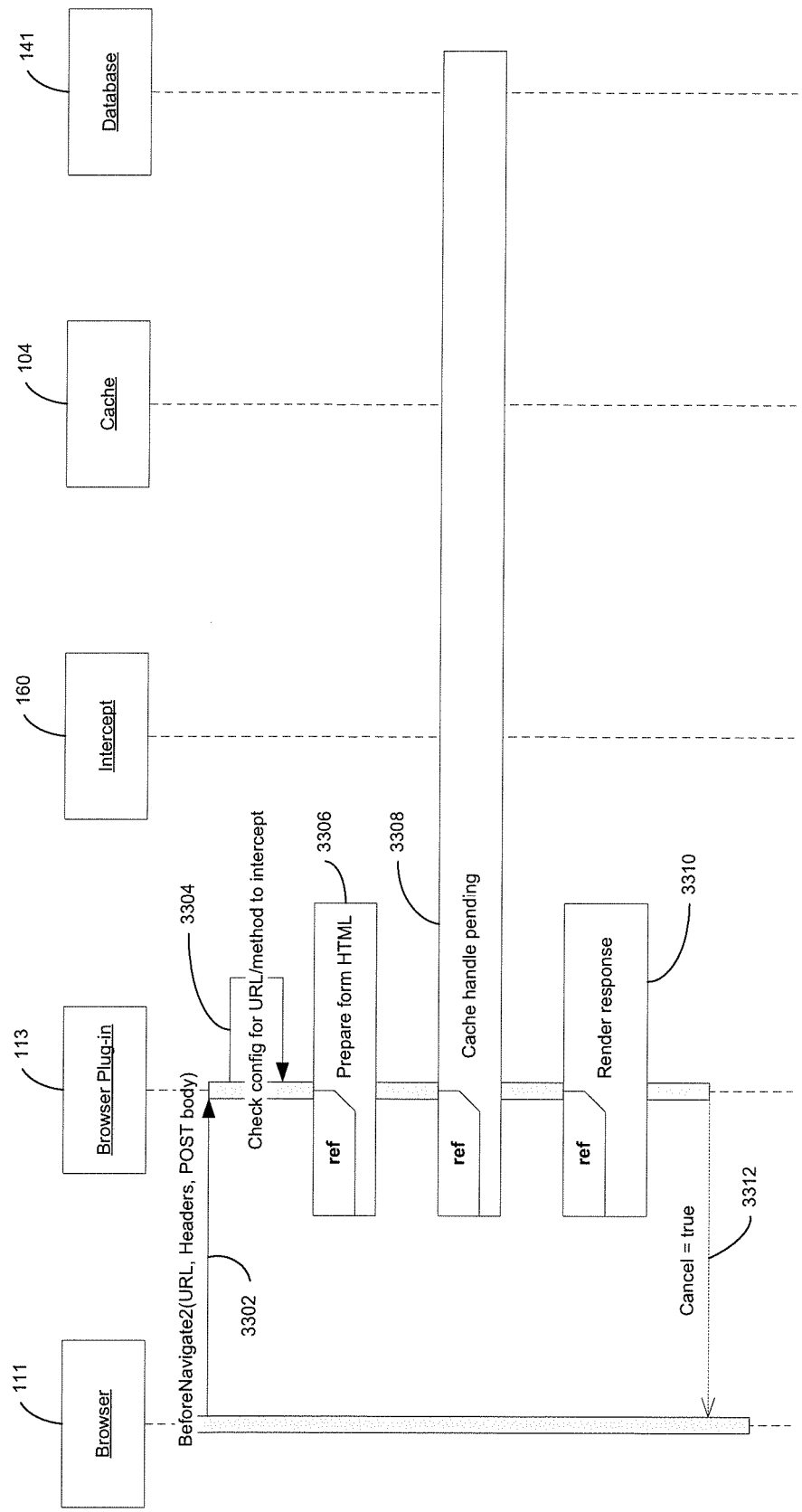
FIG. 27 shows a UML sequence diagram of an embodiment for intercepting a form submission from within Microsoft Internet Explorer web browser.

FIG. 27 shows a UML sequence diagram of an embodiment for intercepting a form submission from within Microsoft Internet Explorer web browser 111. Note that the act of performing a request is also known as navigation. The browser event handler DWebBrowserEvents2::BeforeNavigate2 will be called 3302 in the browser plug-in 113 just prior to performing any navigation. In this embodiment, the browser plug-in is implemented as a BHO in Internet Explorer. Other embodiments include using other browsers and their plug-in technology, including the Firefox browser using Firefox extensions. The plug-in will inspect 3304 the information passed in about the navigation and determine if the request needs to be intercepted or not. This inspection step may involve the use of a configuration parameter that specifies a resource identifier, such as an URL pattern and/or a protocol method, such as HTTP, to match against to determine if the navigation that is about to be performed will result in the submission of a write operation. If the inspection step cannot definitely classify the request as either a read or write operation, then it may be desirable to ask the user; note that an unclassified request may be passed through to the server (if accessible) without being cached since it may not be idempotent.

Another embodiment for intercepting a request is to utilize the Document Object Model (DOM) support in the browser, which provides an API to access and manipulate a browser document. In this case, the DOM of the form could be updated so that a handler function is called when the submit button on the form is clicked, such as by registering a handler for the onclick or onsubmit events associated with the form. The handler function could then capture the form submission, store it and send it to the server later to apply the write operation.

If the inspection 3304 determines that the request is for a write operation, then it is intercepted so that it may be processed even if the server is unavailable. In this embodiment, the form content, which can be HTML, is constructed 3306 by browser plug-in 113, containing the user input inline in the form. The form HTML and form location URL are then passed down 3308 into Cache 104, so that the form can be retrieved later when it is actually submitted to the server. In other embodiments, the form submission may be intercepted at the protocol level, such as capturing the HTTP POST request that would result from this form submission. Intercepting the form and its data has the advantage that it allows the form submission to be fully recreated as if the user actually submitted later; for example, this can accommodate content that uses scripting languages, such as JavaScript, that may perform multiple HTTP requests and/or it may avoid submitting form information to the server that may be stale.

After cache 104 processes 3308 the submission, it returns a response to the browser plug-in which simulates a successful response from the server. The browser plug-in then renders 3310 the response in the browser. This allows the client application to behave as if the request was processed by the server even though it was intercepted. In order to indicate to the web browser that the browser event handler intercepted the navigation and that the browser should not still perform it, the "cancel" output parameter to DWebBrowserEvents2::BeforeNavigate2 is set 3312 to "true."

Figure 28:
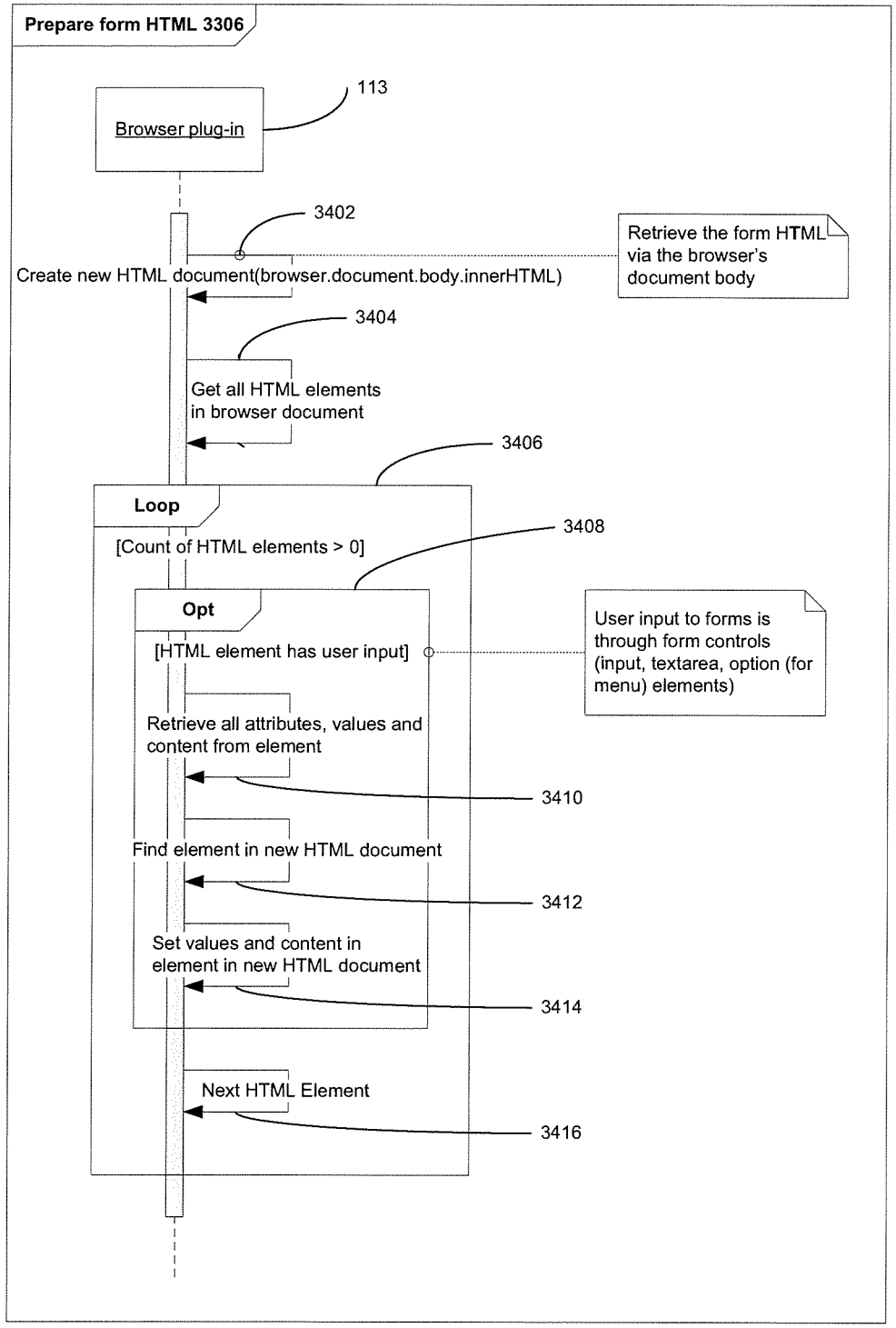
FIG. 28 shows a UML sequence diagram of an embodiment of the "prepare form HTML" step from FIG. 27.

FIG. 28 shows a UML sequence diagram of an embodiment of step 3306, "prepare form HTML," from FIG. 27. In this embodiment, a browser plug-in 113 can use an API such as the MSHTML API, to access the content in the browser using the DOM interface. This allows the browser plug-in to retrieve the HTML of the form and the values of the attributes and contents of the HTML elements in the form. Using this information, the browser plug-in can construct an HTML document of the form with the edit controls populated with the user input. This has the advantage of allowing the system to recreate the form with the user input inline either to submit to the server later or to display to the user if they wish to review or update any information that they entered.

Figure 29:
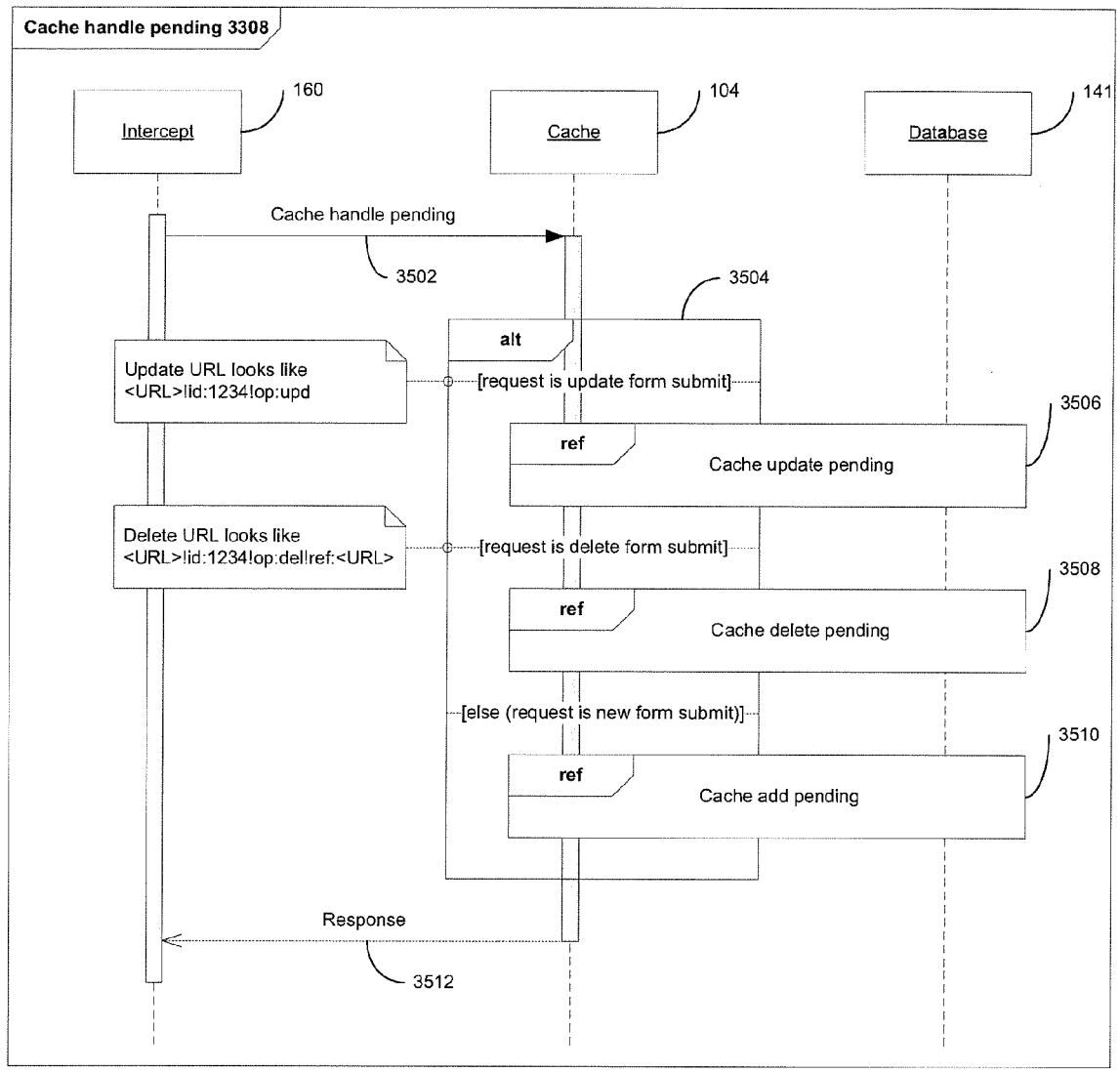
FIG. 29 shows a UML sequence diagram of an embodiment of the "cache handle pending" step from FIG. 27.

FIG. 29 shows a UML sequence diagram of an embodiment of step 3308, "cache handle pending," from FIG. 27.

Here cache 104 determines what type of form write operation is being performed. Because cache 104 captures write operations and allows them to be sent to the server later, this allows a user to be able to review and update a previously submitted write operation or to even cancel or delete a previously submitted write operation. On a new form submission, cache 104 can add 3510 the write operation. If the operation is to update a previously submitted write operation, cache 104 can update 3506 the operation. In addition, if the operation is to cancel a previously submitted write operation, cache 104 can delete 3508 the operation. In this embodiment, cache 104 is able to detect the operation by inspecting 3504 the URL of the form location and checking for the existence of information that identifies to cache 104 the request being operated on and the operation to perform.

Figure 30:
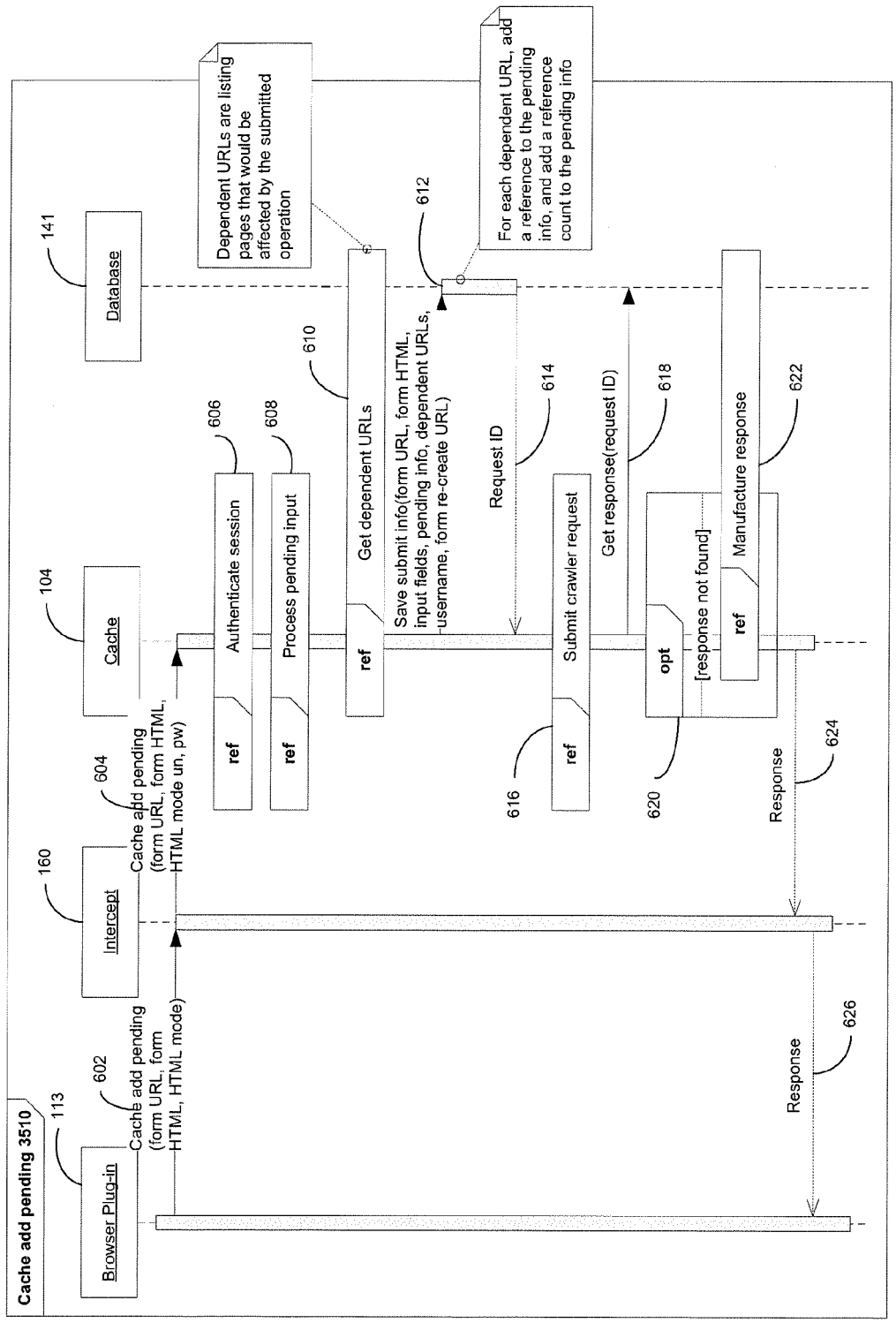
FIG. 30 shows a UML sequence diagram of an embodiment of the "cache add pending" step from FIG. 29.

FIG. 30 shows a UML sequence diagram of an embodiment of step 3510, "cache add pending," from FIG. 29. In this step, cache 104 is handling the submission of a new write operation to the server. The browser plug-in 113 makes a call 602 to the WinInet Intercept 160 to add the operation to cache 104 as pending. Intercept 160 passes the call 604 to the cache 104 to process.

When the intercepted request is sent to the Cache 104, it is first authenticated 606. In this embodiment, the system is integrated with a read cache that is capable of managing authenticated user sessions. This means that the user can authenticate to the read cache as if they were authenticating to the server. The session may be authenticated in several ways, including using credentials available in the HTTP headers, passed in by Intercept 160, or using HTTP session cookies. In another embodiment, the read cache could be an independent system, and the authentication of the user session could involve calling an API that the read cache provides that can verify the current user session. Yet another embodiment could involve using an independent password management system that could be configured with credentials used to control access to the system so that offline requests are authenticated.

Cache 104 may perform any necessary processing 608 on the input, and then retrieve 610 the URLs that are dependent on the write operation. A dependent URL is an URL to any content that is affected by the write operation that is being requested. When this system is used with a read cache, the dependent URLs in the read cache need to be invalidated, meaning that they should indicate that their information is out of date. In this embodiment, the read cache shares a database with the system, and so the dependent URLs can be invalidated when the system stores the list of dependent URLs in the database 612. In another embodiment, the content in the read cache may not necessarily be web content, and so may not necessarily be identified by an URL. Any suitable method for identifying and referencing information could be used, for instance, a path to a file on the local file system.

The write operation and other related information that is captured is stored 612 in some persistent storage, such as a database 141, a filesystem, or some combination thereof. By storing the operation, the system ensures that the operation can be performed on the server later without losing any information that the user entered. For example, if the server is not available because the client is not connected to a network, the operation can be saved and retrieved later when the client does have connectivity to the server and perform the operation at the server. The database returns 614 an identifier, such as a request ID, a name, or a GUID, that identifies the operation that it just saved. In other embodiments, the write operation information can be stored in different ways, such as in files on the file system or a combination of files and entries in a database that store the path to the files that contain the request operation information.

After saving the operation, cache 104 submits 616 the request to a crawler 130. In this embodiment, the crawler is responsible for sending the request to the server. Separating the communication with the server through the crawler has the advantage of allowing the system to wait for a response from the server so that it appears to communicate synchronously, or run in an accelerated mode where it does not wait for a response from the server and instead constructs a response to return to the client immediately.

Cache 104 next queries 618 the database for a response associated with the request ID. In this embodiment, the crawler and cache share a common database. In another embodiment, where the crawler is separate from the cache, the cache might have to retrieve the response from the crawler in a different way, such as making an API call to the crawler or retrieving a file in a directory where the crawler writes response data.

If a response is not found 620 in the database, then a response may be manufactured 622 to be sent back to the client. There are several reasons why a response might not be in the database, for example, if the crawler was not able to communicate with the server, or if the server took too long to respond to the request from the crawler. The response is then returned 624 to Intercept 160 and then returned 626 to the browser plug-in to render 316.

Figure 31:
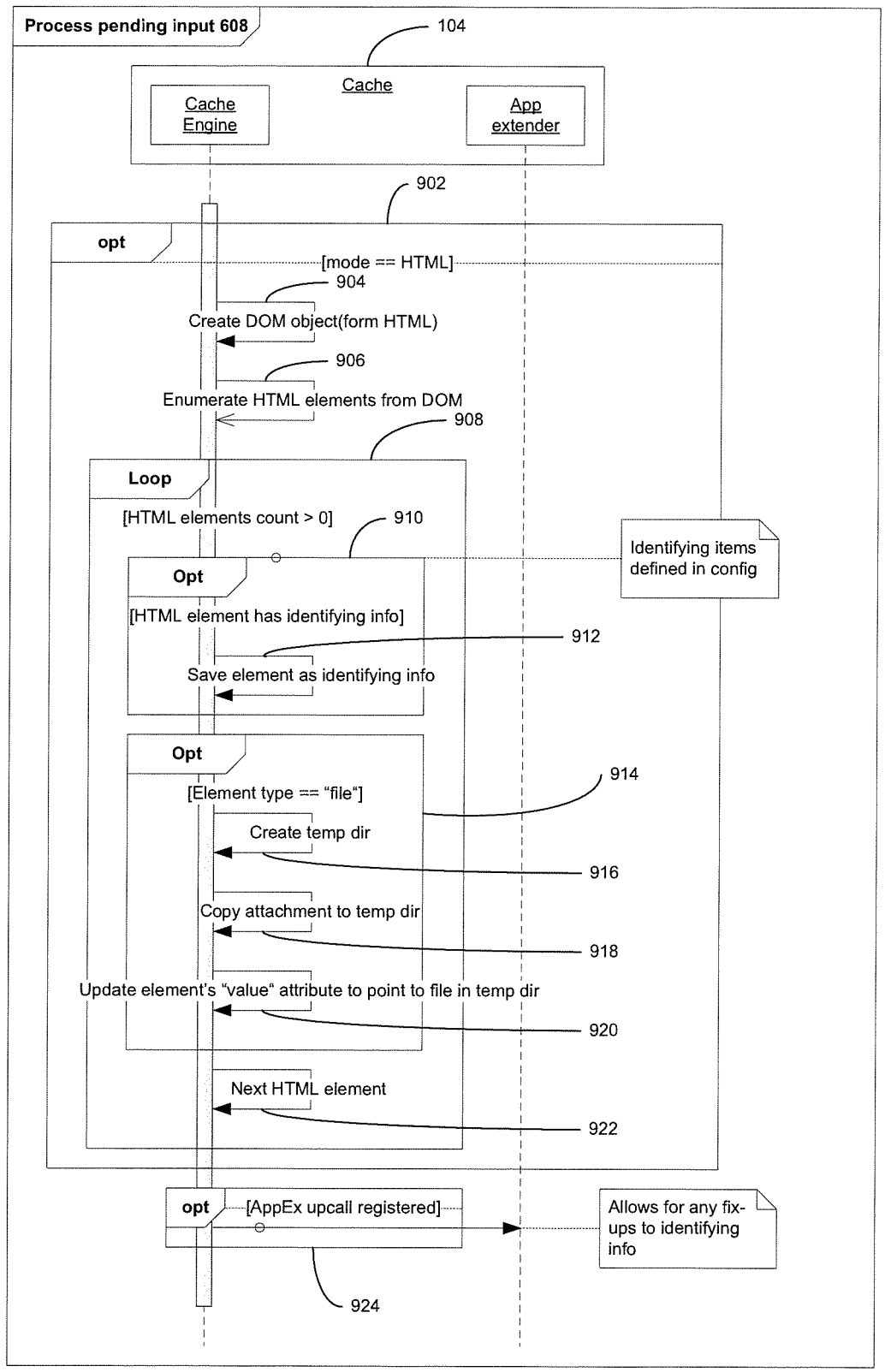
FIG. 31 shows a UML sequence diagram of an embodiment of the "process pending input" step from FIG. 30.

FIG. 31 shows a UML sequence diagram of an embodiment of step 608, "process pending input," from FIG. 30. The processing step allows cache 104 to handle any cases specific to certain inputs that it has been given. In this embodiment, the processing is specific to handling 902 HTML input. By identifying the input type and isolating the input handling to this step, the system can be extended easily to handle other input types. The cache can process the HTML input in any number of ways, for example, but not limited to, using the Document Object Model (DOM) API or using any string or text handling APIs to parse the HTML.

In order to facilitate working with the HTML input, in this embodiment, cache 104 uses the DOM API to construct 904 a DOM object from the HTML of the form that it was given as input. This allows cache 104 to do tasks like enumerating 906 the elements in the HTML document using the DOM API. Cache 104 then loops 908 over elements in the document and determines 910 if an element contains identifying information about the operation. A configuration parameter can be used for this determination. It can perform a pattern match on the URL of the submitted form and identify the name or ID of elements that are known to contain identifying information for the given form. This identifying information can be used by systems where information about the pending write operation is presented to the user, such as when the read cache gets a request for content that would be affected by the write operation. This has a few advantages, including allowing a viewer of the affected content to know that it may be out of date and allowing content to be updated and refreshed at the server independently.

Next, there is handling 914 for HTML elements of type "file." A copy of the file is taken by creating 816 a temporary directory and copying 918 the file to that temporary directory. The advantage of handling the file in this manner is that it allows the system to take a snapshot of the file at the time of the request, which allows the user to then operate on their local copy of the file as if it is a different version from the one submitted. The value of the HTML element is then updated 920, so that instead of referencing the file in its original location, it will reference the file that was copied to the temporary directory. This effectively branches a different version of the file that will be submitted to the server later. In another embodiment, the file can be captured and stored in some other storage, such as a database.

If there is any application-specific logic configured for the URL of the form, then it is called 924, which allows any custom logic to be performed, for example to handle input of a type other than HTML.

Figure 32:
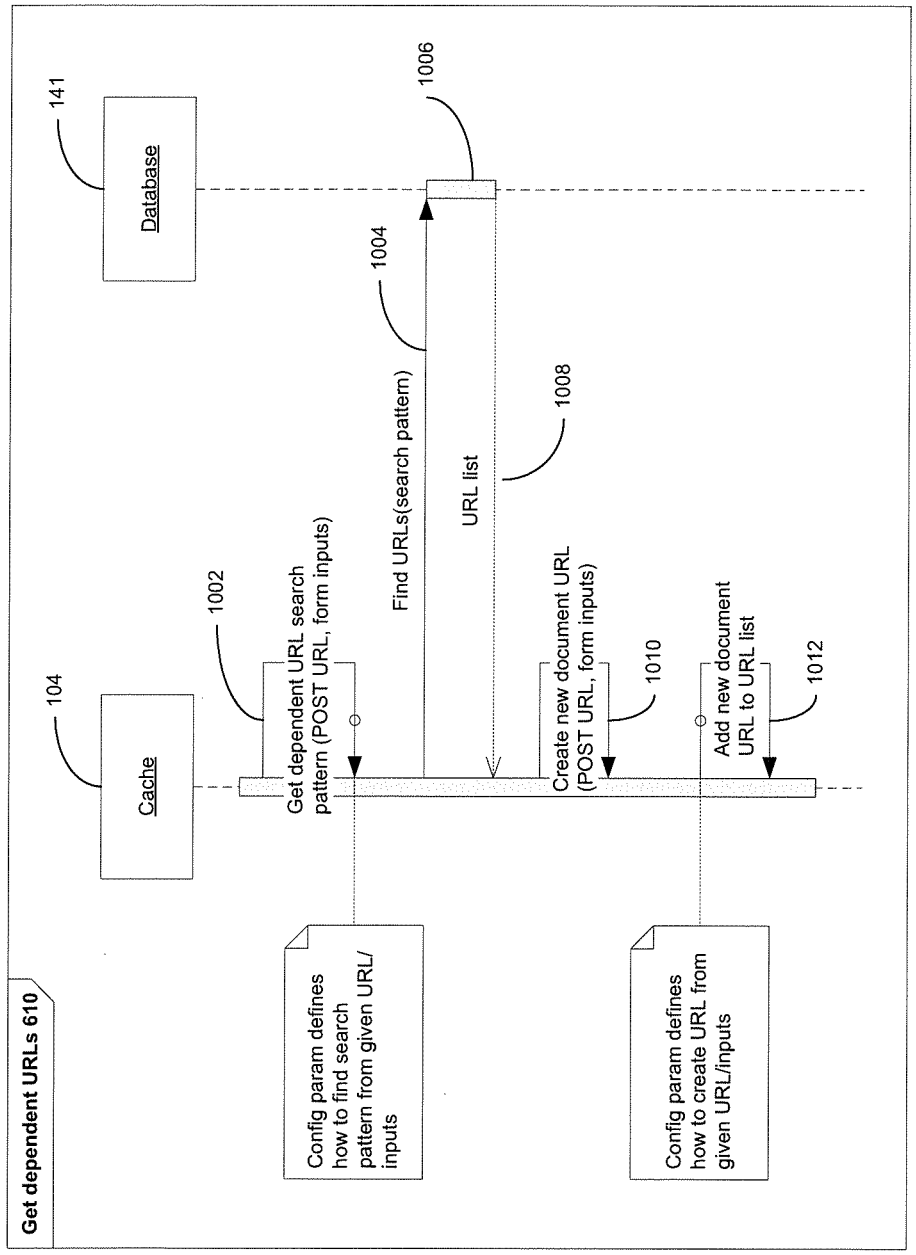
FIG. 32 shows a UML sequence diagram of an embodiment of the "get dependent URLs" step from FIG. 30.

FIG. 32 shows a UML sequence diagram of an embodiment of step 610, "get dependent URLs," from FIG. 30. A dependent URL is an URL to any content that is affected by the write operation that is being requested. In this embodiment, the list of dependent URLs is built with a mechanism that can use configuration parameters. A first configuration parameter identifies 1002 portions of the request that can be used as a search pattern to find dependent URLs in the read cache, for example, a substring in an URL path. Next, the database is queried 1004 for URLs using the search pattern and the result list of URLs is returned 1008. Next, an URL is created 1010 that will correspond to any document that may be created as a result of the write operation. An example of this case would be a write operation that uploads a new document to the server. In that case, the URL to the document being added should be added to the read cache so that it will be available offline.

Figure 33:
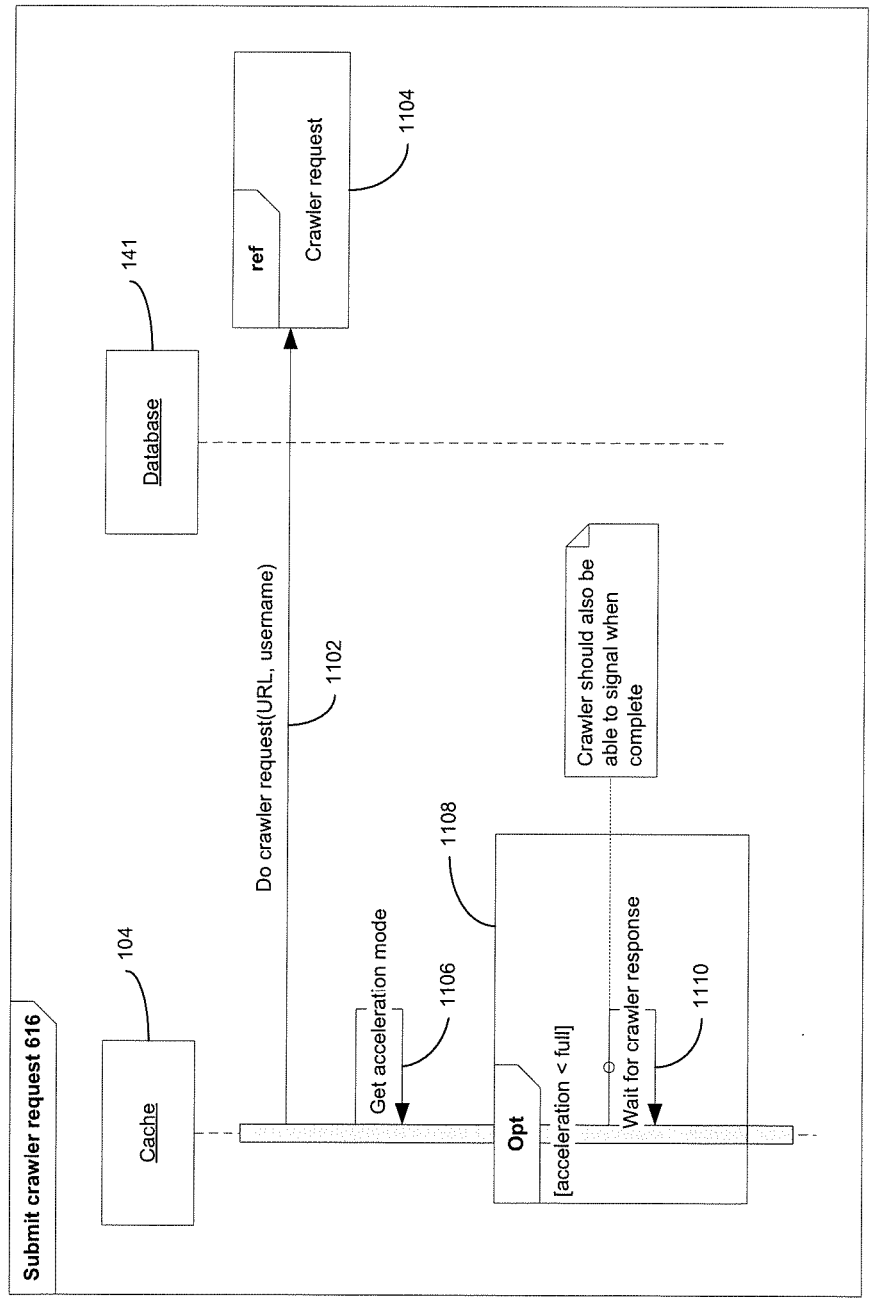
FIG. 33 shows a UML sequence diagram of an embodiment of the "submit crawler request" step from FIG. 30.

FIG. 33 shows a UML sequence diagram of an embodiment of step 616, "submit crawler request," from FIG. 30. Cache 104 is responsible for intercepting and capturing the write request, but it uses the crawler to actually send the request to the server. In other embodiments, the cache could use some other method of sending the request to the server, such as directly calling into an Internet access API to send the request to the server. In this embodiment, the crawler 130 shares a database 141 with the cache 104, so the cache can signal 1102 the crawler that there is work to submit for a given URL and username and the crawler can find the request in the database to submit. In another embodiment, the crawler may be a separate system and the cache may need to submit work in a different way, for example, using an API that the crawler system makes available. Cache 104 checks a mode 1106 that tells it whether it should wait 1110 for the crawler to finish sending the request to the server or not and if it should, then the cache sits in a wait cycle.

Figure 34:
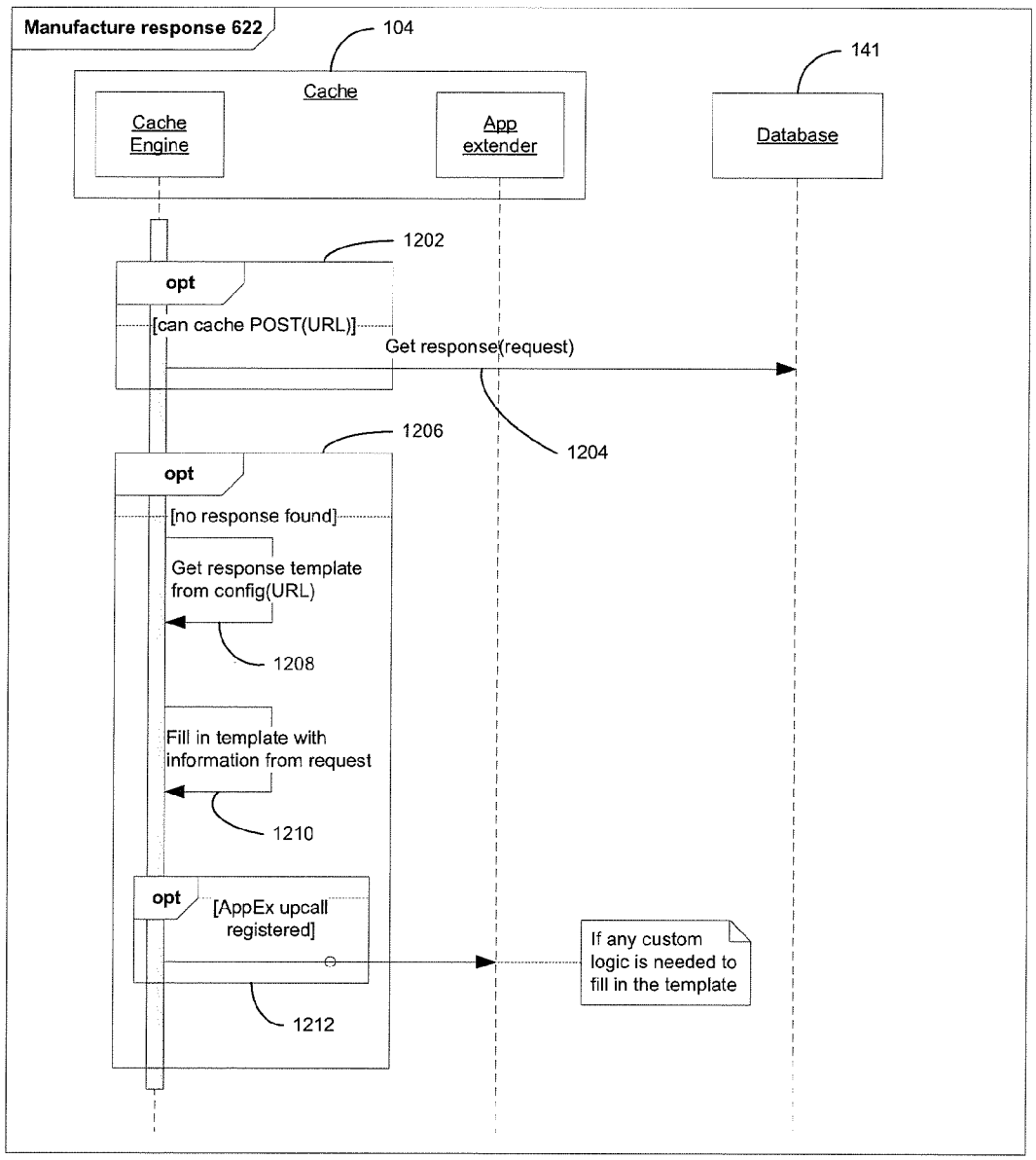
FIG. 34 shows a UML sequence diagram of an embodiment of the "manufacture response" step from FIG. 30.

FIG. 34 shows a UML sequence diagram of an embodiment of step 622, "manufacture response," from FIG. 30. In this embodiment, this step serves the purpose of allowing cache 104 to return a response that simulates what the server would respond with upon successful completion of the write operation. This is what allows cache 104 to intercept the request but still allow the client to behave as if the request was handled by the server.

First, the cache 104 checks 1202 a configuration parameter that indicates if the response to the request could have been stored by the read cache. This is possible for certain types of requests that are idempotent and can return a cached response value for the given request. The database is then queried 1204 to see if the request had ever been made previously and the read cache had already stored a response.

If a response is still not found 1206, then a response is manufactured. In this embodiment, the manufacturing process can use common information for the response, such as in a template file, and information from the current write operation can be substituted into the response template as necessary.

A configuration parameter can be used to find 1208 a response template that is appropriate for the location URL of the form being processed. The template can specify portions that need to be filled in 1210 with information from the request. For example, this can be necessary in the case where a request specifies a name of a file to operate on and the response includes the filename to indicate it was operated on. Finally, if any application-specific logic needs to be executed 1212, a configuration parameter can be set that lets the cache execute any custom logic that may be needed to properly manufacture the response data.

Figure 35:
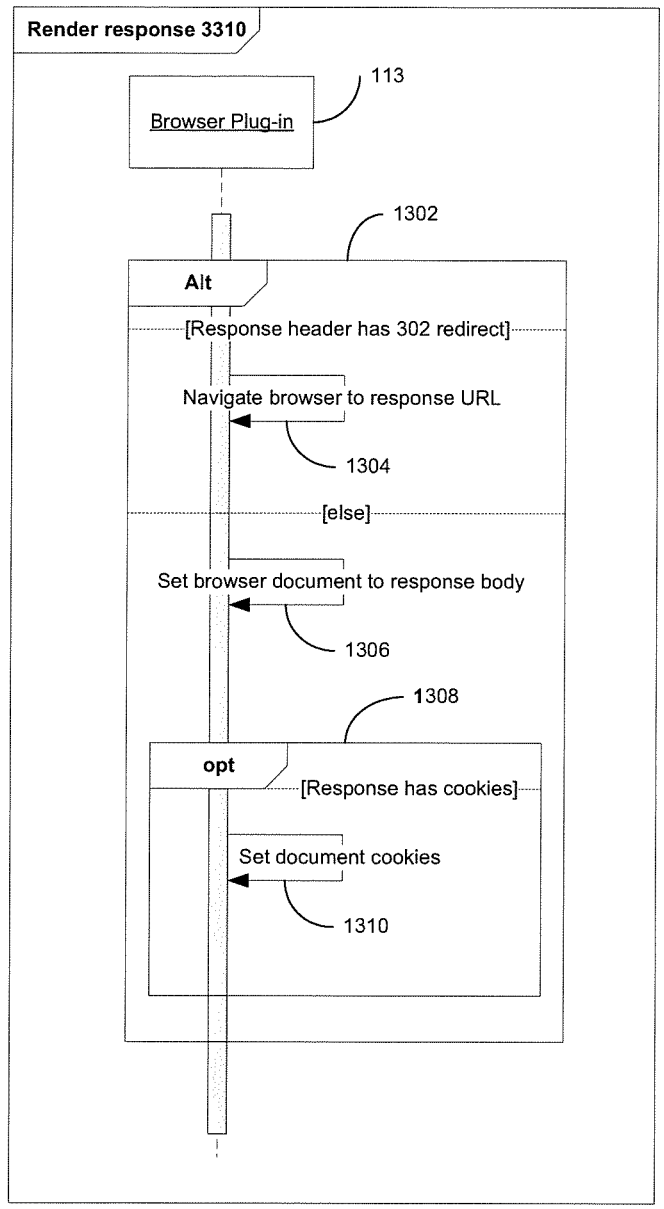
FIG. 35 shows a UML sequence diagram of an embodiment of the "render response" step from FIG. 27.

FIG. 35 shows a UML sequence diagram of an embodiment for step 3310, "render response," from FIG. 27. After the cache 104 has returned a response to browser plug-in 113, the browser plug-in will display the response in the browser that simulates the response that would have been received from the server. The plug-in will first inspect 1302 the response headers for an HTTP status indicating a redirect, which is indicated by a status code of 302. In that case, the browser plug-in will navigate 1304 to the URL that is in the location header of the response using the API available to it. In this embodiment, the API is the IWebBrowser::Navigate API. Otherwise, the browser plug-in will update 1306 the document displayed in the browser to the response body returned. In this embodiment, this would use the IWebBrowser::document property. At 1308, if the response headers contained cookies, the cookies are set using the IHTMLDocument::cookie property in this embodiment.

8.2 Intercepting Write Operations from the Protocol Layer

It may be desirable to intercept write operations at the protocol level, such as to support the interception of similar operations from different applications. For example, many application-level protocols, such as Web-based Distributed Authoring and Versioning (WebDAV) and the Microsoft FrontPage Server Extensions RPC protocol are commonly implemented as HTTP requests. In these cases, the system can intercept the request at the protocol level (e.g., HTTP) and determine if the request is a write operation by inspecting the parameters, such as the method (e.g., POST, PROPPATCH, etc.) and/or request body contents of an HTTP request.

Figure 36:
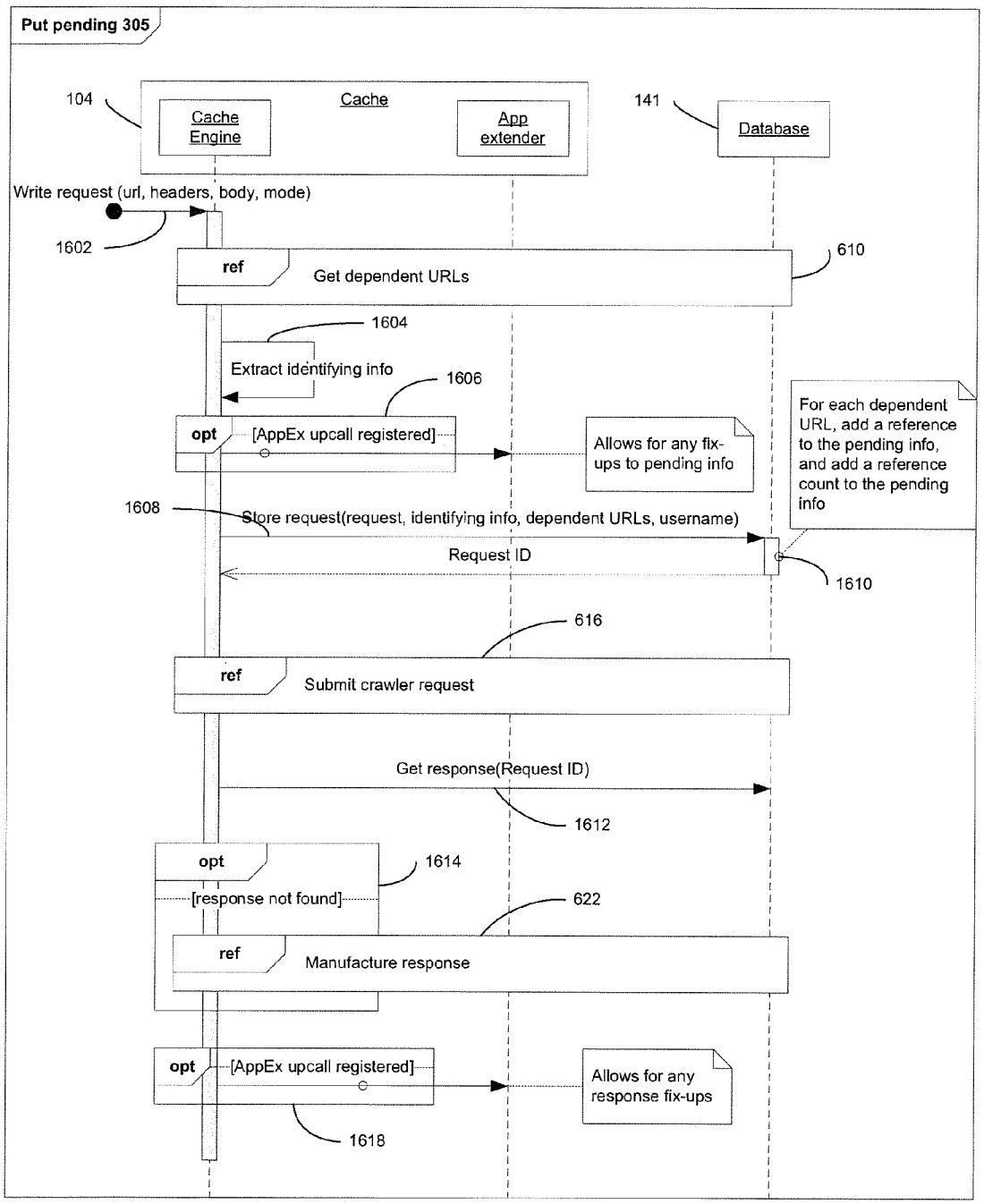
FIG. 36 shows a UML sequence diagram of an embodiment of the UML frame Put Pending from FIG. 15.

FIG. 36 shows a UML sequence diagram of an embodiment for UML frame "Put Pending," from FIG. 15. Cache 104 first calculates 610 a list of dependent URLs. A dependent URL is an URL to any web page that is affected by the write operation that is being requested. Next, the request information is parsed 1604 for any identifying information that can be used to describe the write operation in human-readable terms. Configuration parameters can be used to specify what information in the request is identifying information about the operation. If any application-specific logic is configured for the request, then a call is made 1606 to the application extender. The configuration can be based on matching a pattern in the URL that determines that the application-specific logic needs to be executed. In the application extender, any custom logic can be executed to perform any necessary changes to the dependent URL list or human-readable information that has been parsed out of the request so far. This has the advantage of allowing the flexibility to plug in any handling code that could be necessary to handle different application protocols.

After this, information about the request, including identifying information, list of dependent URLs and username is stored 1608 at the database 141 and assigned 1610 a request ID. The request information is stored so it can be sent to the server later, the identifying information is stored to show what write operations are pending to the server, the dependent URLs are stored to be invalidated to indicate that they are out of date because of the write operation, and the username is stored so that in a multi-user environment, write operations can be sent to the server using the appropriate set of credentials. In other embodiments, the write operation information can be stored in different ways, such as in files on the file system or a combination of files and entries in a database that store the path to the files that contain the request operation information.

Cache 104 then submits 616 the request to a crawler 130 that is responsible for sending the request to the server. In this embodiment, the crawler shares a common database 141, so the cache can signal the crawler that there is work to submit for a given URL and username and the crawler can find the request in the database to submit. In another embodiment, the crawler may be a separate system and the cache may need to submit work in a different way, for example, using an API that the crawler system makes available.

Cache 104 next queries 1612 the database for a response associated with the request ID. In this embodiment, the crawler and cache share a common database and so the crawler can store the response it received from the server in the database associated with the given request ID. In another embodiment, where the crawler is separate from the cache, the cache might have to retrieve the response from the crawler in a different way, such as making an API call to the crawler or retrieving a file in a directory where the crawler writes response data.

If a response is not found 1614 in the database, then a response is manufactured 622 to be sent back to the client. There are several reasons why a response might not be in the database, for example, if the crawler was not able to communicate with the server, or if the server took too long to respond to the request from the crawler. Finally, if any application-specific logic is configured for the request, then a call is made 1618 to the application extender. There any custom logic can be executed to perform any necessary changes to the response.

8.3 Sending the Write Operation to the Server

A pending write operation can be submitted to the server later, such as when the server becomes accessible, such as when network connectivity to it is restored. In some embodiments, a pending write operation can be submitted to the server on some scheduled interval, such as attempting communication to the server every hour. In other embodiments, a pending write operation would be submitted to the server when a user manually commands the system to communicate with the server.

As with read requests to the server, pending writes may be handled in a separate execution context from that of the user, since a user context may not be available at that time, such as when the user has already terminated her browser process. The execution context that submits a pending write (i.e., issues its associated requests to the server) may be provided by any conventional means. For example, a background process can be spawned or signaled when a pending write exists and connectivity with its associated server is restored. The execution context may submit the pending write operation as if the user had actually submitted it, so that the delayed submission may be handled by the server equivalently to the user actually submitting it to the server herself. Since an embodiment provides for a crawler to handle real requests for read operations, the crawler context may be leveraged to handle the real requests for pending write operations.

FIG. 37 shows a UML sequence diagram of an embodiment of step 364 "crawl form," from FIG. 20, which shows the process of a crawler 131 submitting a pending form submission. First, crawler 131 uses browser control API 133 to navigate browser 134 to the URL of the saved form that was populated with the user's submitted input. Protocol request U180 (see FIG. 7) will retrieve the form saved at 612. Next, the crawler will use the browser control API to simulate the submit button on the form being clicked 2408, causing the browser to send protocol request U180 to the server, resulting in the write operation being submitted to the server.

Figure 38:
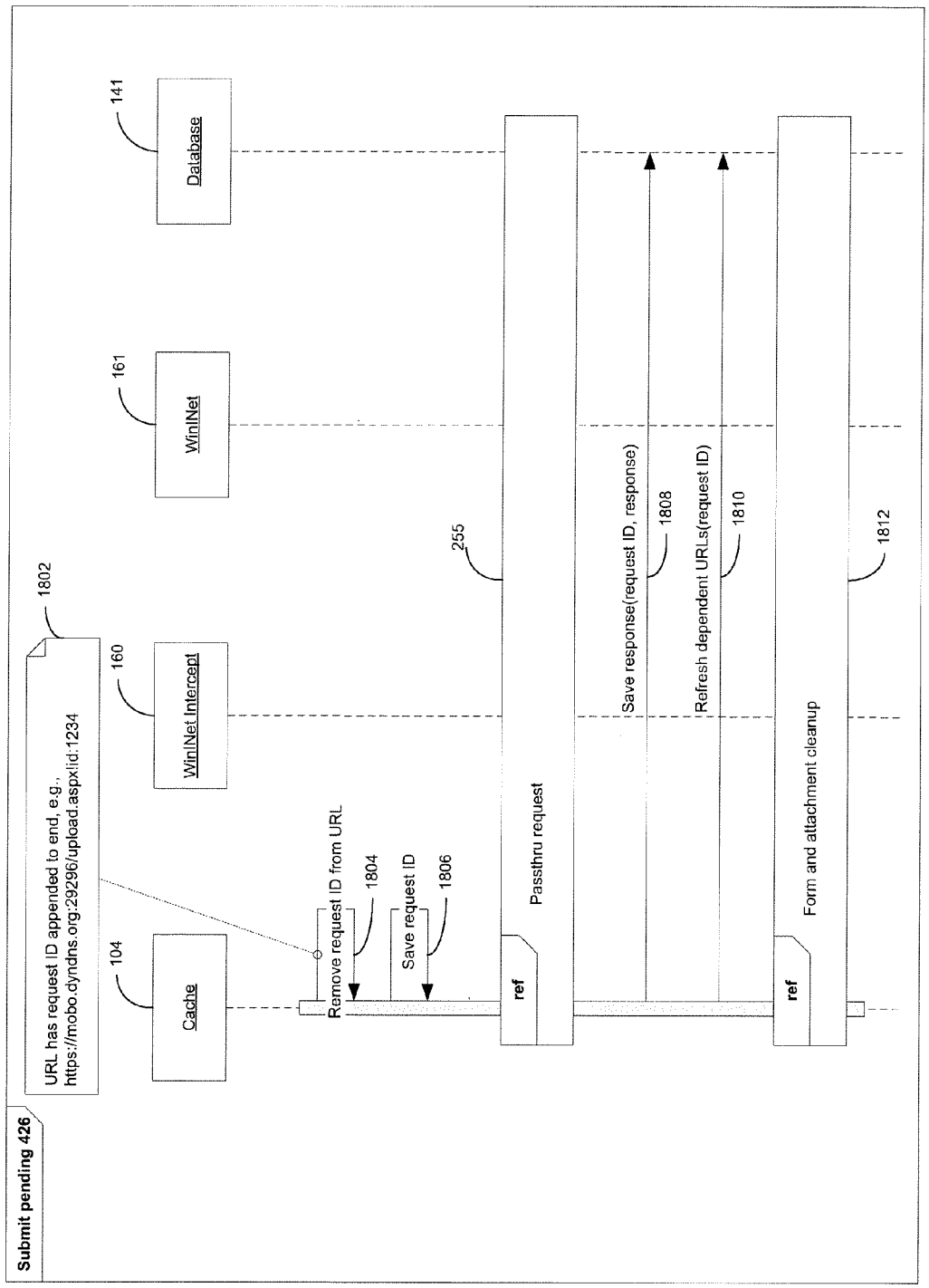
FIG. 38 shows a UML sequence diagram of an embodiment of the "submit pending" step from FIG. 22, which shows the process of the write operation being sent to the server as a real request.

FIG. 38 shows a UML sequence diagram of an embodiment for step 426 "submit pending," from FIG. 22, which shows the process of the write operation being sent to the server as a real request.

Referring now to FIG. 38, in this embodiment, the request ID is passed to the cache by appending it to the request URL. In other embodiments, the request ID can be passed using different methods such as through a request header or a hidden input field added to the request body. Cache 104 removes 1804 the request ID from the URL and saves 1806 it. At this point, the write operation is sent as a pass through request 255 (see FIG. 26) to the server.

After cache 104 receives the response from the server, it stores 1808 it in the database associated with the request ID. In this embodiment, as illustrated in step 1612 in FIG. 36 and step 618 in FIG. 30, when the write operation is submitted, the cache can be configured to retrieve the response from the database after submitting the request to the crawler. This allows the flexibility of either accessing the server asynchronously or in a mode that appears synchronous to the client.

In this embodiment, an integrated read cache contains content that was invalidated as a result of the write operation being requested (as in step 612 in FIG. 30 and step 1610 in FIG. 36). At that time, the content was invalidated so that when it is requested from the read cache an indication can be given that the contents may be out of date.

After the write operation is sent to the server, the invalidated content can be refreshed in the read cache from the server so that its content is brought up to date to reflect the write operation being performed. In this embodiment, the read cache shares a database 141 with the system, and so the system can specify 1810 through the database that the invalidated content can now be refreshed.

In another embodiment, where the read cache is a separate system, the system may indicate to the read cache that it needs to refresh the URLs via an API that the read cache makes available or by deleting the content from the read cache, forcing the read cache to retrieve a new copy of the content.

After the write operation is successfully sent to the server, cache 104 is able to perform 1812 any clean up necessary.

Figure 39:
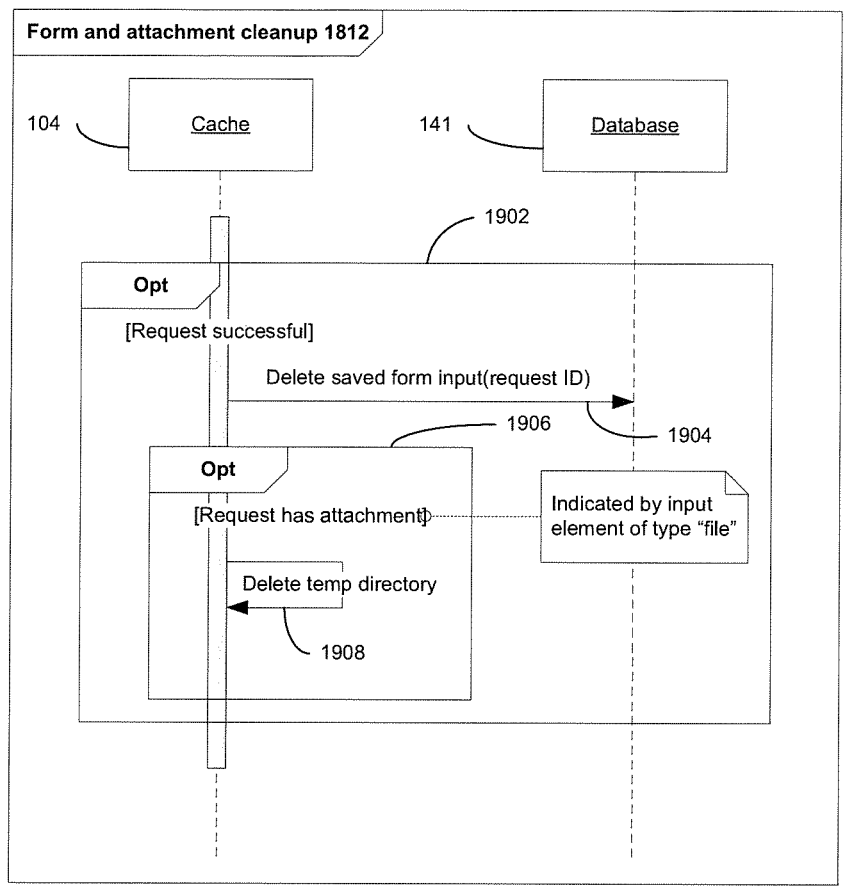
FIG. 39 shows a UML sequence diagram of a more detailed embodiment of the "form and attachment cleanup" step from FIG. 38.

FIG. 39 shows a UML sequence diagram of a more detailed embodiment of the "form and attachment cleanup" performed in FIG. 38. If the request to the server was completed successfully 1902, cache 104 will delete 1904 the saved operation information from the database using the request ID. Next, if the operation contained any HTML elements of type "file," then there are additional cleanup steps. As shown in step 914 in FIG. 31, whenever a form submission is intercepted, if a file is being sent as part of the submission then a copy of the file is created to be sent. At step 1906, the copied file is no longer necessary, and so the file and the temporary directory that it was placed in can be deleted 1908.

8.4 Accessing Pending Write Operations

An aspect of the invention according to some embodiments is allowing access to write operations while they are pending, that is, after the user has submitted the write operation but before it is submitted to the server. This allows the pending write operation to be displayed on any dependent page that would be affected by the pending write operation. This also allows the user the ability to update or delete the write operation before it is submitted to the server, allowing the user to access their content at any time after they submitted the write operation.

An embodiment makes use of a common caching layer to provide local storage for content associated with both read and write operations. When the write operation is intercepted by the system, a list of dependent URLs was generated and invalidated as in step 612 in FIG. 30 and step 1610 in FIG. 36. When one of these invalidated URLs is requested from the read cache, an indication is shown that presents information about the pending write operation.

Figure 40:
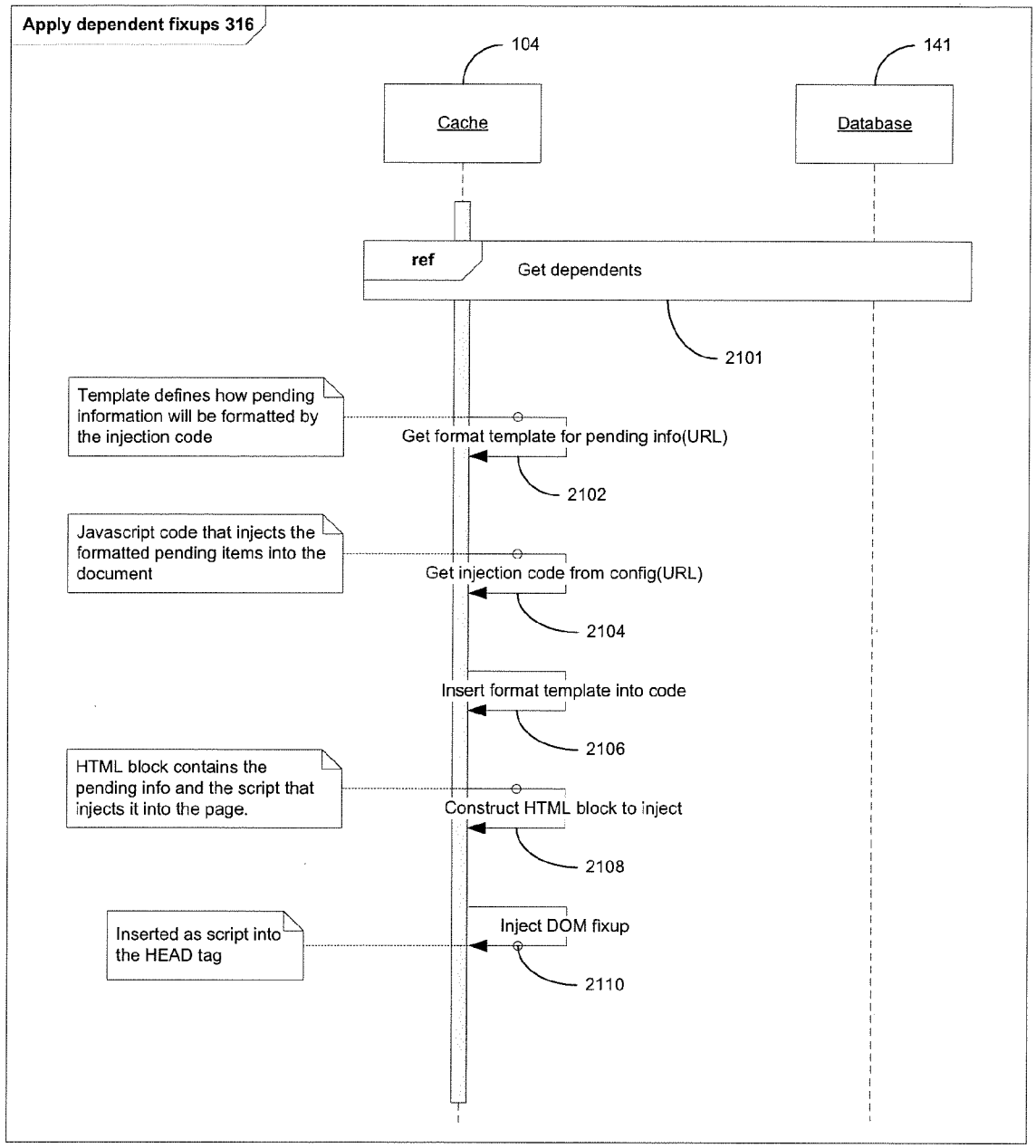
FIG. 40 shows a UML sequence diagram of an embodiment of the "apply dependent fixups" step from FIG. 19.

FIG. 40 shows a UML sequence diagram of an embodiment for step 316, "apply dependent fixups," from FIG. 19. This embodiment uses configuration parameters and templates to format the information and then uses the DOM API to inject the fix ups into the invalidated content.

Referring now to FIG. 40, Cache 104 first retrieves 2101 any dependent pending information associated with the URL of the document that is being requested. This is the identifying information about the write operations that are pending that has invalidated the URL that is being requested, for example, the name of a file that is pending to be uploaded to the server.

Cache 104 retrieves 2102 a template for formatting the identifying information for the given URL of the invalidated content. Cache 104 may use a configuration parameter that specifies the template to use for a given URL. Next cache 104 retrieves script code that can run in the client application to perform the actual injection of the identifying information into the invalidated content. Using script code that runs in the client application provides the advantage of allowing the script code to use any APIs or facilities that the client application has natively available to it, such as the DOM API available within a web browser.

The content can be formatted in any manner that can allow it to be displayed to the user, such as using HTML rendered in a web browser. In order to perform this injection, an HTML <script> block is constructed 2108 that contains the identifying information, the template for formatting the information, and the script code for injecting the information. For example, the <script> block could be made up of JavaScript code that contains a string that was defined by the template and an HTML formatted unordered list <ul> of list items <li> that contains the identifying information retrieved in step 2008.

Once this <script> HTML block is constructed, it can be added 2110 to the <head> HTML block of the invalidated content. When the browser loads the HTML document, it will execute the JavaScript embedded in the <script> block which can update the DOM and add the template-formatted content in some appropriate place, for example, as additional table data <td> in a table row <tr> appended to an existing table in the document.

Figure 41:
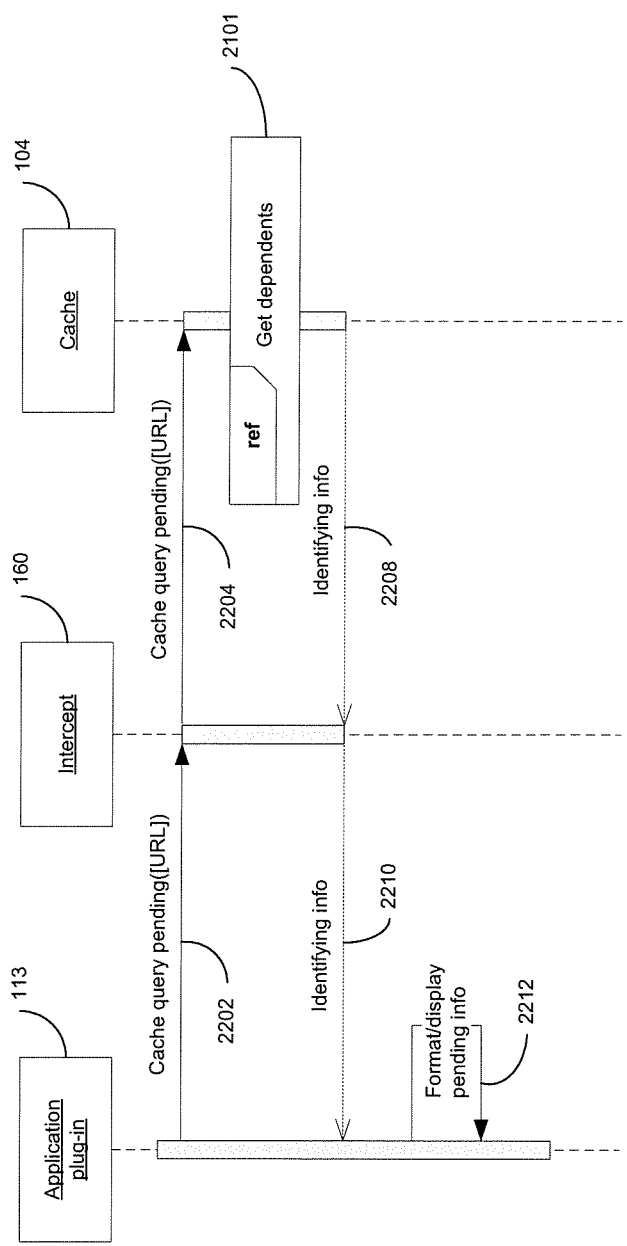
FIG. 41 shows a UML sequence diagram for an embodiment where pending information is displayed using a toolbar in the web browser.

The information about pending write operations may also be rendered by any other arbitrary application and/or displayed in any other way. For example, FIG. 41 shows a UML sequence diagram for an embodiment where pending information is displayed using a toolbar in the web browser. In this embodiment, the toolbar, which can be implemented as a browser plug-in 113, can query U2101 (see FIG. 42) for pending information. In this embodiment, when the list of pending information is returned 2208 and 2210, the plug-in is free to format and display 2212 the information in whatever form it chooses. Returning the information as an unformatted list of information allows the system to keep the data separate from any display or rendering concerns.

Figure 42:
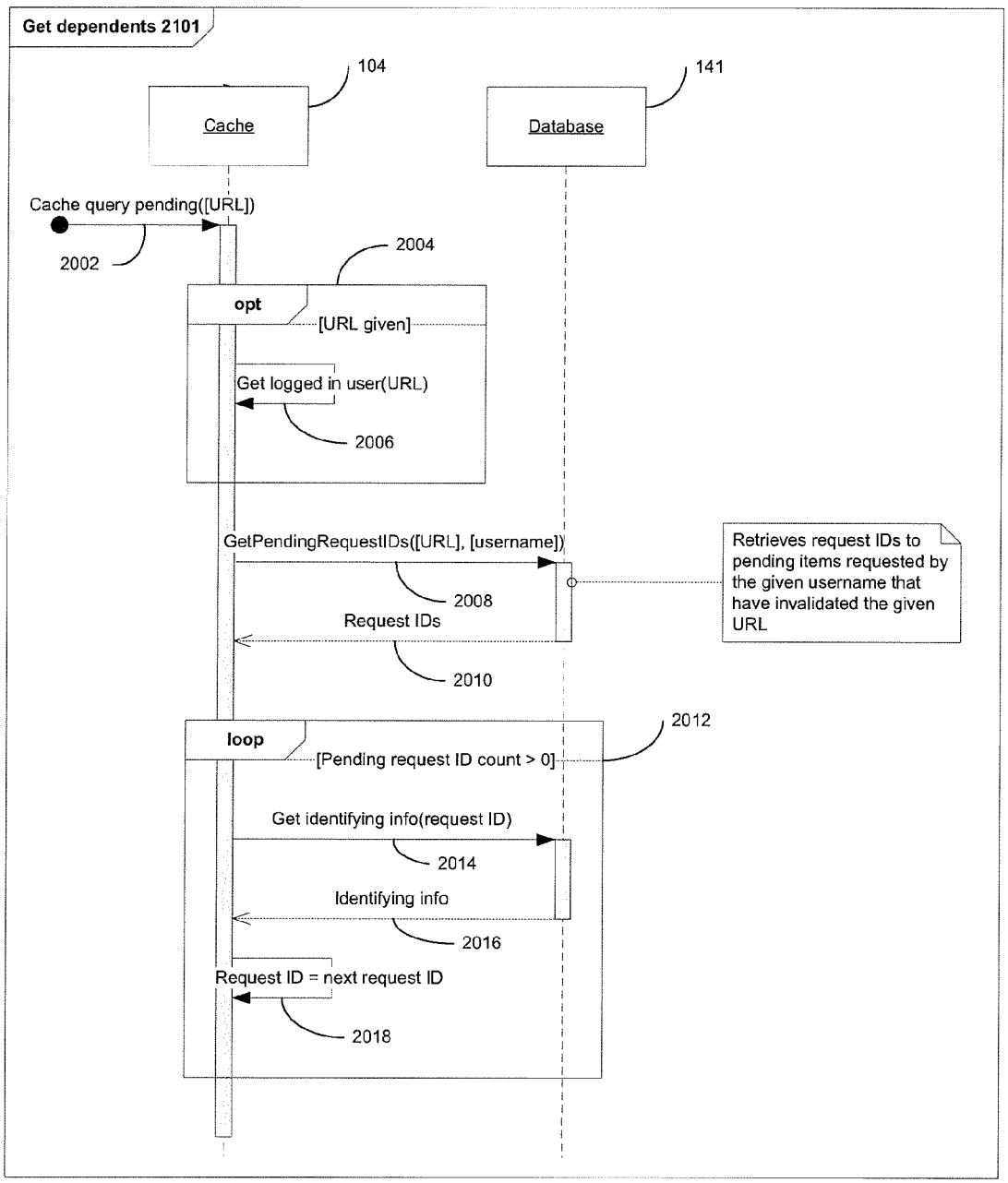
FIG. 42 shows a UML sequence diagram of an embodiment for UML frame, "Get dependents," from FIG. 41.

FIG. 42 shows a UML sequence diagram of an embodiment for UML frame, "Get dependents" 2101, from FIG. 41. In this embodiment, these are the steps where information about pending write operations are retrieved.

Referring now to FIG. 42, when cache 104 receives 2002 the request for pending information, it can be given an URL to invalidated content. In this embodiment, the URL is not a mandatory parameter, such as when querying for all pending write operations in the system.

If the optional URL is given 2004, then cache 104 checks 2006 the current session for the user that is logged in to that URL. In this embodiment, the read cache is able to manage authenticated sessions, which allows the system the ability to securely serve content specifically associated with a given user. The user information may be determined using credentials available in the HTTP headers, passed in by Intercept 160, or using HTTP session cookies.

The database 141 is then queried 2008 for the request IDs of write operations that affect the given invalidated URL submitted by the given user. With this list of request IDs, cache 104 then loops 2012 to retrieve the identifying information that was saved for the write operations as in step 912 in FIG. 31 and step 1604 in FIG. 36. The invalidated content can now be fixed up to include the identifying information about the write operations that have affected it.

When the write operation is pending, it can be updated or deleted before it is sent to the server. Updating the operation involves displaying the submitted form with the information that the user entered at the time they originally submitted the write operation, allowing the user to change any information that they entered. Deleting the write operation involves identifying the operation and removing it from the system so that it will not be sent to the server and will not invalidate its dependent content anymore.

In this embodiment, the HTML of the form with the user input entered inline was stored in the database in step 612 in FIG. 30. Therefore, it will be available to be displayed to the user if they choose to update the operation. An example of this use case could be when a user views invalidated content and from the identifying information displayed about a pending write operation determines that the information entered was incorrect. They could then choose to update the write operation.

When the form with the user information inline is presented to the user, in this embodiment, it is assigned a URL that contains the request ID of the original write operation that was associated with the write operation. When the user decides to submit the form again, in step 3504 of FIG. 29, cache 104 can determine from the URL that the request is for an update 3506. In other embodiments, different methods can be used to associate the update with the request ID of the write operation to update, for example, using an HTTP header or a hidden input field in the form that contains the request ID.

If the user decides to delete the pending write operation, they can do so through a similar mechanism. In this embodiment, a URL is assigned that contains the request ID of the write operation to delete. If the user makes a request to that URL, in step 3504 of FIG. 29, cache 104 can determine from the URL that the request is for a delete 3508. Again, other embodiments could be used to associate the delete request with the request ID to operate on as above.

Figure 43:
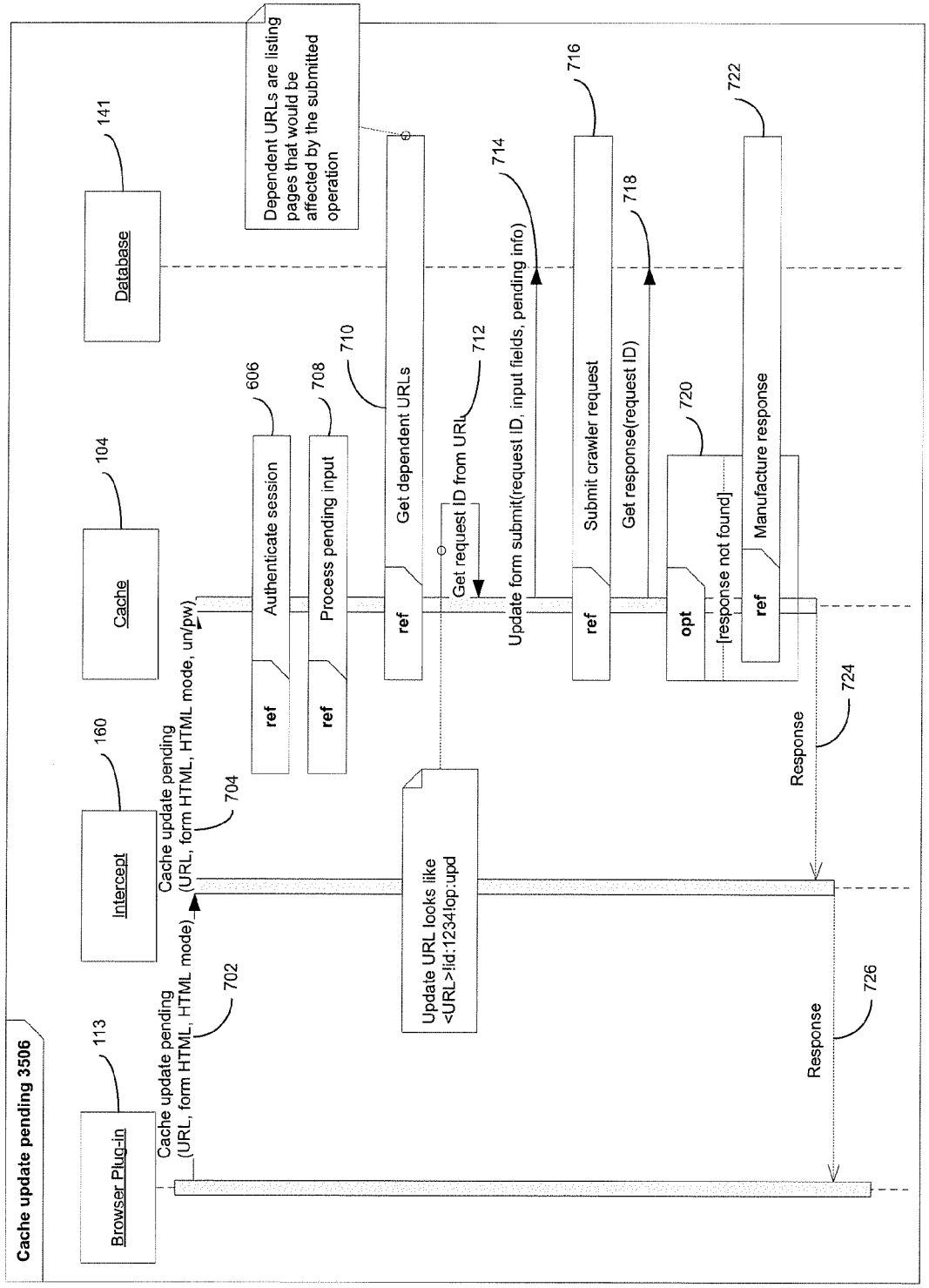
FIG. 43 shows a UML sequence diagram of an embodiment for updating a pending write operation.

FIG. 43 shows a UML sequence diagram of an embodiment for updating a pending write operation (see step 3506 in FIG. 29). Updating a pending write operation and adding 3510 (see FIG. 30) a new write operation are very similar processes except for the fact that when the update is going to save the information to the database, instead of creating a new operation it instead updates 714 the information associated with the given 712 request ID.

Figure 44:
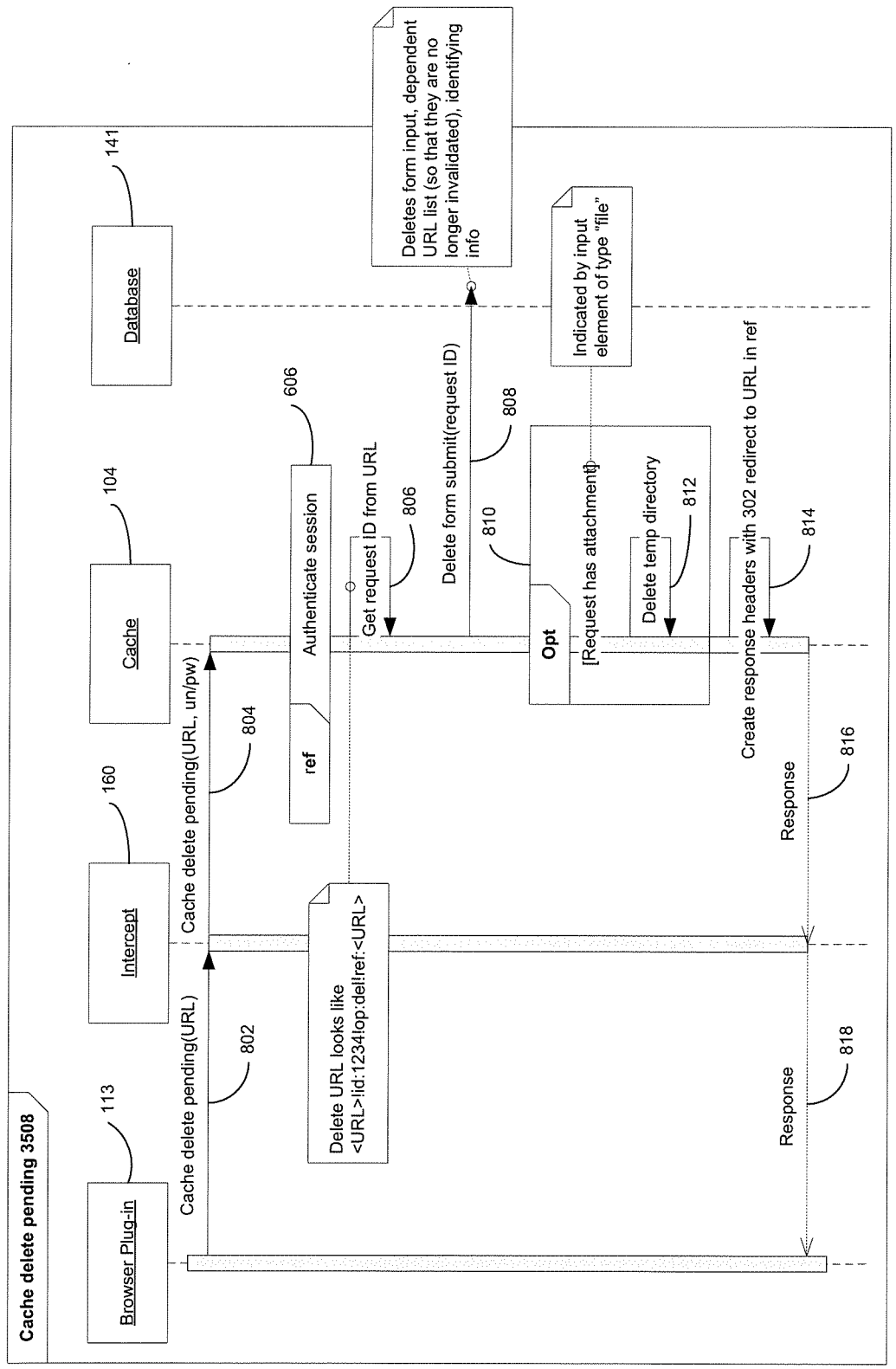
FIG. 44 shows a UML sequence diagram of an embodiment for deleting a pending write operation.

FIG. 44 shows a UML sequence diagram of an embodiment for deleting a pending write operation (see step 3508 in FIG. 29). As with adding 3510 a new write operation (see FIG. 30) and updating 3506 an existing write operation (see FIG. 43), first the request is authenticated 606. Next, the request ID is retrieved 806 and then the database is called 808 to delete the write operation associated with the request ID and to cancel any invalidation of content. Other cleanup that is performed includes deleting 812 any temporary directories and files that may have been created 914 when the write operation was requested. In this embodiment, the response to the delete operation is an HTTP redirect to the URL that referred the browser to the delete URL. In this embodiment, this can be found in the "ref" argument in the URL of the request. Cache 104 constructs 814 response headers that perform the redirect to this URL.

CONCLUSION

A system and method of seamless network caching of server content and services has been described. By caching the responses of server requests (both as they occur and in anticipation of future same or related requests) as well as providing for asynchronous write support, embodiments of the present invention provide seamless caching of the server using a thin client architecture. That is, such an approach does not require client-side replication of server logic or data. In this way, the client can be agnostic to the application being cached, with the user experiencing performance as if the server content and services were accessible locally, even when connectivity to the server is interrupted. In addition, the applications do not have to be modified to enable this capability (e.g., it is not necessary to rewrite to custom API's). To the client, the caching takes place as if it is communicating directly with the server.

There are many different ways such a system or method can be realized, to provide the aforementioned benefits, such as within the client, the application server, or some other device or system. For example, the described system or method can be embedded within a nearby networked device, such as a cellular modem or router, to provide disconnected or accelerated application operation. As another example, the described system or method can be hosted within any intermediate systems that are logically connected between the client and server, such as on servers deployed by internet service providers (ISPs) to increase performance and/or reduce bandwidth utilization.

It is noteworthy that although the foregoing examples have been shown with respect to specific Internet applications and protocols, the present invention is not limited to these Internet applications or protocols. Other current and future Internet or other network applications or protocols can use the foregoing adaptive aspects.

Although the present invention has been described with reference to specific embodiments, these embodiments are illustrative only and not limiting. Many other applications and embodiments of the present invention will be apparent in light of this disclosure and the following claims.

What is claimed is:

1. A client-based computer system adapted to communicate with a remote server through a network and to provide access to content or services provided by the server, the system comprising:
   a storage device coupled to a client computer;
   a connectivity manager adapted to automatically determine when the server is connected to or disconnected from the client computer; and
   a cache that is coupled to a client application, wherein the cache is adapted to communicate with the server over the network,
to transparently intercept a request from the client application to the server, and
to automatically determine when to send the request to and provide a response from the server over the network and when to provide a cached response to appear to the client application as though the client application sent the request to and received the response from the server, the cache being further adapted:
to send the request to the server to appear to the server as though the client application sent the request, to provide the response from the server, and to store the provided response among a plurality of cached responses stored on the storage device when the connectivity manager determines that the server is connected to the client computer; and
to provide the cached response from the cached responses stored on the storage device when the connectivity manager determines that the server is disconnected from the client computer, to appear to the client application as though the server provided the response.

2. The client-based computer system of claim 1, wherein the request and the responses conform to a hypertext transfer protocol (HTTP) specification.

3. The client-based computer system of claim 2, wherein the cache is further adapted to provide the response based on the request's HTTP request type, headers, or body.

4. The client-based computer system of claim 1,
wherein the request is a write request to the server content, and
wherein the cache is further adapted to provide the response to the write request to appear to the client application as though the server provided the response while using the storage device to store the write request as pending until the cache can send the write request to the server.

5. The client-based computer system of claim 4, wherein the cache is further adapted to consolidate on the storage device multiple pending write requests that are related or directed to a same portion of the server content, including maintaining their order or relationship.

6. The client-based computer system of claim 4, wherein the cache is further adapted to store the response from the server on the storage device, to the write request sent to the server.

7. The client-based computer system of claim 4, wherein the cache is further adapted to modify or delete the pending write request before sending the write request to the server.

8. The client-based computer system of claim 1, wherein the cache is further adapted to transparently intercept the request at an Application Programming Interface (API) level.

9. The client-based computer system of claim 1, wherein the cache is further adapted to transparently intercept the request via a proxy.

10. The client-based computer system of claim 1, wherein the cache is further adapted to transparently intercept the request by modifying an application on the client computer.

11. The client-based computer system of claim 1, wherein the network is the Internet.

12. The client-based computer system of claim 1,
wherein the system is further adapted to communicate with a specific set of servers through the network and to provide access to content or services provided by the set of servers,
wherein the connectivity manager is further adapted to automatically determine when any one server of the set of servers is connected to or disconnected from the client computer,
wherein the cache is further adapted
to communicate with the set of servers over the network,
to transparently intercept the request from the client application to the one server of the set of servers, and
to automatically determine when to send the request to and provide the response from the one server over the network and when to provide the cached response to appear to the client application as though the client application sent the request to and received the response from the one server, the cache being further adapted:
to send the request to the one server to appear to the one server as though the client application sent the request, to provide the response from the one server, and to store the provided response among the cached responses stored on the storage device when the connectivity manager determines that the one server is connected to the client computer; and
to provide the cached response from the cached responses stored on the storage device when the connectivity manager determines that the one server is disconnected from the client computer, to appear to the client computer as though the one server provided the response, and
wherein the set of servers is configured manually or automatically, including through user specification, favorites, bookmarks, history, or activity.

13. The client-based computer system of claim 12,
wherein the cache is further adapted to:
transparently intercept a new request that is related to the request, for content or services provided by a corresponding server accessible through the network and that is not in the set of servers;
communicate with the corresponding server over the network; and
automatically determine that the new request is related to the request,
wherein the connectivity manager is further adapted to automatically determine when the corresponding server is connected to or disconnected from the client computer, and
wherein the cache is further adapted to automatically determine when to send the new request to and provide a corresponding response from the corresponding server over the network and when to provide a corresponding cached response to appear to the client application as though the client application sent the new request to and received the corresponding response from the corresponding server; the cache being further adapted:
to send the new request to the corresponding server to appear to the corresponding server as though the client application sent the new request, to provide the corresponding response from the corresponding server, and to store the provided corresponding response among the cached responses stored on the storage device when the connectivity manager determines that the corresponding server is connected to the client computer; and
to provide the corresponding cached response to the new request from the cached responses stored on the storage device when the connectivity manager determines that the corresponding server is disconnected from the client computer, to appear to the client appli-

49 cation as though the corresponding server provided the corresponding response.

14. The client-based computer system of claim 13, wherein the request is issued from a web browser for a web page to the set of servers, and the new request is for embedded content of the web page on the corresponding server.

15. The client-based computer system of claim 1, wherein the automatic determination by the cache of when to send the request to the server is based on connectivity between the client computer and the server, including a quality of the connectivity or accessibility of the server over the network.

16. The client-based computer system of claim 1, wherein the automatic determination by the cache of when to send the request to the server is based on a type of the request or parameters of the request.

17. The client-based computer system of claim 1, wherein the automatic determination by the cache of when to send the request is dynamically reconfigurable.

18. The client-based computer system of claim 1, wherein the cache is further adapted to provide the response based upon a type or parameters of the request.

19. The client-based computer system of claim 1, wherein the cache is further adapted to authenticate a user for the request without having to access the server.

20. The client-based computer system of claim 19, wherein the cache is further adapted to provide the response based upon the user for the request.

21. The client-based computer system of claim 1, wherein the cache is further adapted to reformat the content of the response.

22. The client-based computer system of claim 1, wherein the cache is further adapted to provide the response by manufacturing the response from the server.

23. A method of seamless caching of responses on a storage device coupled to a client computer, from a server computer accessible to the client computer through a network, the cached responses corresponding to content or services provided by the server computer to a client application, the method comprising:
   transparently intercepting a request to the server computer from the client application;
   automatically determining when the server computer is connected to or disconnected from the client computer; and
   automatically determining when to send the request to and provide a response from the server computer over the network and when to provide a cached response to appear to the client application as though the client application sent the request to and received the response from the server computer, the automatically determining when to send the request to and provide the response from the server computer comprising:
      sending the request to the server computer to appear to the server computer as though the client application sent the request, providing the response from the server computer, and storing the provided response among the cached responses stored on the storage device when the server computer is determined to be connected to the client computer; and
      providing the cached response from the cached responses stored on the storage device when the server computer is determined to be disconnected from the client computer, to appear to the client application as though the server computer provided the response.

50

24. The method of claim 23, wherein:
   the request is a write request to the server computer content,
   the automatically determining of when to send the request further comprises automatically determining when to store the write request on the storage device as pending, and
   the storing of the write request on the storage device as pending comprises:
      providing the response to appear to the client application as though the server computer provided the response; and
      continuing to store the write request on the storage device until the write request can be sent to the server computer.

25. The method of claim 24, wherein the storing of the write request on the storage device as pending further comprises consolidating on the storage device multiple pending write requests that are related or directed to a same portion of the server computer content, including maintaining their order or relationship.

26. The method of claim 23, wherein the transparent intercepting of the request takes place at an Application Programming Interface (API) level.

27. The method of claim 23, wherein the method further comprises the seamless caching of responses on the storage device from a specific set of server computers accessible to the client computer through the network, the cached responses further corresponding to content or services provided by the set of server computers to the client application, the method further comprising:
   transparently intercepting the request to any one server computer of the set of server computers;
   automatically determining when the one server computer is connected to or disconnected from the client computer; and
   automatically determining when to send the request to and provide the response from the one server computer over the network and when to provide a cached response to appear to the client application as though the client application sent the request to and received the response from the one server computer, the automatically determining when to send the request to and provide the response from the one server computer comprising:
      sending the request to the one server computer to appear to the one server computer as though the client application sent the request, providing the response from the one server computer, and storing the provided response among the cached responses stored on the storage device when the one server computer is determined to be connected to the client computer; and
      providing the cached response including from the cached responses stored on the storage device when the one server computer is determined to be disconnected from the client computer, to appear to the client computer as though the one server computer provided the response,
   wherein the set of server computers is configured manually or automatically, including through user specification, favorites, bookmarks, history, or activity.

28. The method of claim 27, wherein the method further comprises the seamless caching of responses on the storage device from a corresponding server computer accessible to the client computer through the network and not in the set of server computers, to requests that are related to the request, the cached responses further corresponding to content or services provided by the corresponding server computer to the client application, the method further comprising:
- transparently intercepting a new request from the client application that is related to the request, for the content or services provided by the corresponding server computer;
- automatically determining that the new request is related to the request;
- automatically determining when the corresponding server computer is connected to or disconnected from the client computer; and
- automatically determining when to send the new request to and provide a corresponding response from the corresponding server computer over the network and when to provide a corresponding cached response to appear to the client application as though the client application sent the new request to and received the corresponding response from the corresponding server computer, the automatically determining when to send the new request to and provide the corresponding response from the corresponding server computer comprising:
  - sending the new request to the corresponding server computer to appear to the corresponding server computer as though the client application sent the new request, providing the corresponding response from the corresponding server computer, and storing the provided corresponding response among the cached responses stored on the storage device when the corresponding server computer is determined to be connected to the client computer; and
  - providing the corresponding cached response to the new request from the cached responses stored on the storage device when the corresponding server computer is determined to be disconnected from the client computer, to appear to the client application as though the corresponding server computer provided the corresponding response.

29. The method of claim 28, wherein the request is issued from a web browser for a web page to the set of server computers, and the new request is for embedded content of the web page on the corresponding server computer.

30. The method of claim 23, further comprising authenticating a user for the request without having to access the server computer.

31. A client-based computer system adapted to communicate with a remote server through a network and to provide access to content or services provided by the server, the system comprising:
- a storage device coupled to a client computer;
- a connectivity manager adapted to automatically determine when the server is connected to or disconnected from the client computer;
- a cache that is coupled to a client application, wherein the cache is adapted
  - to communicate with the server over the network,
  - to transparently intercept a request from the client application to the server, and
  - to automatically determine when to send the request to and provide a response from the server over the network and when to provide a cached response to appear to the client application as though the client application sent the request to and received the response from the server, the cache being further adapted:
    - to send the request to the server to appear to the server as though the client application sent the request, to provide the response from the server, and to store the provided response among a plurality of cached responses stored on the storage device when the connectivity manager determines that the server is connected to the client computer; and
    - to provide the cached response including from the cached responses stored on the storage device based upon the request when the connectivity manager determines that the server is disconnected from the client computer, to appear to the client application as though the server provided the response; and
- a crawler adapted to operate in conjunction with the cache to cause requests to be sent to the server over the network.

32. The client-based computer system of claim 31, wherein the crawler is further adapted to cause the requests to be sent to the server based upon previous server responses.

33. The client-based computer system of claim 32, wherein the crawler is further adapted to cause requests for web pages or content to be sent to the server by analyzing or performing actions based upon the previous server responses to requests for web pages or content.

34. The client-based computer system of claim 31,
- wherein the request is a write request to the server content, and
- wherein the cache is further adapted to provide the response to the write request to appear to the client application as though the server provided the response while using the storage device to store the write request as pending until the crawler can cause the write request to be sent to the server.

35. The client-based computer system of claim 34, wherein the crawler is further adapted to consolidate on the storage device multiple pending write requests that are related or directed to a same portion of the server content, including maintaining their order or relationship.

36. The client-based computer system of claim 31,
- wherein the system is further adapted to communicate with a specific set of servers through the network and to provide access to content or services provided by the set of servers,
- wherein the connectivity manager is further adapted to automatically determine when any one server of the set of servers is connected to or disconnected from the client computer,
- wherein the cache is further adapted
  - to communicate with the set of servers over the network,
  - to transparently intercept the request from the client application to the one server of the set of servers, and
  - to automatically determine when to send the request to and provide the response from the one server over the network and when to provide a cached response to appear to the client application as though the client application sent the request to and received the response from the one server, the cache being further adapted:
    - to send the request to the one server to appear to the one server as though the client application sent the request, to provide the response from the one server, and to store the provided response among the cached responses stored on the storage device when the connectivity manager determines that the one server is connected to the client computer; and
    - to provide the cached response from the cached responses stored on the storage device when the connectivity manager determines that the one server is disconnected from the client computer, to appear to the client computer as though the one server provided the response, wherein the crawler is further adapted to operate in conjunction with the cache to cause the requests to be sent to the set of servers over the network, and wherein the set of servers is configured manually or automatically, including through user specification, favorites, bookmarks, history, or activity.

37. The client-based computer system of claim 36, wherein the crawler is further adapted to operate in conjunction with the cache to cause requests related to the request to be sent to corresponding servers over the network to appear to the corresponding servers as though the client application sent the related requests to the corresponding servers, and wherein the cache is further adapted to store corresponding responses from the corresponding servers for the related requests among the cached responses stored on the storage device.

38. The client-based computer system of claim 37, wherein the cache is further adapted to:
  transparently intercept a new request that is related to the request, for content or services provided by a corresponding server accessible through the network and that is not in the set of servers;
  communicate with the corresponding server over the network; and
  automatically determine that the new request is related to the request, wherein the connectivity manager is further adapted to automatically determine when the corresponding server is connected to or disconnected from the client computer, and wherein the cache is further adapted to automatically determine when to send the new request to and provide a corresponding response from the corresponding server over the network and when to provide a corresponding cached response to appear to the client application as though the client application sent the new request to and received the corresponding response from the corresponding server; the cache being further adapted:
  to send the new request to the corresponding server to appear to the corresponding server as though the client application sent the new request, to provide the corresponding response from the corresponding server, and to store the provided corresponding response among the cached responses stored on the storage device when the connectivity manager determines that the corresponding server is connected to the client computer; and
  to provide the corresponding cached response to the new request from the cached responses stored on the storage device when the connectivity manager determines that the corresponding server is disconnected from the client computer, to appear to the client application as though the corresponding server provided the corresponding response.

39. The client-based computer system of claim 38, wherein the request is issued from a web browser for a web page to the set of servers, and the new request is for embedded content of the web page on the corresponding server.

40. The client-based computer system of claim 31, wherein the crawler is further adapted to cause the requests to be sent on behalf of a user.

41. The client-based computer system of claim 34, wherein the crawler is further adapted to cause the pending write request to be sent to the server, to appear to the server as if a user sent the pending write request.

* * * * *